US010460494B2

(12) United States Patent
Kunieda et al.

(10) Patent No.: US 10,460,494 B2
(45) Date of Patent: Oct. 29, 2019

(54) CONTROL METHOD AND STORAGE MEDIUM

(71) Applicant: CANON KABUSHIKI KAISHA, Tokyo (JP)

(72) Inventors: Hiroyasu Kunieda, Yokohama (JP); Masaaki Obayashi, Kawasaki (JP); Shinjiro Hori, Yokohama (JP); Ryosuke Iguchi, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/832,339

(22) Filed: Dec. 5, 2017

(65) Prior Publication Data

US 2018/0165856 A1 Jun. 14, 2018

(30) Foreign Application Priority Data

Dec. 9, 2016 (JP) .................. 2016-239737

(51) Int. Cl.
*G06T 11/60* (2006.01)
*G06T 5/50* (2006.01)
(Continued)

(52) U.S. Cl.
CPC ............ *G06T 11/60* (2013.01); *G06T 5/50* (2013.01); *H04N 1/387* (2013.01); *G06T 7/10* (2017.01)

(58) Field of Classification Search
CPC ...................................... G06T 11/60
(Continued)

(56) References Cited

U.S. PATENT DOCUMENTS 8,730,397 B1  5/2014  Zhang
8,958,662 B1  2/2015  Grosz et al.
(Continued)

FOREIGN PATENT DOCUMENTS

CN  1458625 A  11/2003
EP  3128733 A1  2/2017
(Continued)

OTHER PUBLICATIONS

Pere Obrador and Nathan Moroney—XP030081740—Automatic Image Selection by means of a Hierarchical Scalable Collection Representation, Issued Jan. 2009, SPIE-IS&T, vol. 7257, pp. 72570W-1 to 72570W-12.
(Continued)

*Primary Examiner* — Javid A Amini
(74) *Attorney, Agent, or Firm* — Canon USA, Inc., IP Division

(57) ABSTRACT

A control method for an image processing apparatus that generates a layout image by arranging an image in a template includes specifying, as a designated object, at least one object of a plurality of objects including a first object and a second object according to a combination of a plurality of setting values including a setting value regarding the first object and a setting value regarding the second object based on the received input, selecting image data from a plurality of pieces of image data, and outputting a layout image in which an image represented by the selected image data is arranged in a template, wherein image data representing an image that contains an object specified as the designated object is selected in preference to image data representing an image that does not contain an object specified as the designated object from the plurality of pieces of image data.

19 Claims, 23 Drawing Sheets

(51) Int. Cl.
*H04N 1/387* (2006.01)
*G06T 7/10* (2017.01)

(58) Field of Classification Search
USPC .......................................................... 345/619
See application file for complete search history.

(56) References Cited

U.S. PATENT DOCUMENTS

| | | | |
|---|---|---|---|
| 8,990,672 B1 | 3/2015 | Grosz et al. | |
| 2006/0221779 A1* | 10/2006 | Matsushita | G11B 27/034 369/30.01 |
| 2010/0214411 A1* | 8/2010 | Weinmann | B64D 45/00 348/148 |
| 2012/0020648 A1 | 1/2012 | Yamaji | |
| 2012/0117473 A1 | 5/2012 | Han et al. | |
| 2012/0236176 A1* | 9/2012 | Kita | H04N 1/32144 348/231.2 |
| 2013/0004073 A1 | 1/2013 | Yamaji et al. | |
| 2014/0078177 A1* | 3/2014 | Yamaji | G06F 16/51 345/634 |
| 2014/0079322 A1 | 3/2014 | Yamaji | |
| 2016/0259604 A1 | 9/2016 | Hayakawa | |
| 2016/0260460 A1 | 9/2016 | Abe | |
| 2018/0157682 A1* | 6/2018 | Wakabayashi | G06T 1/00 |

FOREIGN PATENT DOCUMENTS

| | | |
|---|---|---|
| JP | 2007-318461 A | 12/2007 |
| JP | 5449460 B2 | 3/2014 |

OTHER PUBLICATIONS

Sarah Perez; XP55461338—Phototime is a Mobile Photo Gallery Capable of Image and Facial Recognition; retrieved Nov. 13, 2014—https://web.archive.org/web/20160409103917/http://techcrunch.com/2014/11/13/phototime-is-a-mobile-photo-gallery-capable-of-image-and-facial-recognition.

Jackie Dove: XP55461341—Phototime iphone Employs Image Recognition Automatically Tag Group Photos published Nov. 13, 2014—https://web.archive.org/web/20161013070555/https://thenextweb.com/creativity/2014/11/13/phototime-iphone-employs-image-recognition-automatically-tag-group-photos.

* cited by examiner

FIG.5

| 501 | 502 | 503 | 504 | 505 OBJECT CLASSIFICATION | | | | | | 506 | 507 PERSONAL ID | | | | | | |
|---|---|---|---|---|---|---|---|---|---|---|---|---|---|---|---|---|---|
| | | | | TOP1 | | TOP2 | | TOP3 | | | 1 | | 2 | | 3 | | |
| IMAGE ID | IMAGE CAPTURING DATE AND TIME | IMAGE ATTRIBUTE | FOCUS | CATEGORY | RELIABILITY | CATEGORY | RELIABILITY | CATEGORY | RELIABILITY | NUMBER OF FACES | UPPER LEFT POSITION | LOWER RIGHT POSITION | UPPER LEFT POSITION | LOWER RIGHT POSITION | UPPER LEFT POSITION | LOWER RIGHT POSITION | ... |
| 1 | 2015/7/1 10h11m12s | STILL IMAGE | ○ | PERSON | 90 | - | - | - | - | 6 | 40, 40 | 65, 65 | 90, 40 | 115, 65 | 10, 20 | 25, 35 | ... |
| 2 | 2015/7/1 10h12m00s | MOVING IMAGE | ○ | PERSON | 80 | ANIMAL | 40 | - | - | 2 | 50, 100 | 100, 150 | 150, 125 | 190, 165 | 150, 125 | 190, 165 | ... |
| 3 | 2015/7/1 10h15m34s | SNS | ○ | ANIMAL | 70 | PERSON | 10 | FOOD | 5 | 0 | - | - | - | - | - | - | ... |
| ... | ... | ... | ... | ... | ... | ... | ... | ... | ... | ... | ... | ... | ... | ... | ... | ... | ... |

FIG. 7

| SCENE | IMAGE CAPTURING PERIOD (HOURS) | | NUMBER OF CAPTURED IMAGES (IMAGES) | | NUMBER OF PERSONS SUBJECTED TO IMAGE CAPTURING (PERSONS) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.8A

| SCENE | IMAGE FEATURE FOR MAIN SLOT | IMAGE FEATURE FOR SUB-SLOT |
|---|---|---|
| TRAVEL | ZOOMED-OUT IMAGE CONTAINING PERSON AND LANDSCAPE | IMAGE CONTAINING CLOSE-UP OF FACE OR PROFILE |
| DAILY LIFE | IMAGE CONTAINING CLOSE-UP OF FACE OR PROFILE | ZOOMED-OUT IMAGE CONTAINING PERSON AND LANDSCAPE |
| CEREMONY | IMAGE CONTAINING TWO PERSONS CLOSE IN DISTANCE | IMAGE CONTAINING LARGE NUMBER OF PERSONS |

FIG.8B

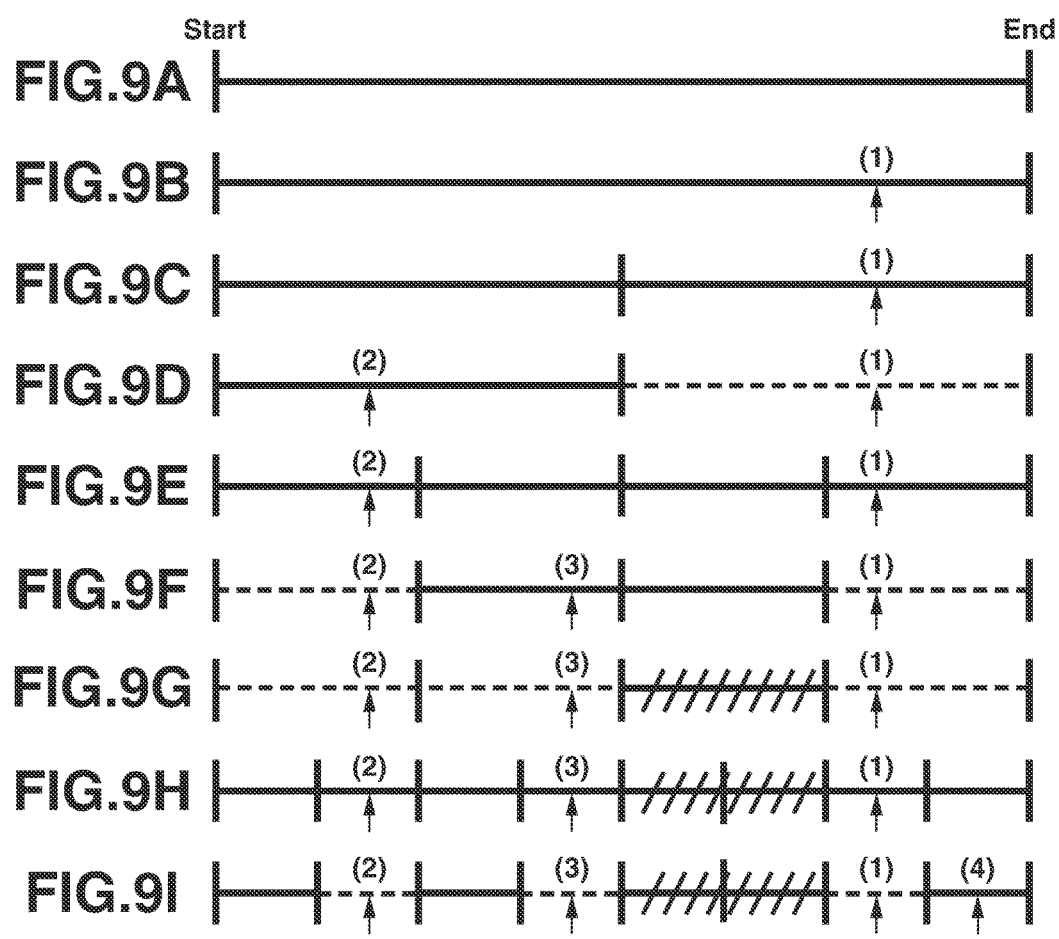

FIG.10
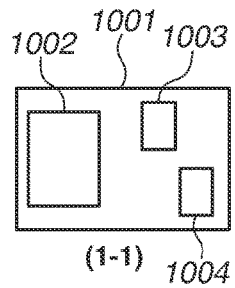
1002 1001 1003
(1-1)  1004
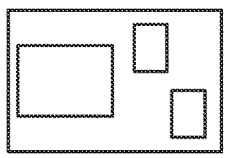
(2-1)
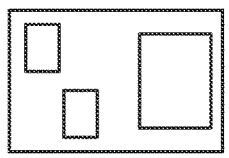
(3-1)
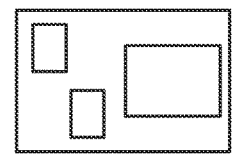
(4-1)
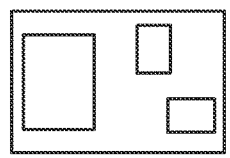
(1-2)
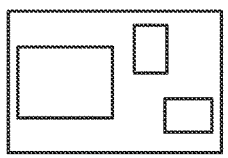
(2-2)
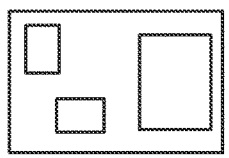
(3-2)
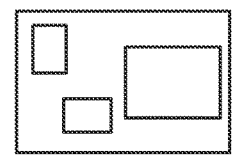
(4-2)
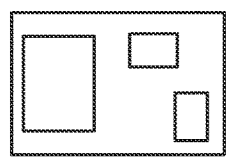
(1-3)
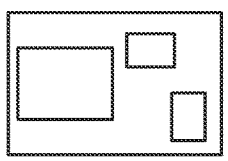
(2-3)
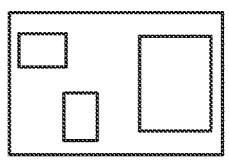
(3-3)
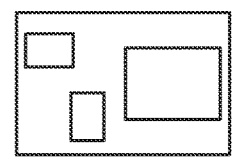
(4-3)
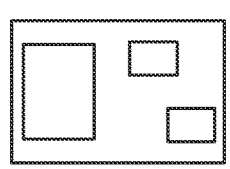
(1-4)
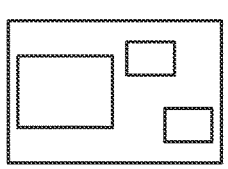
(2-4)
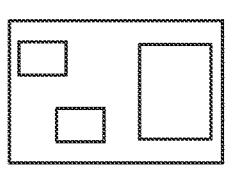
(3-4)
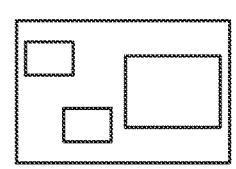
(4-4)
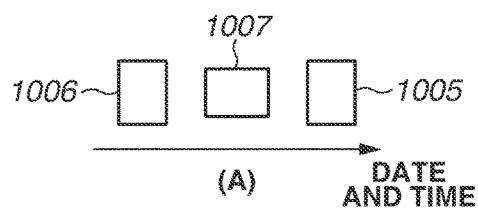
1006  1007  1005
(A)  DATE AND TIME

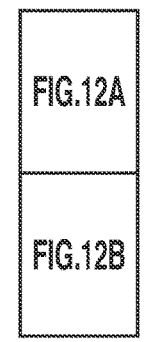
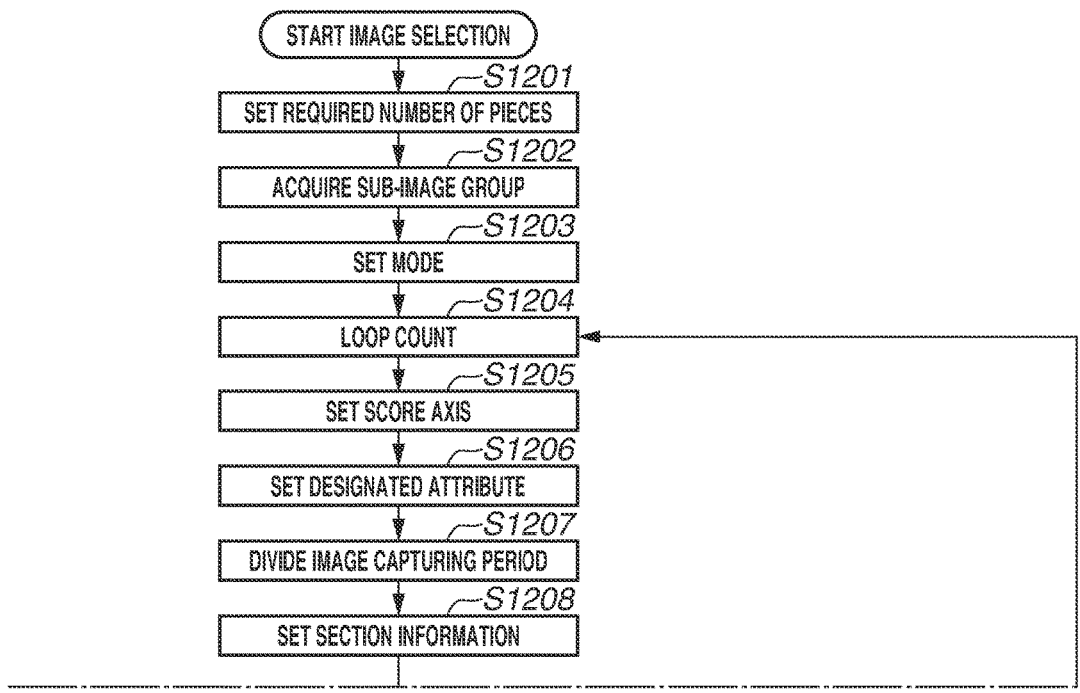
FIG.12A

FIG.17
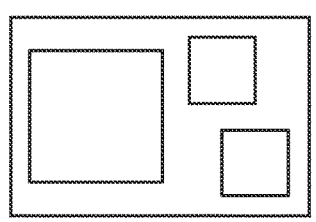
(5-1)
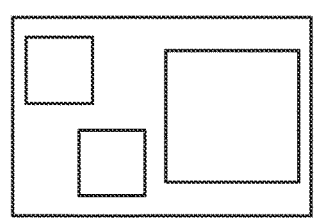
(6-1)
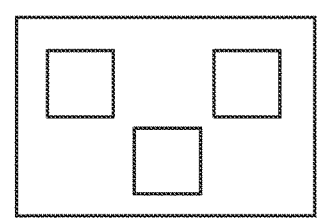
(7-1)
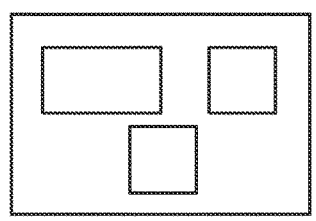
(8-1)
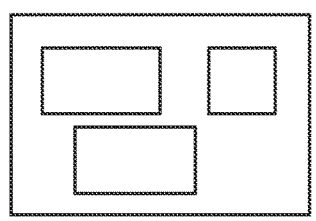
(9-1)
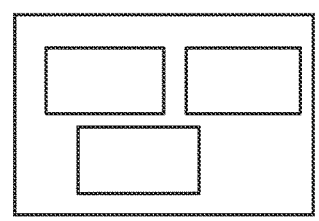
(10-1)

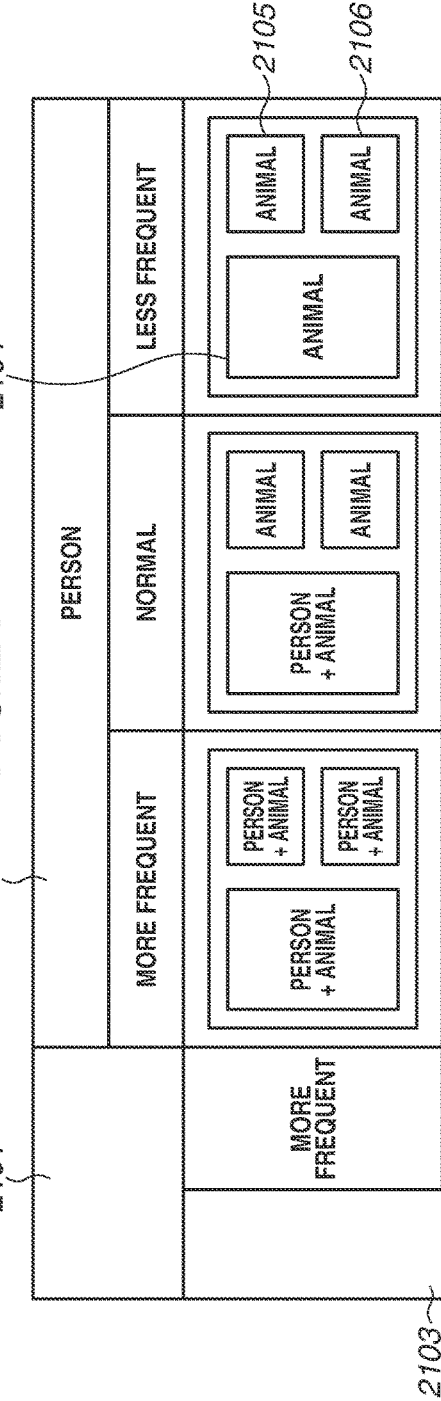

CONTROL METHOD AND STORAGE MEDIUM

BACKGROUND

Field of the Disclosure

The present disclosure generally relates to image processing and, more particularly, to an image processing apparatus, a control method, and a storage medium.

Description of the Related Art

Processing for generating a layout image by arranging, in a template, images represented by image data acquired by taking photographs using, for example, a digital camera is known. Such processing is referred to as "automatic layout processing". Japanese Patent No. 5,449,460 discusses a method of performing automatic layout processing by analyzing images to evaluate the images and then arranging images with higher evaluation values on a double-page spread to create an album.

Furthermore, with the popularization of automatic layout processing, generating a layout image having a higher user satisfaction level is more requested than ever before.

SUMMARY

Aspects of the present disclosure are generally directed to generating a layout image having a high user satisfaction level.

According to one or more aspects of the present disclosure, a control method for an image processing apparatus that generates a layout image by arranging an image in a template includes receiving, from a user, an input concerning at least one of a setting value regarding a first object and a setting value regarding a second object, acquiring a plurality of pieces of image data, specifying, as a first designated object, at least one object of a plurality of objects including the first object and the second object according to a combination of a plurality of setting values including the setting value regarding the first object and the setting value regarding the second object based on the received input, selecting, in first selection, image data from the acquired plurality of pieces of image data, and outputting a layout image in which an image represented by the image data selected in the first selection is arranged in a template, wherein image data representing an image that contains an object specified as the first designated object is selected in preference to image data representing an image that does not contain an object specified as the first designated object from the acquired plurality of pieces of image data.

According to another aspect of the present disclosure, a control method for an image processing apparatus that generates a layout image by arranging an image in a template includes receiving, from a user, an input concerning at least one of a setting value regarding a first object and a setting value regarding a second object, and outputting a layout image generated by arranging a plurality of images in a template, wherein a rate at which the first object is contained in the plurality of images included in the output layout image and a rate at which the second object is contained in the plurality of images vary according to a combination of the setting value regarding the first object and the setting value regarding the second object corresponding to the received input, and wherein at least one of the first object and the second object is any one of an object of person type, an object of animal type, an object of food type, an object of building type, an object of vehicle type, an object of stationary article type, and an object of flower type.

Further features of the present disclosure will become apparent from the following description of exemplary embodiments with reference to the attached drawings.

BRIEF DESCRIPTION OF THE DRAWINGS

FIG. 5 is a diagram illustrating a table used to manage image analysis information about image data according to one or more aspects of the present disclosure.

FIG. 7 is a diagram for explaining classification of scenes according to one or more aspects of the present disclosure.

FIGS. 8A and 8B are diagrams for explaining scoring with respect to a main slot and a sub-slot according to one or more aspects of the present disclosure.

FIGS. 9A, 9B, 9C, 9D, 9E, 9F, 9G, 9H, and 9I are diagrams for explaining selection of image data according to one or more aspects of the present disclosure.

FIG. 10 is a diagram for explaining layouts of image data according to one or more aspects of the present disclosure.

FIG. 17 is a diagram illustrating various templates according to one or more aspects of the present disclosure.

FIG. 21 is a diagram illustrating a single double-page spread layout image in an album obtained after editing in each combination of setting values according to one or more aspects of the present disclosure.

DESCRIPTION OF THE EMBODIMENTS

Figure 1:
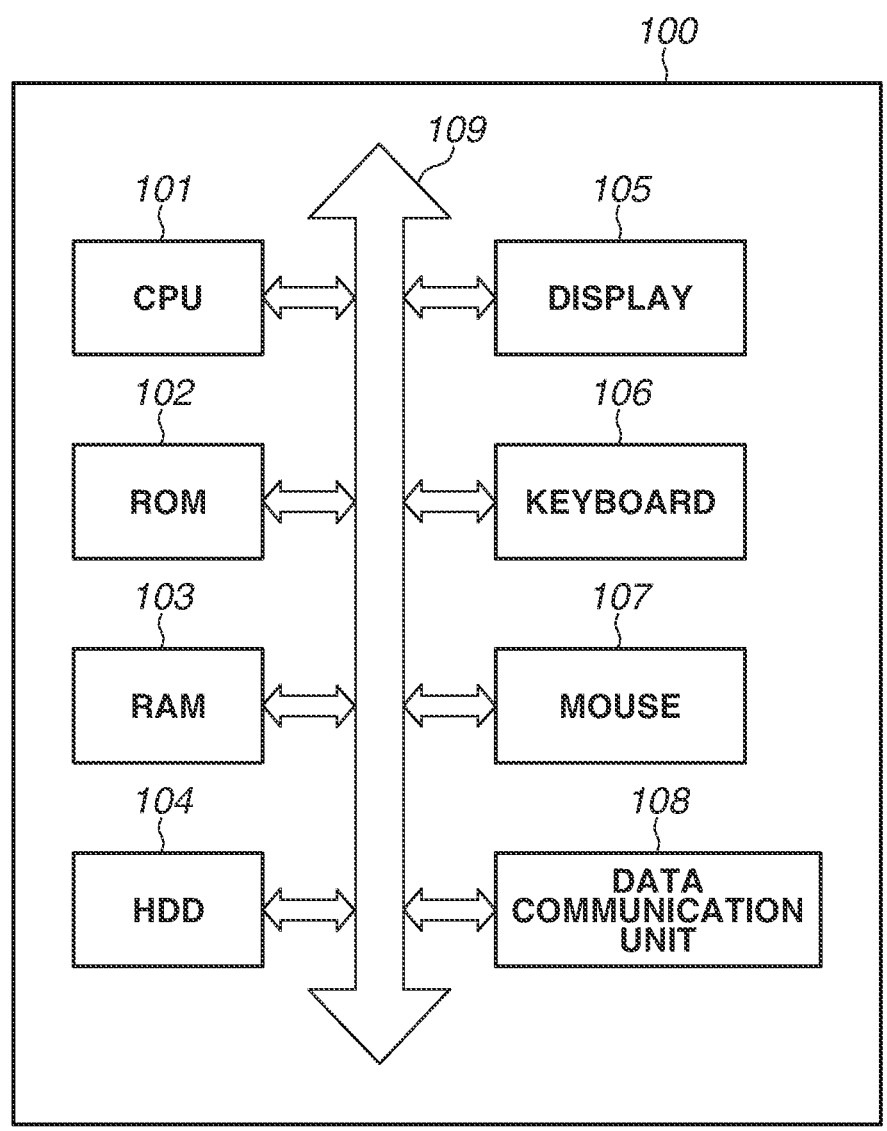
FIG. 1 is a block diagram illustrating a hardware configuration of an image processing apparatus according to one or more aspects of the present disclosure.

Various exemplary embodiments, features, and aspects of the disclosure will be described in detail below with reference to the drawings. Furthermore, the following exemplary embodiments should not be construed to limit the disclosure set forth in the claims, and not all of combinations of features described in the exemplary embodiments are always essential for solutions provided by the disclosure. Moreover, the same constituent elements are assigned the respective same reference numerals and the description thereof is not repeated.

In the following exemplary embodiments, procedures for activating an application program for creation of an album (hereinafter referred to as an "album creation application") and performing automatic layout processing to generate a layout image are described. The term "image" as used in the following description includes, unless otherwise stated, a still image, a moving image, and a frame image included in a moving image, and further includes a still image, a moving image, and a frame image included in a moving image which are present on a social networking service (SNS) server.

FIG. 1 is a block diagram illustrating a hardware configuration of an image processing apparatus according to a first exemplary embodiment of the present disclosure. Examples of the image processing apparatus include a personal computer (PC), a smartphone, a tablet terminal, a camera, and a printer, and, in the present exemplary embodiment, the image processing apparatus is assumed to be a PC.

Referring to FIG. 1, the image processing apparatus 100 includes a central processing unit (CPU) 101, a read-only memory (ROM) 102, a random access memory (RAM) 103, a hard disk drive (HDD) 104, a display 105, a keyboard 106, a mouse 107, and a data communication unit 108. These elements are mutually interconnected via a data bus 109.

The CPU 101, which is a may include one or more processors, one or more memories, circuitry, firmware, hardware, one or more central arithmetic devices, other components, or the like, may be a system control unit that controls the entire image processing apparatus 100. Moreover, the CPU 101 performs an image processing method described in the present exemplary embodiment according to one or more programs, instructions, codes, or the like. Furthermore, while, in FIG. 1, only one CPU is illustrated, the CPU 101 is not limited to this, but can include a plurality of CPUs.

Programs, instructions, codes, or the like, and an operating system (OS) which are executed by the CPU 101 are stored in the ROM 102. The RAM 103 provides a memory for temporarily storing various pieces of information to be used when programs are executed by the CPU 101. The HDD 104 is a storage medium for storing, for example, a database which retains image files and results of processing, such as image analysis. In the present exemplary embodiment, the HDD 104 stores an album creation application, details of which are described below.

The display 105 (display unit) is a device which displays a user interface (UI) or a layout result of images to the user. The display 105 can be equipped with a touch sensor function. The keyboard 106 is one of input devices, and is used, for example, to input predetermined information onto a UI displayed on the display 105. The predetermined information is, for example, information indicating the number of double-page spreads or the number of pages of an album intended to be created. The mouse 107 is one of input devices, and is used, for example, to click a button on the UI displayed on the display 105. Furthermore, the album creation application is activated, for example, by the user operating the mouse 107 to double-click an icon corresponding to the album creation application, which is displayed on the display 105.

The data communication unit 108 (communication unit) is a device provided to communicate with an external apparatus, such as a printer or a server. For example, data generated by the album creation application is transmitted via the data communication unit 108 to a printer (not illustrated) or a server (not illustrated) connected to the image processing apparatus 100. Moreover, the data communication unit 108 receives still image data present on a server (not illustrated) or a social networking service (SNS) server (not illustrated). Furthermore, while, in the present exemplary embodiment, the data communication unit 108 receives still image data from an SNS server, this is not a limited example, but the data communication unit 108 can also receive moving image data.

The data bus 109 connects the above-mentioned units (102 to 108) to the CPU 101.

<Automatic Layout of Album>

Figure 2:
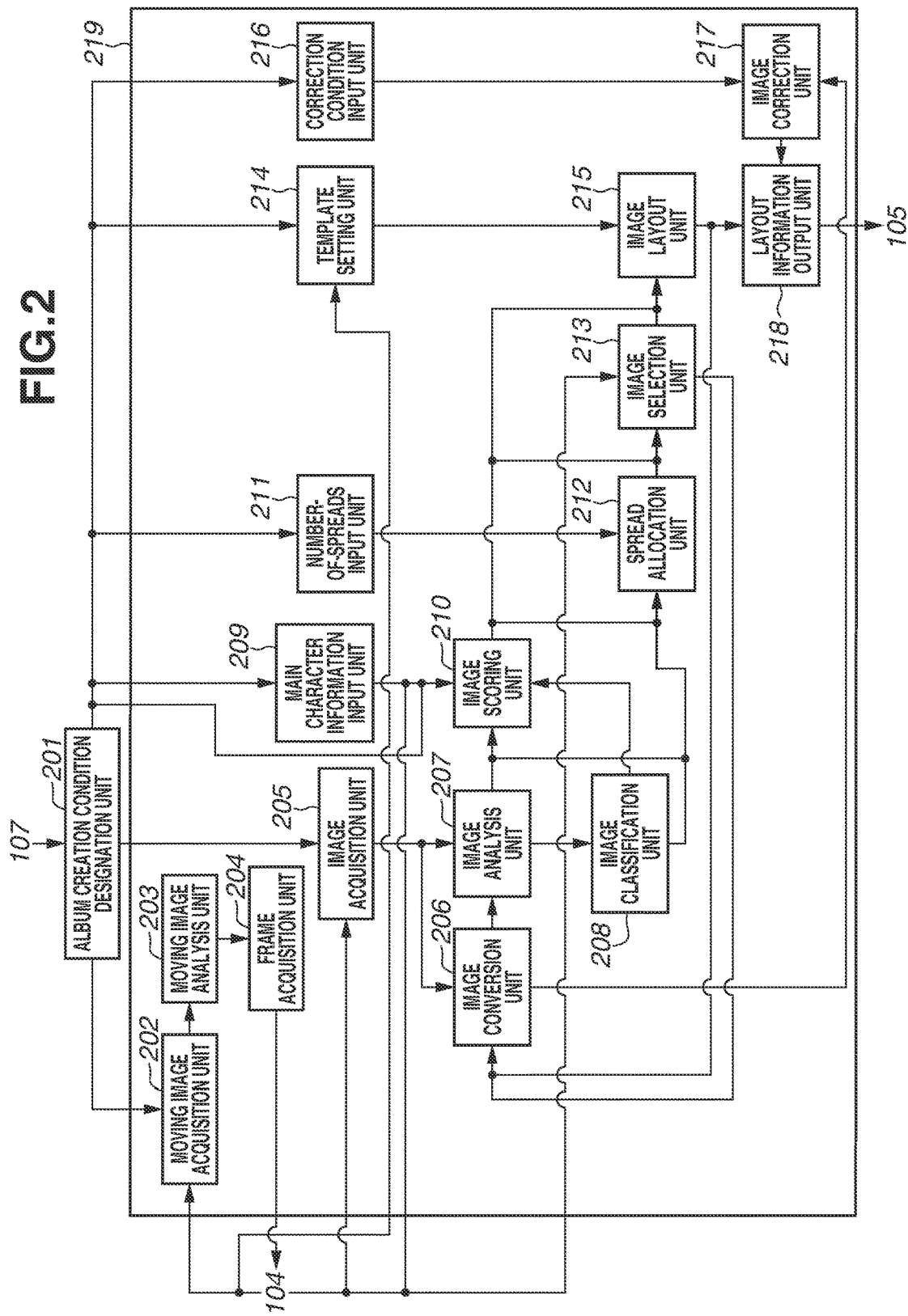
FIG. 2 is a block diagram illustrating a software configuration of an album creation application in a first exemplary embodiment according to one or more aspects of the present disclosure.

FIG. 2 is a software block diagram of the album creation application in the present exemplary embodiment. In the present exemplary embodiment, the album creation application, which is stored in the HDD 104, is activated by the user operating the mouse 107 to double-click an icon corresponding to the album creation application, which is displayed on the display 105. Moreover, the album creation application is stored in the HDD 104, for example, by being installed from an external server via the data communication unit 108. The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

While the album creation application has various functions, in the present exemplary embodiment, an automatic layout function provided by an automatic layout processing unit 219 is particularly described. The automatic layout function is a function to generate a layout image by laying out, in a previously-prepared template, image data acquired by classifying and selecting still images or moving images based on their contents or attribute information and to display the generated layout image on the display 105.

As illustrated in FIG. 2, the album creation application includes an album creation condition designation unit 201 and the automatic layout processing unit 219.

The album creation condition designation unit 201 receives a designation of an album creation condition according to a UI operation, which is described below, performed with, for example, the mouse 107, and outputs the designated album creation condition to the automatic layout processing unit 219. The designated album creation condition includes, for example, an identifier (ID) of image data or a main character targeted for processing, the number of double-page spreads of an album, template information, a turning-on/turning-off condition of image correction, a turning-on/turning-off condition of the use of a moving image, and designation of the mode of an album. The designation of image data can be, for example, a designation using ancillary information or attribute information about an individual piece of image data, such as the date and time of image capturing or a designation that is based on the structure of a file system including image data, such as the designation of a device or directory (folder). Furthermore, the double-page spread corresponds to a pair of mutually adjacent pages printed on separate sheets (or pages). Moreover, the album creation application in the present exemplary embodiment is assumed to generate one double-page spread layout via a single display window. Additionally, the album creation condition designation unit 201 displays, for example, a setting screen such as that illustrated in FIG. 3, and receives the designation of the album creation condition by receiving inputs to the setting screen.

A moving image acquisition unit 202 acquires a moving image group (moving image data group) designated by the album creation condition designation unit 201 from a storage region, such as the HDD 104. Furthermore, the moving image acquisition unit 202 can acquire a moving image group from a storage region of, for example, a server or an SNS server on the network via the data communication unit 108. The term "moving image group" as used herein refers to an aggregation of pieces of moving image data used to extract candidates of image data to be used for album creation. The moving image acquisition unit 202 brings the acquired moving image data from a compressed state into a decompressed state using a decoder function included as standard equipment in the OS in such a way as to enable the moving image data to be analyzed by a moving image analysis unit 203.

The moving image analysis unit 203 analyzes the moving image data acquired by the moving image acquisition unit 202.

More specifically, the moving image analysis unit 203 clips successive frames from moving image data, specifies a difference in feature amount between two successive frames, and specifies the amount of motion. The moving image data includes moving image data acquired by capturing an image of an image capturing target with a large amount of motion and moving image data acquired by capturing an image of an image capturing target with a small amount of motion. With regard to image data obtained from the former moving image data, the amount of motion is deemed large, and, with regard to image data obtained from the latter moving image data, the amount of motion is deemed small.

More specifically, the moving image analysis unit 203 divides the entire area of each clipped frame into a plurality of regions, and generates histograms concerning RGB values of the plurality of regions. Then, the moving image analysis unit 203 detects a difference in the histogram concerning RGB values between two successive frames, and identifies the number of regions corresponding to histograms detected as having a large difference. Then, if the number of regions corresponding to histograms detected as having a large difference is equal to or greater than a threshold value, the moving image analysis unit 203 determines that the difference in feature amount between two successive frames is large. Then, if the number of regions corresponding to histograms detected as having a large difference is less than the threshold value, the moving image analysis unit 203 determines that the difference in feature amount between two successive frames is small.

Then, since a case where the difference in feature amount between two successive frames is large indicates that those frames are not analogous to each other, it is determined by the moving image analysis unit 203 that those frames are frames in which the motion of the subject is large (the amount of motion is large). Since a case where the difference in feature amount between two successive frames is small indicates that those frames are analogous to each other, it is determined by the moving image analysis unit 203 that those frames are frames in which the motion of the subject is small (the amount of motion is small). With regard to determination of the amount of motion, besides the above-mentioned difference in feature amount between frames being used, motion vectors which are used in a moving image format can be used. Furthermore, while, in the present exemplary embodiment, a difference in RGB values is detected as the difference in feature amount between frames, for example, a difference concerning luminance values can be detected in another configuration. In this way, the moving image analysis unit 203 is able to divide a plurality of frames extracted from one piece of moving image data into a frame group with a large amount of motion and a frame group with a small amount of motion and to separately manage the respective frame groups.

The moving image analysis unit 203 extracts frames, which are clipped from moving image data and managed in time-series order, at predetermined intervals and sets each extracted frame as an analysis target. The moving image analysis unit 203 sets the interval at which to extract an analysis target frame from a frame group determined to have a large amount of motion as a short interval, and sets the interval at which to extract an analysis target frame from a frame group determined to have a small amount of motion as a long interval. For example, the moving image analysis unit 203 extracts an analysis target frame from a frame group determined to have a large amount of motion at intervals of three frames, and extracts an analysis target frame from a frame group determined to have a small amount of motion at intervals of five frames.

Moreover, the moving image analysis unit 203 performs analytical processing on the extracted analysis target frame. More specifically, the moving image analysis unit 203 performs, for example, object detection, size identification, smile determination, eye closing determination, shake and blur determination, and brightness determination. The object detection is processing for detecting an object, such as the face of a person, an animal, or food, from the analysis target frame. The size identification is processing for identifying the size of an object detected by the object detection. The smile determination is processing for, in a case where the object detected by the object detection is the face of a person, determining whether the detected face of a person is a smile. The eye closing determination is processing for, in a case where the object detected by the object detection is the face of a person, determining whether the detected face of a person indicates the eyes being closed. The shake and blur determination is processing for determining the amount of shaking or blurring in the analyzed frame. The brightness determination is processing the amount of brightness (average luminance value) of the analyzed frame.

Furthermore, the moving image analysis unit 203 performs scoring processing for assigning a score to the analyzed frame according to a result of the above-mentioned processing. More specifically, for example, the moving image analysis unit 203 performs scoring processing in such a manner that a frame which contains an object, such as the face of a person, an animal, or food, becomes higher in score than a frame which does not contain the object. Furthermore, the moving image analysis unit 203 is able to determine, via the object detection, whether a frame contains an object. Moreover, for example, the moving image analysis unit 203 performs scoring processing in such a manner that a frame which contains a large object becomes higher in score than a frame which contains a small object. Furthermore, the moving image analysis unit 203 is able to identify the size of an object contained in each frame via the size identification. Moreover, for example, the moving image analysis unit 203 performs scoring processing in such a manner that a frame which contains the face with a smile becomes higher in score than a frame which contains the face without a smile. Additionally, the moving image analysis unit 203 performs scoring processing in such a manner that a frame which contains more faces with a smile becomes higher in score than a frame which contains less faces with a smile. Furthermore, the moving image analysis unit 203 is able to identify, via the smile determination, whether the face contained in each frame has a smile or the number of faces with a smile contained in each frame. Moreover, for example, the moving image analysis unit 203 performs scoring processing in such a manner that a frame which contains a face without eye closing becomes higher in score than a frame which contains a face with eye closing. Additionally, the moving image analysis unit 203 performs scoring processing in such a manner that a frame which contains less faces with eye closing becomes higher in score than a frame which contains more faces with eye closing. Furthermore, the moving image analysis unit 203 is able to identify, via the eye closing determination, whether the face contained in each frame has eye closing or the number of faces having eye closing contained in each frame. Moreover, the moving image analysis unit 203 performs scoring processing in such a manner that a frame having small shaking or blurring becomes higher in score than a frame having large shaking or blurring. Furthermore, the moving image analysis unit 203 is able to identify, via the shake and blur determination, the amount of shaking or blurring of each frame. Additionally, in the shake and blur determination, the moving image analysis unit 203 calculates the edge amount of the analysis target frame using a Laplacian filter, and determines that the frame has less blurring as the edge amount is larger. Furthermore, the moving image analysis unit 203 can change a region to be subjected to the shake and blur determination according to the amount of motion. For example, in a case where the shake and blur determination is performed on a frame clipped from moving image data acquired by tracking and capturing an image of a moving subject, the image of the subject is captured as a sharp image, but the image of the background is captured as a blurring image. Therefore, if the entire image is set as a region targeted for the shake and blur determination, the determination target frame may be determined to have large blurring. Therefore, for example, with regard to a frame with a large amount of motion, the moving image analysis unit 203 can perform the shake and blur determination only on a subject region in which, for example, a face is contained. Additionally, the moving image analysis unit 203 performs scoring processing in such a manner that a bright frame (with a large average luminance value) becomes higher in score than a dark frame (with a small average luminance value).

Furthermore, the moving image analysis unit 203 can narrow down frames targeted for analysis. For example, when detecting the face of a person via the object detection, the moving image analysis unit 203 designates the orientation of the face to be detected. At this time, the moving image analysis unit 203 can be configured to detect only faces facing in a particular orientation rather than detecting faces while specifying all of the orientations. Moreover, for example, the moving image analysis unit 203 can be configured to perform the smile determination or the eye closing determination on a frame which contains a face facing in a particular orientation or a frame which contains a face with a size of a predetermined value or more. Additionally, for example, the moving image analysis unit 203 can be configured to perform the size identification, the smile determination, the eye closing determination, or the shake and blur determination on only a frame with a brightness of a predetermined value or more. With this configuration employed, even in a case where a large number of frames are clipped from moving image data, processing time can be reduced.

Furthermore, the method for scoring performed by the moving image analysis unit 203 is not limited to the above-mentioned methods. For example, the moving image analysis unit 203 can perform scoring processing in such a manner that a frame with a large amount of motion becomes higher in score than a frame with a small amount of motion. Moreover, the moving image analysis unit 203 can add a predetermined score value to the score of a frame obtained after zooming or a frame obtained after panning. This enables reflecting the intention of the user during capturing of a moving image in a score.

With these analytical processing operations, the moving image analysis unit 203 is able to identify which frame in a moving image is an appropriate image.

A frame acquisition unit 204 clips a frame from a moving image based on a result of analysis (evaluation) performed by the moving image analysis unit 203, and stores the clipped frame as image data in the HDD 104. More specifically, the frame acquisition unit 204 acquires a frame with a total score of a predetermined value or more from each frame group which is analyzed and managed by the moving image analysis unit 203. Alternatively, the frame acquisition unit 204 can acquire a predetermined number of frames with a higher total score. At that time, the frame acquisition unit 204 stores the amount of motion of the frame, camera work, and a score in association with the frame. The amount of motion of the frame, the camera work, and the score are acquired by being analyzed by the moving image analysis unit 203. Furthermore, information concerning the usage of an image, such as an image being used for album creation or a candidate image being used when the user replaces images after album creation, can be stored in association with the frame. Moreover, for example, which of an image used for album creation and a candidate image a certain frame becomes is determined according to the score of the certain frame. Specifically, a frame with a higher score becomes an image used for album creation. Additionally, for example, information indicating from which storage unit, such as a specified folder, a specified server, or an SNS server, moving image data was acquired, information about the date and time of capturing of a moving image, the size of the extracted frame, or the image capturing time of a moving image can be stored at that time. Furthermore, the extracted frames are sequentially converted into image data of a predetermined format by an image conversion unit 206.

An image acquisition unit 205 acquires an image group (image data group) designated by the album creation condition designation unit 201 from a storage region, such as the HDD 104. Furthermore, the image acquisition unit 205 can acquire an image group from a storage region of, for example, a server or an SNS server on the network via the data communication unit 108. The term "image group" as used herein refers to candidates of image data to be used for album creation. For example, there may be a case where, in the album creation condition designation unit 201, "January 1, 20XX to December 31, 20XX" is designated as a condition concerning the date and time (hereinafter referred to as "image capturing date and time) at which image data targeted for layout was generated (a photograph corresponding to the image data was taken). In this case, the image acquisition unit 205 acquires all of the pieces of image data generated during a period from January 1, 20XX to December 31, 20XX as an image group.

Image data stored in the storage region is, for example, still image data or clipped image data obtained by clipping a frame from moving image data. The still image data or the clipped image data is acquired from an imaging device. The imaging device can be included in the image processing apparatus 100 or can be included in an external apparatus (for example, a PC, a smartphone, a digital camera, or a tablet terminal) external to the image processing apparatus 100. In the case of acquiring image data from an external apparatus, the image processing apparatus 100 acquires the image data via the data communication unit 108. Furthermore, the image processing apparatus 100 can acquire still image data or clipped image data from a network or a server via the data communication unit 108. The CPU 101 analyzes data attached to image data and determines from where each piece of image data was acquired. Furthermore, when acquiring image data from an SNS server via the album creation application, the CPU 101 can manage from where the image data was acquired via the album creation application. Additionally, image data to be used by the album creation application is not limited to the above-mentioned type of image data, but can be another type of image data.

The image conversion unit 206 converts number-of-pixels information and color information about image data acquired by the image acquisition unit 205. Furthermore, information indicating into what number-of-pixels information and color information the image data is converted by the image conversion unit 206 is previously determined, and such information is stored in the album creation application or a parameter file used by the album creation application. In the present exemplary embodiment, the image conversion unit 206 converts image data acquired by the image acquisition unit 205 into image data the number of pixels of which is 420 pixels in the short side and the color information of which is sRGB.

An image analysis unit 207 performs analytical processing on image data. In the present exemplary embodiment, the image analysis unit 207 performs analytical processing on image data obtained by conversion performed by the image conversion unit 206. More specifically, the image analysis unit 207 acquires feature amounts from the converted image data and performs object detection and face detection in the converted image data, facial expression recognition of the detected face, and personal recognition of the detected face. Moreover, the image analysis unit 207 acquires image capturing date and time information from data (for example, Exif information) attached to image data acquired by the image acquisition unit 205 and obtained before conversion. The image capturing date and time information is not limited to the one acquired from Exif information, but can be information indicating the date and time at which the image data was generated or updated. Moreover, the image capturing date and time information can be information indicating the date and time at which the image data was uploaded to a local server or an SNS server or the image data was downloaded from a local server or an SNS server. Such date and time information is also treated as image capturing date and time information in the following description. Furthermore, the local server is assumed to be a storage region included in the image processing apparatus 100, such as the HDD 104.

An image classification unit 208 performs, on an image data group, scene segmentation and scene classification, which are described below, using the image capturing date and time information, the number of captured images, and object detection result information such as the detected face information. The term "scene" refers to an image capturing scene such as "travel", "daily life", and "wedding ceremony". The scene can be said to be, for example, an aggregation of pieces of image data generated in an image capturing opportunity at a certain period of time.

A main character information input unit 209 inputs an ID (identification information) of a main character designated by the album creation condition designation unit 201 to an image scoring unit 210.

The image scoring unit 210 performs scoring on each piece of image data in such a manner that image data appropriate for layout gains a high score. Scoring is performed according to information acquired by the image analysis unit 207 and information acquired by the image classification unit 208. Furthermore, different information can be additionally or alternatively used. In the present exemplary embodiment, the image scoring unit 210 performs scoring on each piece of image data in such a manner that the score of image data in which the ID of a main character input by the main character information input unit 209 is contained becomes a high score.

A number-of-spreads input unit 211 inputs the number of spreads (double-page spreads) of an album designated by the album creation condition designation unit 201 to a spread allocation unit 212.

The spread allocation unit 212 divides (groups) an image group into portions and allocates each portion to each spread. The spread allocation unit 212 divides an image group into portions according the input number of spreads and allocates each portion of the image group to each spread. For example, in a case where the number of spreads is 5, the spread allocation unit 212 divides the acquired image group into five small image groups and allocates one small image group to each spread. Furthermore, while, in the present exemplary embodiment, a configuration in which the image group is divided into portions according to the number of spreads and each divided portion of the image group is allocated to each spread is described, a configuration in which the image group is divided into portions according to the number of pages and each divided portion of the image group is allocated to each page can be employed.

An image selection unit 213 selects image data from portions of the image group allocated to the respective spreads by the spread allocation unit 212, based on scores given by the image scoring unit 210.

A template setting unit 214 reads a plurality of templates corresponding to template information designated by the album creation condition designation unit 201 from the HDD 104, and inputs the plurality of templates to an image layout unit 215. Furthermore, in the present exemplary embodiment, the plurality of templates is assumed to be previously retained in an album creation application stored in the HDD 104. Moreover, the plurality of templates contains, for example, information about the size of each entire template and information about the number of slots included in each template, the size of each slot, and the position of each slot.

The image layout unit 215 determines the layout of each spread. More specifically, the image layout unit 215 selects a template suitable for image data selected by the image selection unit 213 from a plurality of templates input by the template setting unit 214, and determines the placement location of each image. With this, the layout of each spread is determined.

A layout information output unit 218 outputs layout information used to display a layout image on the display 105 according to the layout determined by the image layout unit 215. The layout image is, for example, an image in which images represented by the image data selected by the image selection unit 213 are arranged in the selected template, and the layout information is bit-mapped data representing the layout image.

An image correction unit 217 performs various correction processing operations, such as dodging correction (luminance correction), red-eye correction, and contrast correction. A correction condition input unit 216 inputs the turning-on/turning-off condition of image correction designated by the album creation condition designation unit 201 to the image correction unit 217. Turning-on/turning-off of image correction can be designated with respect to each type of correction or can be designated collectively with respect to all of the types of correction. In a case where the image correction condition is set to turning-on, the image correction unit 217 performs correction processing on image data, and, in a case where the image correction condition is set to turning-off, the image correction unit 217 does not perform correction processing on image data. Furthermore, the image correction unit 217 performs correction processing on the image data input from the image conversion unit 206 according to turning-on/turning-off of image correction. The number-of-pixels information about image data input from the image conversion unit 206 to the image correction unit 217 is able to be changed in conformity with the size of the layout image determined by the image layout unit 215. While, in the present exemplary embodiment, image correction is performed on each piece of image data after the layout image is generated, the image correction is not limited to this, but correction to each piece of image data can be performed before images are laid out (arranged) in the template.

Figure 3:
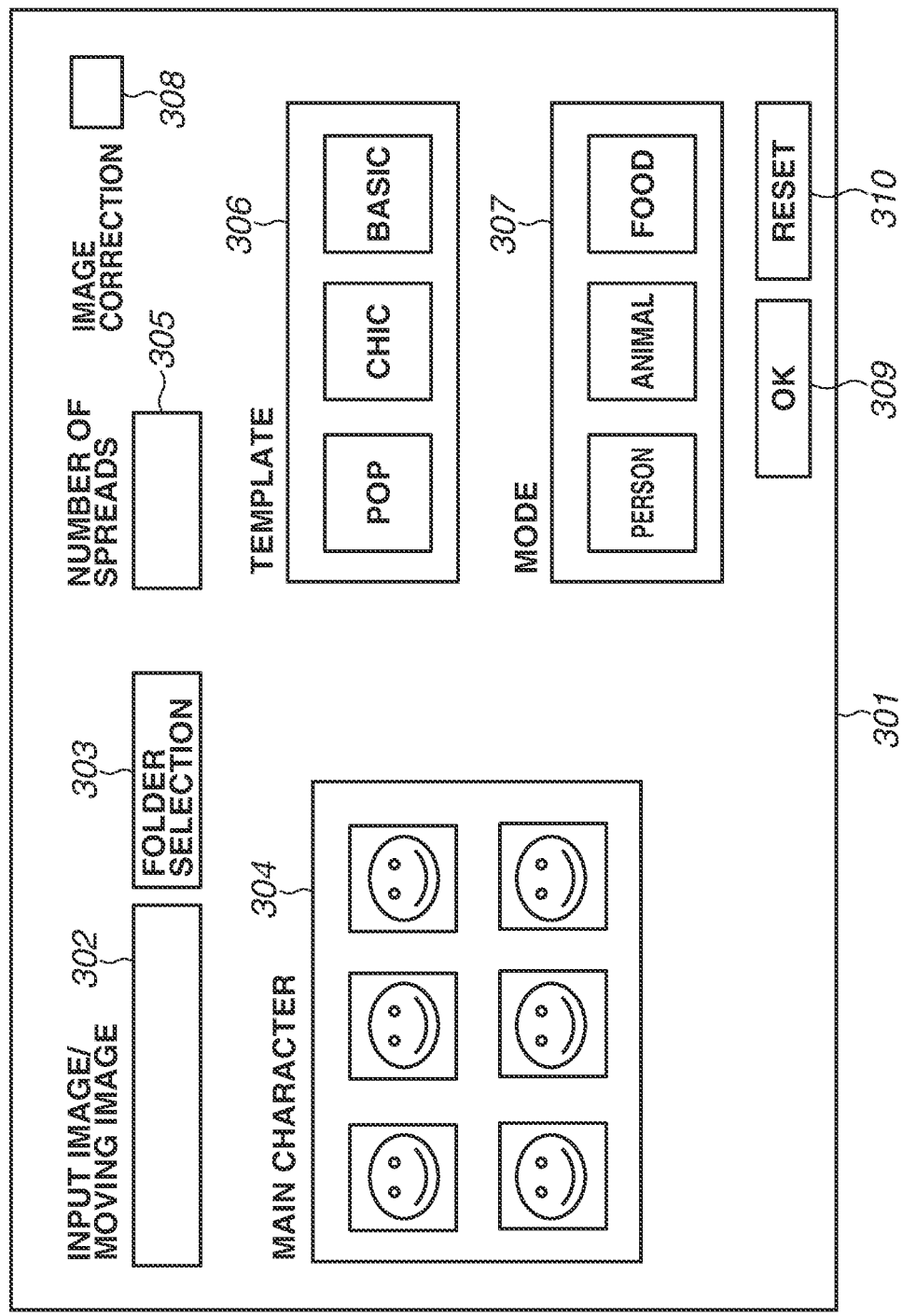
FIG. 3 is a diagram illustrating a setting screen which is displayed by the album creation application according to one or more aspects of the present disclosure.

Image data output from the layout information output unit 218 is displayed on the display 105, for example, in a format such as that illustrated in FIG. 3.

When the album creation application in the present exemplary embodiment is installed in the image processing apparatus 100, a start-up icon is generated on the top screen (desktop), which is displayed on the display 105, by the OS running on the image processing apparatus 100. Then, when the user double-clicks the start-up icon with an operation of the mouse 107, a program of the album creation application stored in the HDD 104 is loaded onto the RAM 103. Then, the program loaded on the RAM 103 is executed by the CPU 101, so that the album creation application is activated.

FIG. 3 is a diagram illustrating an example of a UI configuration screen 301 which is provided by the activated album creation application. The UI configuration screen 301 is displayed on the display 105. The user setting an album creation condition, which is described below, via the UI configuration screen 301 causes the album creation condition designation unit 201 to acquire the setting content designated by the user. A path box 302 on the UI configuration screen 301 indicates a storage location (path) in the HDD 104 of an image or moving image group targeted for album creation. A folder selection button 303 is able to be clicked with an operation of the mouse 107 by the user to display folders each containing an image or moving image group targeted for album creation in a tree structure in such a way as to be selectable by the user. Then, a folder path containing an image or moving image group selected by the user is displayed in the path box 302.

A main character designation icon 304 is an icon used for the user to designate a main character, and a face image of a person is displayed as an icon. A plurality of icons of different face images is displayed side by side in the main character designation icon 304, and the user is allowed to select any one icon of the displayed icons by clicking with the mouse 107. Then, a person corresponding to the selected icon is set as a main character of the album to be created. Furthermore, each face image is associated with a personal ID. Moreover, the main character designation icon 304 is used to specify a main character serving as a central figure from among the persons contained in an image represented by image data targeted for analysis. A face image is previously detected from, for example, an image represented by each piece of image data and is registered with a face database in association with a personal ID. The main character designation icon 304 indicates, for example, the face image of a person selected by the user or the face image of a person determined by a method described below from among the face images of persons registered with the face database. Additionally, a main character can also be automatically set according to a procedure illustrated in FIG. 4.

A number-of-spreads box 305 is used to receive setting of the number of spreads in the album from the user. The user can directly enter a numeral in the number-of-spreads box 305 via the keyboard 106 or can enter a numeral in the number-of-spreads box 305 from a list using the mouse 107.

A template designation icon 306 displays illustrative images according to respective tastes (for example, pop taste and chic taste) of templates. A plurality of template icons is displayed side by side in the template designation icon 306, and the user is allowed to select any one icon of the displayed icons by clicking with the mouse 107. Then, a template corresponding to the selected icon is set as a template used for an album to be created. In the present exemplary embodiment, the template has image placement frames (slots) in which to place image data. Then, image data is embedded in the sots included in the template, so that one layout image is completed.

A mode designation portion 307 is an icon corresponding to the mode of an album to be created. Furthermore, the mode of an album is a mode according to which to preferentially lay out an image containing a predetermined object in the template, and, in the present exemplary embodiment, includes three modes of "person", "animal", and "food". Furthermore, the mode of an album can be reworded as, for example, the theme of an album. For example, in a case where the mode "person" is selected, an image containing a person is preferentially laid out in the template. Moreover, in a case where the mode "animal" is selected, an image containing an animal is preferentially laid out in the template. Additionally, in a case where the mode "food" is selected, an image containing food is preferentially laid out in the template. Furthermore, there can be a mode for preferentially laying out image data representing an image containing an object other than the above-mentioned three objects in the template. Moreover, a plurality of modes can be concurrently selected. In that case, an image containing at least one of a plurality of objects corresponding to the selected plurality of modes is preferentially laid out in the template. The user is allowed to select any one icon of the plurality of icons corresponding to the respective modes by clicking with the mouse 107. Then, a mode corresponding to the selected icon is set as the mode of an album to be created.

Furthermore, the modes of albums are not limited to the above-mentioned three modes, but can additionally include other modes, such as "building", "vehicle", and "flower".

Moreover, while, in the present exemplary embodiment, a configuration in which the mode of an album is selected by the user via the mode designation portion 307 is described, for example, a configuration in which the CPU 101 automatically selects the mode of an album according to a program of the album creation application can be employed. In this case, for example, the CPU 101 analyzes an image data group acquired by the image acquisition unit 205 to specify the category of an object most contained in the image data group. Then, the CPU 101 selects a mode corresponding to the specified category.

A checkbox 308 is used to receive setting of turning-on/turning-off of image correction from the user. The state in which the checkbox 308 is checked is a state in which turning-on of image correction is designated, and the state in which the checkbox 308 is not checked is a state in which turning-off of image correction is designated. Furthermore, the UI configuration screen 301 is configured in such a manner that turning-on/turning-off is set collectively with respect to all of the correction processing operations, but can be configured in such a manner that turning-on/turning-off is able to be set individually with respect to respective correction processing operations. An OK button 309 is a button used to receive completion of the setting from the user. When the OK button 309 is clicked by the user with the mouse 107, the album creation condition designation unit 201 acquires the content that is set on the UI configuration screen 301. Then, the album creation condition designation unit 201 outputs the acquired setting information to the automatic layout processing unit 219. In that instance, the path entered in the path box 302 is transmitted to the image acquisition unit 205. Furthermore, the personal ID of a main character selected in the main character designation icon 304 is transmitted to the main character information input unit 209. Additionally, the number of spreads entered in the number-of-spreads box 305 is transmitted to the number-of-spreads input unit 211. Moreover, the template information selected in the template designation icon 306 is transmitted to the template setting unit 214. Besides, the setting of turning-on/turning-off of image correction in the checkbox 308 is transmitted to the correction condition input unit 216.

A reset button 310 is used to reset various pieces of setting information on the UI configuration screen 301.

Furthermore, settings other than the above-mentioned settings can be performed on the UI configuration screen 301. For example, setting concerning a moving image and setting of a source of acquisition of image or moving image data can also be performed.

In that case, for example, a server name box, a server selection button, a moving image use checkbox, and a target period box are included in the UI configuration screen 301.

The server name box indicates a server name or SNS name containing an image group to be used for album creation. Moreover, the server selection button is used to display server names or SNS names each containing an image group to be used for album creation in a list structure in such a way as to be selectable by the user. Then, the server name or SNS name selected by the user is displayed in the server name box. When the OK button 309 is clicked via the mouse 107 with the server name or SNS name displayed in the server name box, a login screen for the designated server or SNS is displayed. When logging in to the designated server or SNS is completed by the operation of the user via the displayed login screen, the CPU 101 becomes able to acquire image data from the designated server or SNS.

The moving image use checkbox is used to receive, from the user, setting as to whether to use, for album creation, a moving image stored in the folder designated in the path box 302 or stored in the server or SNS designated in the server name box. The state in which the moving image use checkbox is checked is a state in which the use of the moving image for album creation is designated, and the state in which the moving image use checkbox is not checked is a state in which the non-use of the moving image for album creation is designated.

The target period box is used to receive, from the user, setting of a condition for an image capturing date and time period of an image group or moving image group targeted for album creation. Furthermore, the target period box displays the designated image capturing date and time period. When the OK button 309 is clicked via the mouse 107 with the image capturing date and time period displayed in the target period box, an image group or moving image group generated in the designated image capturing date and time period is extracted as a target used for album creation.

Figure 4:
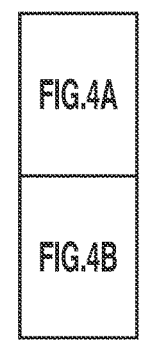
FIG. 4, which is composed of FIGS. 4A and 4B, is a flowchart illustrating automatic layout processing performed by the album creation application according to one or more aspects of the present disclosure.
Figure 4A:
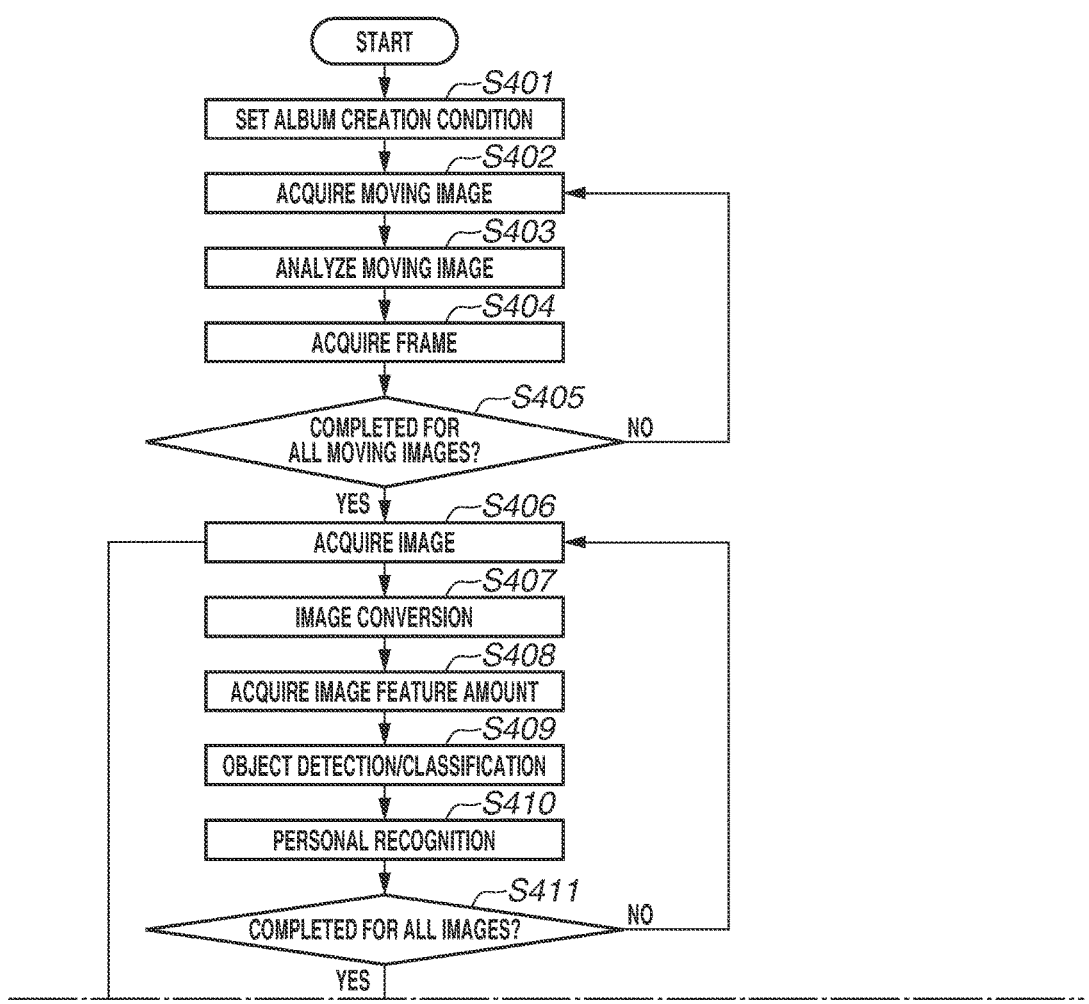
Figure 4B:
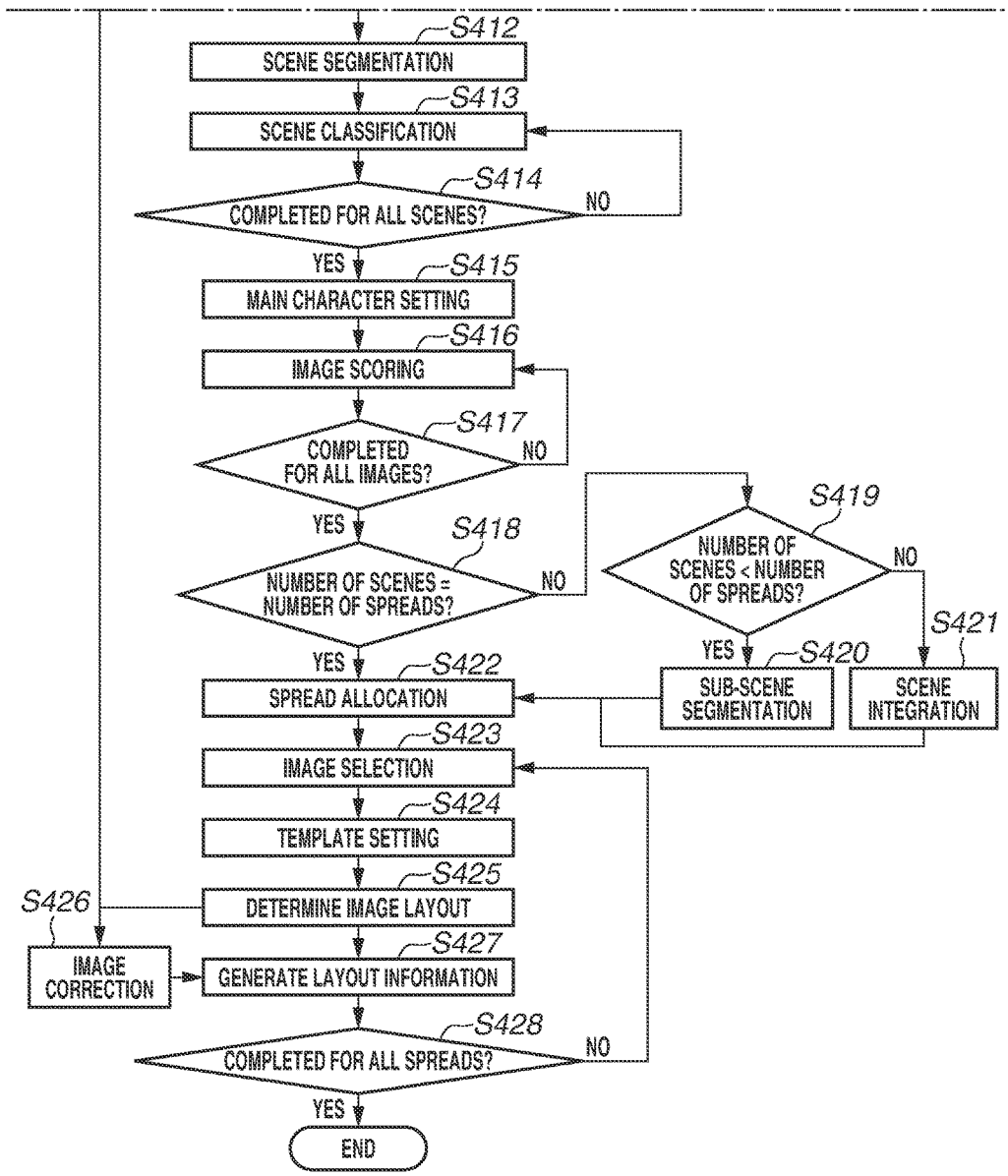

FIG. 4, which is composed of FIGS. 4A and 4B, is a flowchart illustrating automatic layout processing which is performed by the album creation application according to the present exemplary embodiment. The flowchart illustrated in FIG. 4 is implemented, for example, by the CPU 101 loading a program corresponding to the album creation application stored in the HDD 104 onto the ROM 102 or the RAM 103 and executing the program. The automatic layout processing is described with reference to FIG. 4. As mentioned in the following description, at the time of creation of an album, the present exemplary embodiment divides an image group to be used for creation of the album into sub-image groups according to image capturing times, and selects images to be laid out on pages from the sub-image groups obtained by division.

First, in step S401, the CPU 101 sets an album creation condition via the album creation condition designation unit 201. More specifically, for example, the CPU 101 receives setting of the album creation condition from the user via the screen illustrated in FIG. 3. Details of the setting of the album creation condition are as described above with reference to FIG. 3.

In step S402, the CPU 101 acquires, via the moving image acquisition unit 202, moving image data stored in a storage region targeted for searching. Details of the acquisition of moving image data are as described above with regard to the description of the moving image acquisition unit 202. Furthermore, the storage region targeted for searching is able to be set via the screen illustrated in FIG. 3 (for example, a server name box). The storage region targeted for searching to be set includes, for example, the HDD 104, a server, and an SNS server. The CPU 101 is able to recognize the storage region targeted for searching in step S401.

In step S403, the CPU 101 analyzes, via the moving image analysis unit 203, the moving image data acquired in step S402. Details of the analysis of moving image data are as described above with regard to the description of the moving image analysis unit 203.

In step S404, the CPU 101 clips, via the frame acquisition unit 204, a frame from the moving image data analyzed in step S403, and stores the clipped frame as image data in the HDD 104. Details of processing for clipping a frame from moving image data are as described above with regard to the description of the frame acquisition unit 204.

In step S405, the CPU 101 determines whether processing in steps S402 to S404 has been completed with respect to all of the pieces of moving image data stored in the storage region targeted for searching. If it is determined that the processing has not yet been completed (NO in step S405), the processing returns to step S402, in which the CPU 101 acquires moving image data that is not yet subjected to the processing. If it is determined that the processing has been completed (YES in step S405), the processing proceeds to step S406.

In step S406, the CPU 101 acquires, via the image acquisition unit 205, image data stored in a storage region targeted for searching. Furthermore, as in the setting concerning acquisition of moving image data, the storage region targeted for searching is able to be set via the screen illustrated in FIG. 3 (for example, a server name box). The storage region targeted for searching to be set includes, for example, the HDD 104, a server, and an SNS server. The CPU 101 is able to recognize the storage region targeted for searching in step S401. Moreover, the image data acquired in this instance includes image data acquired by clipping a frame from moving image data in the processing in steps S401 to S405.

In step S407, the CPU 101 performs conversion of image data via the image conversion unit 206. Details of the conversion of image data are as described above with regard to the description of the image conversion unit 206.

In step S408, the CPU 101 acquires, via the image analysis unit 207, a feature amount from the image data converted in step S407. Examples of the feature amount include focus. Examples of the method for detecting an edge to acquire the feature amount concerning focus include using a commonly-used Sobel filter.

The gradient of an edge, in other words, luminance gradient, can be calculated by detecting the edge via the Sobel filter and dividing a luminance difference between the starting point and end point of the edge by a distance between the starting point and end point thereof. The result obtained by calculating an average gradient of edges in the image enables deeming an image with a large average gradient to be more in focus than an image with a small average gradient. Then, setting a plurality of threshold values different from each other with respect to the gradient enables outputting an evaluation value of the amount of focusing by determining which threshold value the gradient is equal to or greater than.

In the present exemplary embodiment, two different threshold values are previously set, and the amount of focusing is determined in three levels of "○", "Δ", and "x". The threshold values are previously set, for example, through experiment in such a manner that the gradient of focus desired to be employed for an album is set to level "○", the allowable gradient of focus is set to level "Δ", and the unallowable gradient of focus is set to level "x". Furthermore, for example, the setting of threshold values can be provided by, for example, a creator of the album creation application, or can be configured to be able to be performed on a user interface.

In step S409, the CPU 101 performs, via the image analysis unit 207, object detection processing on the image data converted in step S407. First, the CPU 101 detects the face of a person from an image represented by the image data converted in step S407. A known method can be used for processing for face detection, and, for example, AdaBoost, in which a strong classifier is generated from a plurality of previously-prepared weak classifiers, may be used. In the present exemplary embodiment, the face image of a person (object) may be detected by a strong classifier generated according to AdaBoost or the like. Moreover, the CPU 101 not only acquires the face image but also acquires the upper left coordinate values and lower right coordinate values of the position of the detected face image. Acquiring such two types of coordinates enables the CPU 101 to acquire the position of the face image and the size of the face image. Furthermore, the CPU 101 is also able to acquire information about the reliability of the detected object by performing face detection processing using AdaBoost. Details of the reliability are described below. Moreover, in step S409, the CPU 101 can generate a strong classifier according to AdaBoost with not only a face but also another object, such as an animal, for example, a dog or cat, a flower, food, a building, a stationary article, or a vehicle, used as a detection target. This also enables the CPU 101 to detect objects other than faces. In the present exemplary embodiment, in step S409, the CPU 101 performs not only processing for detecting faces but also processing for detecting animals and food.

In step S410, the CPU 101 performs personal recognition processing via the image analysis unit 207. More specifically, the CPU 101 performs personal recognition by making a comparison in similarity between the face image extracted in step S409 and a representative face image stored for each personal ID in a face dictionary database. The CPU 101 determines the similarity between the face image extracted in step S409 and each representative face image, and sets the ID of a representative face image with the similarity equal to or greater than a threshold value and with the highest similarity as the ID of the face image extracted in step S409. In other words, the CPU 101 identifies a person corresponding to the representative face image with the similarity equal to or greater than a threshold value and with the highest similarity as a person corresponding to the face image extracted in step S409. Furthermore, in a case where the similarity between the face image extracted in step S409 and every representative face image stored in the face dictionary database is less than the threshold value, the CPU 101 assigns a new personal ID to the extracted face image and registers the extracted face image as a new person with the face dictionary database.

Image analysis information 500 about each piece of image data acquired in steps S408 to S410 is stored in a storage region, such as the RAM 103 or the HDD 104, in association with an image ID 501 for identifying each piece of image data. For example, as illustrated in FIG. 5, image capturing date and time information 502 and a focus determination result 504 acquired in step S408 and the number of face images 506 and position information 507 detected in step S409 are stored in a table form. Furthermore, the position information about a face image is separately stored for each personal ID acquired in step S410. Furthermore, one image represented by one piece of image data may contain the face images of a plurality of persons, and, in that case, a plurality of personal IDs is associated with the image ID 501 of image data representing an image containing the face images of a plurality of persons. Moreover, in a case where no face image is contained in one image, no personal ID is associated with the image ID 501 of image data representing an image containing no face image. Additionally, while, in the present exemplary embodiment, with respect to the face images of persons, the number and positions thereof are managed, a configuration in which the number and positions of other objects (for example, the faces of animals or food) are also managed can also be employed.

Image attribute 503 indicates the attribute of each piece of image data. For example, image data that is still image data acquired from a local server has an attribute of "still image". Furthermore, for example, image data that is stored after being clipped from moving image data acquired from a local server has an attribute of "moving image". Additionally, for example, image data acquired from an SNS server has an attribute of "SNS". In this way, the attribute can be information indicating whether image data has been acquired from still image data or acquired from moving image data, or can be information indicating a storage region storing image data (for example, an SNS server or the HDD 104). Thus, in the present exemplary embodiment, the attribute can also be said to be information indicating the source of acquisition of image data. Furthermore, the attribute can be distinguished according to a method other than the above-mentioned method. Moreover, for example, each attribute can be distinguished in more detail in such a way as to discriminate between, for example, image data acquired from still image data generated by taking a photograph with a digital camera and image data acquired from still image data generated by taking a photograph with a smart device. Moreover, in the present exemplary embodiment, image data with an attribute of "SNS" is still image data acquired from an SNS server. Image data with an attribute of "SNS" can be distinguished in detail according to whether the image data has been acquired from still image data or acquired from moving image data. Additionally, the attribute of each piece of image data can be managed with a flag indicating whether each piece of image data corresponds to each attribute.

Object classification 505 indicates the category (type) of an object contained in an image represented by each piece of image data and the reliability of the category. Furthermore, the CPU 101 is able to detect an object contained in an image represented by each piece of image data using, for example, AdaBoost. Moreover, at this time, the category of an object contained in an image represented by each piece of image data and the reliability of the category are also detected. In AdaBoost, weak classifiers for discriminating patterns are serially interconnected to form one strong classifier. Moreover, the album creation application using AdaBoost previously learns a weak classifier coinciding with a pattern corresponding to a predetermined category. Then, the reliability of an object of a predetermined category in a certain piece of image data becomes high in a case where an image represented by the certain piece of image data contains many weak classifiers coinciding with a pattern corresponding to the predetermined category. Furthermore, while, here, an example in which AdaBoost is used to perform object detection and acquisition of the reliability has been described, the present exemplary embodiment is not limited to this example. For example, a configuration in which convolutional neural network (CNN), including deep neural network (DNN), is used to perform object detection and acquisition of the reliability can also be employed.

In the present exemplary embodiment, objects of three categories (types) "person", "animal", and "food" are assumed to be detected, and the object classification 505 stores information indicating the category of an object detected in an image represented by each piece of image data. In other words, the object classification 505 is information indicating an object of which category an image represented by each piece of image data contains. Furthermore, such information can also be managed with, for example, a flag. Moreover, since, as mentioned above, objects to be detected are not limited to three categories "person", "animal", and "food", the object classification 505 can also store information indicating other categories, such as "flower", "building", "stationary article", and "vehicle".

The reliability of a category is information indicating in what category an object contained in an image represented by image data is likely to be included, and a category with a higher reliability is more likely to be a category of the object contained in an image represented by image data. Furthermore, the reliability can be, for example, information indicating the size of each object contained in an image represented by image data. In this case, for example, the size of an object of the category with a high reliability is larger than the size of an object of the category with a low reliability. Moreover, information about a category corresponding to an object which is not contained in an image represented by image data is not stored in the object classification 505. Furthermore, pieces of information about categories are stored in frames TOP1, TOP2, and TOP3 in the object classification 505 in descending order of the reliability. Additionally, in a case where objects of four or more categories are contained in an image represented by image data, further frames, such as frames TOP4 and TOP5, can be provided.

In step S411, the CPU 101 determines whether processing in steps S407 to S410 has been completed with respect to all of the pieces of image data stored in the storage region targeted for searching. If it is determined that the processing has not yet been completed (NO in step S411), the processing returns to step S406, in which the CPU 101 acquires image data that is not yet subjected to the processing. If it is determined that the processing has been completed (YES in step S411), the processing proceeds to step S412.

Figure 6A:
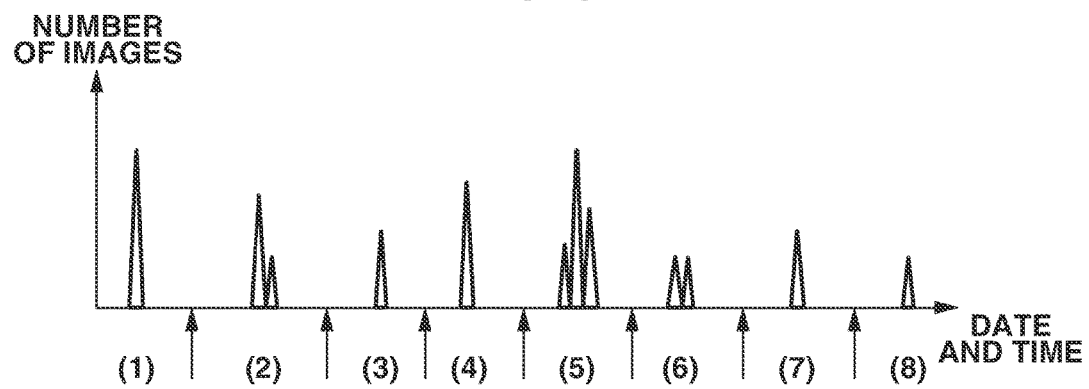
FIGS. 6A, 6B, and 6C are diagrams for explaining division of an image data group according to one or more aspects of the present disclosure.
Figure 6B:
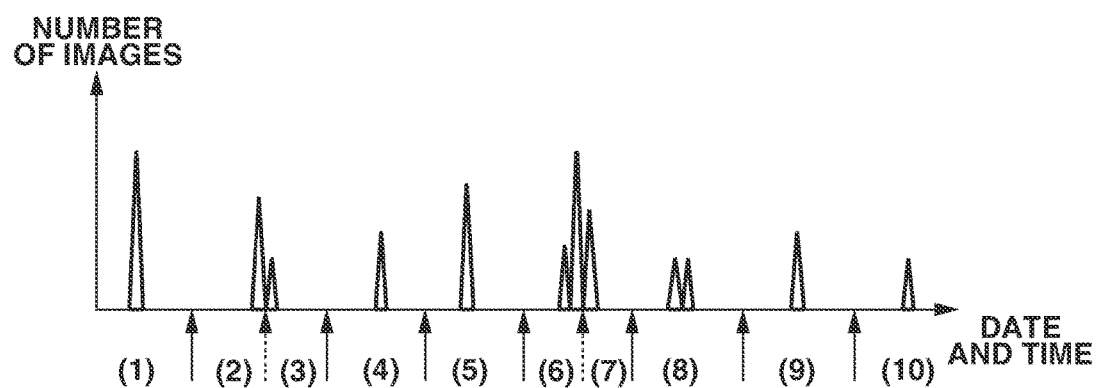
Figure 6C:
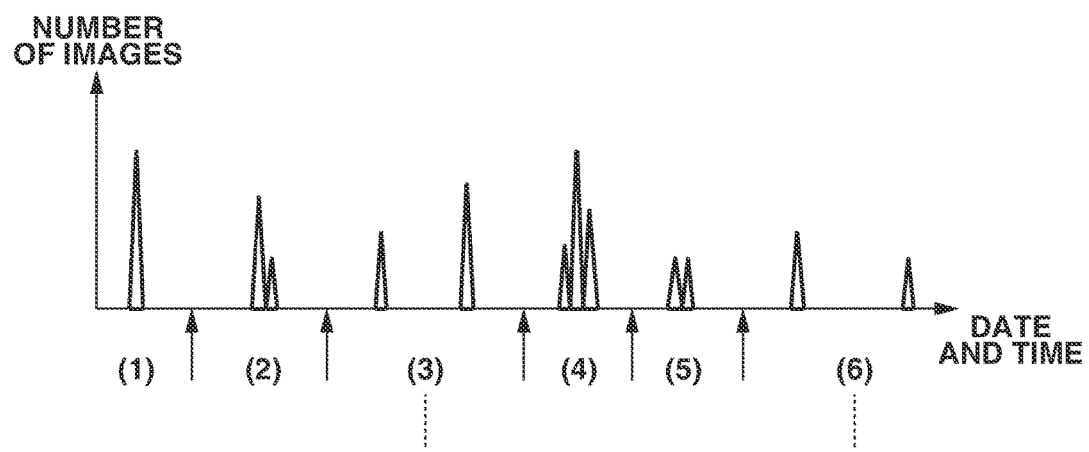

In step S412, the CPU 101 performs scene segmentation via the image classification unit 208. The scene segmentation refers to segmenting all of the pieces of image data acquired in steps S401 to S411 by scenes and managing the segmented pieces of image data as a plurality of image groups. More specifically, the CPU 101 segments all of the pieces of image data into a plurality of image groups based on time differences in image capturing date and time of respective pieces of image data calculated from the image capturing date and time information acquired in step S408. Furthermore, in the following description, each image group obtained by segmenting all of the pieces of image data (main image group) is referred to as a "sub-image group". In the present exemplary embodiment, for example, the CPU 101 performs scene segmentation according to the following method. First, if the difference between the image capturing date and time of the N-th captured image data and the image capturing date and time of the (N+1)-th captured image data in ascending order of the image capturing date and time is equal to or less than one day, the CPU 101 performs the following operation. If the difference between the image capturing date and time of the N-th captured image data and the image capturing date and time of the (N+1)-th captured image data in ascending order of the image capturing date and time is equal to or greater than sixteen hours, the CPU 101 sets a boundary of groups between the N-th captured image data and the (N+1)-th captured image data. Moreover, there may be a case where the difference in image capturing date and time between pieces of captured image data adjacent in ascending order of the image capturing date and time is less than sixteen hours between every piece of captured image data. In this case, if the difference between the image capturing date and time of the first captured image data and the image capturing date and time of the last captured image data in a captured image data group captured in one day is less than four hours, the CPU 101 sets the captured image data group captured in that day as one sub-image group. On the other hand, there may be a case where the difference between the image capturing date and time of the first captured image data and the image capturing date and time of the last captured image data in the captured image data group captured in that day is equal to or greater than four hours. In this case, if the number of pieces of captured image data captured in that day is less than 50 (the number of captured images captured in one day is less than 50), the CPU 101 sets the captured image data group captured in that day as one sub-image group. FIG. 6A illustrates an example of such grouping of pieces of captured image data. In FIGS. 6A to 6C, the abscissa axis indicates image capturing date and time (the more left side being old and the more right side being new), and the ordinate axis indicates the number of pieces of captured image data. Referring to FIG. 6A, the captured image data group is segmented into eight sub-image groups, including groups 601 to 608. In FIG. 6A, each arrow indicates a boundary of groups. Furthermore, the threshold value regarding the difference in image capturing date and time and the threshold value regarding the number of pieces of captured image data used in the above description of the scene segmentation method are merely examples, and are not limited to the above-mentioned values. Furthermore, an image group obtained by segmentation is referred to as a "segmented image group", and one segmented image group is set with respect to every scene.

In step S413, the CPU 101 performs scene classification via the image classification unit 208. More specifically, the CPU 101 performs scoring on the sub-image groups obtained by performing scene segmentation in step S412 by every type of scene, and classifies the sub-image groups into the respective types of scenes with the highest score except a case where the reliability of scene segmentation is low, which is described below. Furthermore, in the following description, the scoring operation in step S413 is referred to as "scene classification scoring". In the present exemplary embodiment, the types of scenes are assumed to include "travel", "daily life", and "ceremony", and an example in which each sub-image group is classified into any one of these scenes is described. Furthermore, scene classification scoring is performed with use of a scene classification table in which information about feature amounts corresponding to the respective types of scenes is stored.

Here, a method for generating the scene classification table, which is previously stored in a program, is described. First, a plurality of image data groups previously determined to be classified into the respective scenes of "travel", "daily life", and "ceremony" is collected by the designer of the program, and feature amounts are acquired with respect to the collected image data groups. Examples of the feature amounts acquired in this instance include an image capturing period, the number of captured images, and the number of persons subjected to image capturing. The image capturing period is an image capturing time difference between the first generated image data and the last generated image data in each image data group. The number of captured images is the number of images in each image data group. The number of persons subjected to image capturing is the average number of faces contained in each image represented by each image data group. As a result, for example, with respect to one image data group including a plurality of pieces of image data previously determined to be a travel scene, the feature amounts, which include an image capturing period, the number of captured images, and the number of persons subjected to image capturing, are acquired. Furthermore, the feature amounts are not limited to an image capturing period, the number of captured images, and the number of persons subjected to image capturing, and other feature amounts can also be used or only any one of these feature amounts can also be used.

Then, the acquisition of feature amounts, such as the above-mentioned image capturing period, the number of captured images, and the number of persons subjected to image capturing, is also performed with respect to previously-collected other image data groups. Next, an average value and a standard deviation of the image capturing period, an average value and a standard deviation of the number of captured images, and an average value and a standard deviation of the number of persons subjected to image capturing per one image are obtained based on the feature amounts acquired from a plurality of image data groups collected for each scene. The values obtained in this way and the respective types of scenes are associated with each other, so that a scene classification table which indicates the average value and standard deviation for each type of scene is generated.

In the present exemplary embodiment, a table 700 illustrated in FIG. 7 is assumed to be used as the scene classification table. In the table 700, an average value and a standard deviation of each of an image capturing period 702, the number of captured images 703, and the number of persons subjected to image capturing 704 are previously registered in association with a scene ID 701. The CPU 101 previously stores the table 700 in a storage region, such as the ROM 102 or the HDD 104, prior to scene classification processing. Furthermore, the table 700 can be previously incorporated in the program of the album creation application, or can be previously incorporated in a program outside the album creation application.

Here, the scene classification scoring is described. After the album creation application is activated, the CPU 101 calculates the scores of the respective feature amounts of the image capturing period, the number of captured images, and the number of persons subjected to image capturing with respect to each of the sub-image groups obtained by scene-segmenting, in step S412, the image data group designated by the user via the path box 302 or the server name box. The CPU 101 calculates the scores and their average scores of the image capturing period, the number of captured images, and the number of persons subjected to image capturing with respect to each sub-image group using the average value and standard deviation for each scene illustrated in FIG. 7 according to the following Formulae (1) and (2). Furthermore, the average value of a predetermined feature amount corresponding to a predetermined type of scene and the standard deviation of the predetermined feature amount corresponding to the predetermined type of scene in the following formulae are registered with the table 700. Moreover, the feature amounts are acquired with respect to three feature items, i.e., the image capturing period, the number of captured images, and the number of persons subjected to image capturing. Therefore, the number of feature items in this example is 3.

First, the CPU 101 calculates the scores of the sub-image groups for the respective types of scenes and the respective feature amounts according to the following Formula (1).

Formula (1)

$$\text{The score of a predetermined feature amount corresponding to a predetermined type of scene in a sub-image group} = 50 - |10 \times (\text{the average value of the predetermined feature amount corresponding to the predetermined type of scene} - \text{the predetermined feature amount in the sub-image group})/\text{the standard deviation of the predetermined feature amount corresponding to the predetermined type of scene}| \quad (1)$$

With this, for example, in a sub-image group, the respective scores of the image capturing period, the number of captured images, and the number of persons subjected to image capturing corresponding to the "travel" scene are acquired. Furthermore, the CPU 101 acquires the scores with respect to not only the "travel" scene but also the other types of scenes.

Next, the CPU 101 averages, according to Formula (2), the respective scores obtained according to Formula (1), thus acquiring the score concerning each type of scene in the sub-image group.

Formula (2)

$$\text{The score concerning a predetermined type of scene in a sub-image group} = (\text{the score of the image capturing period} + \text{the score of the number of captured images} + \text{the score of the number of persons subjected to image capturing corresponding to the predetermined type of scene in the sub-image group})/\text{the number of feature items} \quad (2)$$

With this, for example, in a sub-image group, the scores concerning the respective types of scenes of "travel", "daily life", and "ceremony" are acquired. Furthermore, the CPU 101 performs the scene classification scoring with respect to every sub-image group.

In the above-described way, the respective scores for "travel", "daily life", and "ceremony" are acquired with respect to each sub-image group. Then, the CPU 101 classifies a scene with the score ranking first as the scene of the corresponding sub-image group. For example, a sub-image group 5 corresponding to a scene 5 obtained by scene segmentation illustrated in FIG. 6A is assumed to have the image capturing period being 36 hours, the number of captured images being 300, and the number of persons subjected to image capturing being 1.7. Then, in the sub-image group 5, the score concerning "travel" becomes 45.32, the score concerning "daily life" becomes 18.38, and the score concerning "ceremony" becomes −29.92, so that the sub-image group 5 is classified as "travel", which is a scene with the highest score. Furthermore, which sub-image group is classified as which scene is managed with a scene ID in a discriminable manner. Moreover, in a case where there are the same scores among scores concerning the respective scenes, the CPU 101 classifies a sub-image group as any one of the scenes with the same score according to predetermined ordering of preference. Specifically, the CPU 101 classifies a sub-image group as a scene which is higher in preference among the scenes with the same score. Furthermore, for example, in the present exemplary embodiment, the ordering of preference is assumed to be the order of "daily life">"ceremony">"travel". The ordering of preference is not limited to this order, but, for example, the ordering of preference can be configured to be settable by the user.

In step S414, the CPU 101 determines whether scene segmentation in step S413 has been completed with respect to all of the sub-image groups acquired in step S412. If it is determined that the scene segmentation has not yet been completed (NO in step S414), the processing returns to step S413, in which the CPU 101 performs scene segmentation with respect to a sub-image group that is not yet subjected to scene segmentation. If it is determined that the scene segmentation has been completed (YES in step S414), the processing proceeds to step S415.

In step S415, the CPU 101 performs main character setting via the image scoring unit 210. The main character setting is executed with respect to an image group designated by the user, and is performed according to any one of two, automatic and manual, types of setting methods. The CPU 101 is able to acquire, for example, the number of times of appearance of each personal ID in an image data group, the number of times of appearance of each personal ID in each scene, and the number of times of scenes in which each personal ID appears based on a result of personal recognition performed in step S410 and a result of scene segmentation performed in step S412. In a case where the automatic setting method is selected, the CPU 101 automatically sets a main character based on these pieces of information without depending on a user's designation. In the present exemplary embodiment, in a case where an image data group designated by the user is segmented into a plurality of segmented image data groups for the respective scenes, the CPU 101 sets, as a main character ID, a personal ID with the large number of times of appearance in a plurality of scenes. Furthermore, in a case where the image data group is a single scene, the CPU 101 sets, as a main character ID, a personal ID with the large number of times of appearance in the single scene. Moreover, in a case where the main character designation icon 304 is designated by the user, the CPU 101 transmits a personal ID designated via the main character information input unit 209 to the image scoring unit 210. In a case where a personal ID is designated by the user, the main character ID automatically set in the above-mentioned manner is neglected, and the CPU 101 sets the personal ID designated by the user as a main character ID. Furthermore, this setting is referred to as "manual setting".

In step S416, the CPU 101 performs image scoring via the image scoring unit 210. The image scoring in step S416 refers to assigning a score (scoring) evaluated from a viewpoint described below for each piece of image data, and is referred to at the time of selecting image data representing an image to be laid out in a template as described below. Moreover, in the present exemplary embodiment, with respect to image data acquired by clipping a frame from moving image data, the CPU 101 also assigns a score in consideration of a result of the analysis performed by the moving image analysis unit 203. Here, a scoring method is described with reference to FIGS. 8A and 8B and FIG. 10.

FIG. 10 illustrates a template group for use in layout of image data. Each of a plurality of templates included in the template group corresponds to each double-page spread. A template 1001 is a single template and contains a main slot 1002 and sub-slots 1003 and 1004. The main slot 1002 is a principal slot in the template 1001 (a frame in which an image is laid out (arranged)), and is larger in size than the sub-slots 1003 and 1004. Furthermore, images represented by pieces of image data classified into the same type of scene can be laid out in a single template, or images represented by pieces of image data classified into respective different types of scenes can be laid out in a single template. In step S416, the CPU 101 performs, as image scoring processing, processing for assigning both a score for a main slot and a score for a sub-slot corresponding to a type of scene to which image data belongs, to the image data.

In the image scoring, a slot feature table in which information about feature amounts of images that are to be employed in a main slot and a sub-slot is stored for each type of scene is used.

Here, a method for generating the slot feature table is described. FIG. 8A illustrates a table in which features of pieces of image data that are employed in a main slot and a sub-slot are summarized for each of the types of scenes, "travel", "daily life", and "ceremony". First, among pieces of image data classified into the respective types of scenes, a plurality of pieces of image data determined to conform to image features that are to be employed in main slots are collected by the designer of the program. Moreover, a plurality of pieces of image data determined to conform to image features that are to be employed in sub-slots are also collected. Thus, pieces of image data conforming to the features illustrated in FIG. 8A are collected. Then, feature amounts, such as the number of face images, the position of each face image, and the size of each face image, in each of the collected pieces of image data are extracted by the image analysis unit 207. Then, the average value and the standard deviation of the extracted feature amounts are calculated for each scene type and each slot type (each of a main slot and a sub-slot), so that a slot feature table is generated. Furthermore, the slot feature table is previously stored in a storage region, such as the ROM 102 or the HDD 104, prior to image scoring. Moreover, the slot feature table can be previously incorporated in the program of the album creation application, or can be previously incorporated in a program outside the album creation application.

Furthermore, as illustrated in FIG. 8A, different criteria for scoring are employed according to the respective types of slots. For example, in a case where the scene type of a certain sub-image group is "travel", an image containing a person or landscape among images included in the sub-image group is assigned a high score for a main slot, and an image containing the close-up of a face or the profile of a person is assigned a high score for a sub-slot. Moreover, in a case where the scene type of a certain sub-image group is "daily life", an image containing the close-up of a face or the profile of a person among images included in the sub-image group is assigned a high score for a main slot, and an image containing a person or landscape is assigned a high score for a sub-slot. Additionally, in a case where the scene type of a certain sub-image group is "ceremony", an image containing two persons close in distance among images included in the sub-image group is assigned a high score for a main slot, and an image containing a large number of persons is assigned a high score for a sub-slot. In this way, features used for evaluation, in other words, evaluation criteria, differ according to the types of scenes and slots.

In the image scoring, the CPU 101 performs scoring on image data with respect to each slot in a template corresponding to a type of scene to which the image data belongs, using the following Formula (3). Furthermore, which type of scene each piece of image data of the image data group designated by the user belongs to can be recognized from a result of scene classification performed in step S413. Moreover, in the following Formula (3), the average value of a predetermined feature amount corresponding to a predetermined type of scene and a predetermined slot and the standard deviation of a predetermined feature amount corresponding to a predetermined type of scene and a predetermined slot are previously registered with the slot feature table. Additionally, feature amounts are acquired with respect to three feature items, i.e., the number of face images, the position of each face image, and the size of each image of a main character ID. Therefore, in this example, the number of feature items is 3.

Formula (3)

$$\text{The score concerning a predetermined feature amount corresponding to a predetermined slot, of image data} = 50 - |10 \times (\text{the average value of the predetermined feature amount corresponding to a type of scene to which the image data belongs and the predetermined slot} - \text{the predetermined feature amount of the image data})/\text{the standard deviation of the predetermined feature amount corresponding to the type of scene to which the image data belongs and the predetermined slot}| \quad (3)$$

With this, for example, a score concerning "the number of face images of a main character ID" corresponding to the main slot, of image data classified as the "travel" scene is acquired. Furthermore, the CPU 101 also acquires a score with respect to not only a feature amount corresponding to the main slot but also a feature amount corresponding to the sub-slot. Additionally, the CPU 101 also acquires a score with respect to not only a feature amount corresponding to "the number of face images of a main character ID" but also feature amounts corresponding to "the position of each face image" and "the size of each face image".

Next, the CPU 101 averages, according to Formula (4), the respective scores obtained according to Formula (3), thus acquiring a score concerning a predetermined slot, of image data.

Formula (4)

$$\text{The score concerning a predetermined slot, of image data} = (\text{a score of the number of face images corresponding to a type of scene to which the image data belongs and the predetermined slot} + \text{a score of the position of each face image} + \text{a score of the size of each face image})/\text{the number of feature items} \quad (4)$$

With this, scoring concerning both scores for the main slot and the sub-slot is performed with respect to image data.

In the present exemplary embodiment, besides, the CPU 101 adds a score to the score calculated in the above-described way, based on a mode designated by the album creation condition designation unit 201. More specifically, for example, the CPU 101 adds a score according to the mode designated with the mode designation portion 307 and a result of object classification performed on each piece of image data. For example, in a case where the mode of the album is set to "person", if the category "person" is included in the object classification 505 illustrated in FIG. 5, the CPU 101 adds a score, and, if the category "person" is not included therein, the CPU 101 adds no score. Furthermore, the score to be added at this time can be changed according to the reliability of the category "person" or the order of the reliability. With regard to the mode "animal" or "food", a score is also added in a manner similar to that in the mode "person". Moreover, in a case where a plurality of modes is designated, the CPU 101 adds scores with respect to the respective set modes. More specifically, for example, if the mode of the album is set to "person" and "animal", the CPU 101 adds a score in a case where the category "person" and/or the category "animal" is included in the object classification 505. Additionally, if the category "person" and the category "animal" are included in the object classification 505, the CPU 101 adds both a score that is added in a case where the category "person" is included therein and a score that is added in a case where the category "animal" is included therein.

Furthermore, the CPU 101 performs image scoring with respect to each piece of image data in an image data group designated by the user. The score assigned by the image scoring serves as a selection criterion in image selection processing performed in step S423 in a later stage. As mentioned above, even with respect to the same image data, the selection criterion varies according to scenes into which the image data is classified. Furthermore, since it is desirable that an image to be used for an album be in focus, a predetermined score can be added with respect to an image of the image ID the feature amount of focus of which is "∘" in the table illustrated in FIG. 5. Moreover, since an image with a large number of pixels has little jaggies when being laid out in an album, a predetermined score can be added with respect to image data representing an image with a large number of pixels. With this configuration employed, in image selection processing described below, the CPU 101 is able to select image data representing an image in which an object of the category corresponding to the mode of an album is contained in preference to image data representing an image in which the object is not contained.

FIG. 8B illustrates an example of a result of scores obtained by layout scoring. A table 800 represents a result of scoring respectively performed for the main slot and the sub-slot with respect to image data of each image ID 801, and a score 802 is registered with respect to image data of each image ID 801. For example, in FIG. 8B, image data of image ID "1" is given 20 points for the main slot, and image data of image ID "2" is given 45 points for the main slot. Thus, this indicates that image data of image ID "2" is closer to a criterion for determination by the user with respect to the main slot.

Furthermore, in the present exemplary embodiment, in a case where the score has been set in the above-described way, the CPU 101 adds a score corresponding to a result of analysis performed by the moving image analysis unit 203 to both of the scores for the main slot and for the sub-slot of image data acquired by being clipped from moving image data. More specifically, the CPU 101 adds a score corresponding to scoring processing (object detection, size identification, smile determination, eye closing determination, shake and blur determination, and brightness determination) performed by the moving image analysis unit 203. Moreover, the CPU 101 is able to identify which image data of the pieces of image data subjected to scoring is image data acquired by being clipped from moving image data, by referring to the image attribute 503 in the table illustrated in FIG. 5.

Furthermore, when points are only added to image data acquired by being clipped from moving image data, the score of the image data is likely to become uniformly higher than that of image data acquired from still image data. Therefore, for example, the CPU 101 can subtract the average value of scores added to pieces of image data acquired by being clipped from moving image data from the respective scores of all of the pieces of image data acquired by being clipped from moving image data or can add the average value of the scores to all of the pieces of image data acquired from still image data. With this configuration employed, with respect to image data with a higher score added among pieces of image data acquired by being clipped from moving image data, a score higher than the score added to image data acquired from still image data is added. In other words, scoring is performed in such a manner that image data with a higher score added among pieces of image data acquired by being clipped from moving image data is more preferentially selected.

Furthermore, an evaluation axis used for evaluation performed by the image scoring unit 210 and a score axis used for evaluation performed by the moving image analysis unit 203 are different from each other. More specifically, for example, respective feature amounts used for evaluation are different from each other. Therefore, employing a configuration of adding a score corresponding to a result of analysis performed by the moving image analysis unit 203 enables taking the distinctive appropriateness of image data acquired from moving image data into consideration for scoring. Thus, a difference in the source of acquisition of image data can be reflected in evaluation.

In the present exemplary embodiment, evaluation performed by the image scoring unit 210 is executed with respect to all of the pieces of image data acquired by the image acquisition unit 205. Then, with respect to image data acquired from moving image data among the pieces of image data acquired by the image acquisition unit 205, a score that is based on the evaluation axis for a moving image (based on a result of analysis performed by the moving image analysis unit 203) is added. However, the present exemplary embodiment is not limited to this configuration, but, for example, completely different evaluation axes can be used depending on image data acquired from moving image data and image data acquired from still image data. In other words, the image scoring unit 210 can perform scoring based on only the evaluation axis described above about the image scoring unit 210 with respect to image data acquired from still image data, and can perform scoring based on only the evaluation axis described above about the moving image analysis unit 203 with respect to image data acquired from moving image data.

In step S417, the CPU 101 determines whether the image scoring in step S416 has been completed with respect to all of the pieces of image data acquired by the image acquisition unit 205. If it is determined that the image scoring has not yet been completed (NO in step S417), the processing returns to step S416, in which the CPU 101 performs image scoring on image data that is not yet subjected to the image scoring. If it is determined that the image scoring has been completed (YES in step S417), the processing proceeds to step S418.

In the present exemplary embodiment, the CPU 101 lays out, via the image layout unit 215, images represented by respective pieces of image data included in each of a plurality of scenes in each of a plurality of templates (a plurality of spreads), thus generating a plurality of layout images. Therefore, the number of a plurality of scenes and the number of a plurality of templates (a predetermined number of spreads) may coincide with each other.

Therefore, in step S418, the CPU 101 determines whether the number of scenes (the number of sub-image groups) acquired by scene segmentation in step S412 is equal to the number of spreads input by the number-of-spreads input unit 211 (the number of spreads entered in the number-of-spreads box 305). If it is determined that the number of scenes is not equal to the number of spreads (NO in step S418), the processing proceeds to step S419. If it is determined that the number of scenes is equal to the number of spreads (YES in step S418), the processing proceeds to step S422. For example, if the number of scenes is 8 as illustrated in FIG. 6A and the numeral entered in the number-of-spreads input unit 211 is 8, the processing proceeds to step S422.

In step S419, the CPU 101 determines, via the spread allocation unit 212, whether the number of scenes acquired by scene segmentation in step S412 is less than the number of spreads input by the number-of-spreads input unit 211. If it is determined that the number of scenes is not less (is greater) than the number of spreads (NO in step S419), the processing proceeds to step S421. If it is determined that the number of scenes is less than the number of spreads (YES in step S419), the processing proceeds to step S420. For example, if the number of scenes is 8 as illustrated in FIG. 6A and the numeral entered in the number-of-spreads input unit 211 is 10, the number of scenes is less than the number of spreads, so that the processing proceeds to step S420.

In step S420, the CPU 101 performs sub-scene segmentation via the spread allocation unit 212. The sub-scene segmentation refers to, in the case of "the number of segmented scenes<the number of spreads", further segmenting each scene obtained by scene segmentation. Here, a case where the number of segmented scenes is 8 as illustrated in FIG. 6A while the designated number of spreads is 10 is described. FIG. 6B illustrates a result of sub-scene segmentation performed on the result of scene segmentation illustrated in FIG. 6A. Here, some intervals of segmentation are set to smaller intervals and are divided at portions indicated by dashed arrows, so that the number of segmented scenes is set to 10.

A criterion for segmentation is described. The CPU 101 searches for a segmented portion in which the number of pieces of image data is large among the segmented scenes illustrated in FIG. 6A. Here, to increase the number of segmented scenes by 2 from 8 to 10, the CPU 101 determines two segmented portions in which the number of pieces of image data is large. In other words, the CPU 101 may designate a scene to be further segmented in order from a scene corresponding to a segmented image data group including the largest number of pieces of image data. With regard to scenes corresponding to segmented image data groups including the same number of pieces of image data, the CPU 101 selects one of the scenes larger in the maximum value of differences in the image capturing date and time between pieces of image data included in the corresponding segmented image data group. If no scene is still able to be selected, for example, the CPU 101 can further segment a scene corresponding to a segmented image data group including image data generated at earlier time on a preferential basis.

In FIG. 6A, the scenes in which the number of pieces of image data included in a corresponding segmented image data group is large are scene 5, scene 1, and scene 2 in order from the larger number. Since, while the scenes 1 and 2 are equal in the number of pieces of image data, the scene 2 is larger than the scene 1 in the time difference from image data generated first to image data last generated in the corresponding segmented image data group, the CPU 101 sets the scene 2 as a target for segmentation. Thus, in the case illustrated in FIG. 6A, the CPU 101 segments each of the scene 5 and the scene 2.

First, a method of segmenting the scene 2 is described. The scene 2 has two mountains in the number of pieces of image data, and the pieces of image data included in the two mountains differ in the image capturing date with the respective mountains. Therefore, the CPU 101 segments the scene 2 at a portion indicated by a dashed arrow in FIG. 6B corresponding to a portion at which the image capturing date switches. Next, a method of segmenting the scene 5 is described. The scene 5 has three mountains in the number of pieces of image data, and, as with the scene 2, the pieces of image data included in the three mountains differ in the image capturing date with the respective mountains. While the scene 5 has two portions at which the image capturing date switches, in this case, the CPU 101 segments the scene 5 in units of the image capturing date in such a manner that a difference in number of pieces of image data between the segmented scenes becomes small. Thus, the CPU 101 segments the scene 5 at a portion indicated by a dashed arrow in FIG. 6B.

In the above-described way, the CPU 101 changes the number of segmented image data groups, i.e., the number of scenes, from 8 to 10. Specifically, in re-segmentation of scenes, if pieces of image data differing in the image capturing date are included in the selected scene, segmentation is performed in such a manner that respective image data groups differing in the image capturing date are set as new scenes. Then, if the image capturing date extends across three or more days, segmentation is performed in such a manner that the difference in the number of pieces of image data included in each segmented scene becomes minimum and images with the same image capturing date are included in the same scene. Furthermore, while, here, an example in which segmentation is performed at a portion between different image capturing dates has been described, in a case where the image capturing date of pieces of image data in a scene targeted for segmentation is a single day, segmentation is performed at a portion where the time difference of the image capturing time in the single day becomes maximum. The above-described procedure causes the number of scenes to coincide with the number of spreads. Furthermore, the scenes generated by segmentation can be classified once more, or can take over the classification of scenes obtained before segmentation.

In step S421, the CPU 101 performs scene integration via the spread allocation unit 212. The scene integration refers to, in the case of "the number of segmented scenes>the number of spreads of an album", integrating the segmented scenes (sub-image groups). Specifically, the CPU 101 performs scene integration in such a manner that the number of scenes and the number of spreads coincide with each other. Here, a case where the number of segmented scenes is 8 as illustrated in FIG. 6A while the designated number of spreads is 6 is described as an example. FIG. 6C illustrates a result of scene integration performed on the result of scene segmentation illustrated in FIG. 6A. Scenes before and after a portion indicated by a dashed line are integrated at two places, so that the number of segmented scenes is set to 6.

A criterion for integration is described. First, the CPU 101 detects a scene in which the number of pieces of image data is small among the segmented scenes. Here, to decrease the number of scenes from 8 to 6, the CPU 101 detects two scenes in which the number of pieces of image data is small. In FIG. 6A, the scenes in which the number of pieces of image data included in a corresponding segmented image data group is small are scene 8, scene 3, and scene 7 in order from the smaller number. Furthermore, the scenes 3 and 7 are equal in the number of pieces of image data.

Next, the CPU 101 sets, as a target for integration, the scene 8, in which the number of pieces of image data included in a corresponding segmented image data group is smallest. Next, since the scenes 3 and 7 are equal in the number of pieces of image data included in a corresponding segmented image data group, the CPU 101 selects which scene to set as a target for integration. Here, since the scene 8 adjacent to the scene 7 is a target for integration (since the scene 7 and the scene 8 are to be integrated), the CPU 101 sets the scene 3 as a target for integration.

Next, the CPU 101 determines whether to integrate a sub-image data group targeted for integration with a scene in which the image capturing date and time of image data included in a corresponding segmented image data group is earlier or a scene in which the image capturing date and time thereof is later. At this time, the CPU 101 sets, as a destination for integration, a scene in which the time difference in the image capturing date and time of image data included in a corresponding segmented image data group is smaller among the two scenes adjacent to a scene targeted for integration. Therefore, in the case illustrated in FIG. 6A, with respect to the scene 3, the CPU 101 sets one of the scenes 2 and 4 adjacent thereto as a destination for integration. Here, when a comparison is made of the time difference in the image capturing date and time of image data included in a corresponding segmented image data group between the scene 3 and each of the earlier scene 2 and the later scene 4, the time difference between the scene 3 and the scene 4 is smaller. Therefore, the CPU 101 determines to integrate the scene 3 with the scene 4. Thus, here, scene integration is performed at a portion indicated by a dashed line in FIG. 6C.

In a case where there is only one adjacent scene such as the scene 8, the CPU 101 sets the only one adjacent scene as a destination for integration.

In this way, scene integration is performed with scenes before and after a portion indicated by a dashed line in FIG. 6C. Furthermore, the scene integration includes, for example, updating information indicating image files included in scenes according to the integrated scene. Moreover, while, in the present exemplary embodiment, sub-image groups in which the difference in the image capturing date and time is small are integrated together, the present exemplary embodiment is not limited to this configuration. For example, a sub-image group targeted for integration can be integrated with a sub-image group with a small number of captured images.

In step S422, the CPU 101 performs spread allocation via the spread allocation unit 212. According to steps S418 to S421, the number of sub-image groups and the designated number of spreads are made equal to each other. In the present exemplary embodiment, the CPU 101 performs allocation starting with a sub-image group with the first image capturing date and time to the first spread. Thus, the CPU 101 allocates sub-image groups to the respective double-page spreads of an album in the order of the image capturing date and time. With this, an album in which sub-image groups are arranged in the order of the image capturing date and time can be created. Furthermore, as described below, in one double-page spread, images do not need to be arranged in the order of the image capturing date and time.

In step S423, the CPU 101 performs image selection via the image selection unit 213. Here, an example in which the CPU 101 selects four pieces of image data from a segmented image data group allocated to a certain spread is described with reference to FIGS. 9A, 9B, 9C, 9D, 9E, 9F, 9G, 9H, and 9I. Furthermore, the spread is an area for two pages, but each of the first spread and the last spread is an area for one page.

FIG. 9A illustrates the time difference (segmented image capturing period) in the image capturing date and time between image data with the earliest image capturing date and time and image data with the latest image capturing date and time in a segmented image data group allocated to a spread, in other words, the image capturing period of the segmented image data group. Furthermore, here, selection of pieces of image data is performed in the order of a main slot and a sub-slot. Here, a template corresponding to a spread is assumed to contain one main slot 1002 (FIG. 10). Therefore, image data to be selected as the first piece of image data is image data for the main slot. The CPU 101 selects, as image data for the main slot, image data (1) with the highest score for the main slot assigned in step S416 among pieces of image data corresponding to the segmented image capturing period illustrated in FIG. 9B.

Image data to be selected as the second or subsequent piece of image data is image data for the sub-slot. Selection of the second or subsequent piece of image data is performed according to a method such as that described in the following in such a way as not to concentrate on a part of the segmented image capturing period. First, the CPU 101 divides the segmented image capturing period into two periods as illustrated in FIG. 9C. Next, as illustrated in FIG. 9D, the CPU 101 selects the second piece of image data from pieces of image data generated in a segmented image capturing period (a period indicated by a solid line in FIG. 9D) in which the first piece of image data is not selected. Furthermore, the CPU 101 selects, as the second piece of image data, image data (2) with the highest score for the sub-slot among the pieces of image data generated in the segmented image capturing period in which the first piece of image data is not selected. Next, as illustrated in FIG. 9E, the CPU 101 divides each of the segmented image capturing periods illustrated in FIG. 9D into two periods. Then, as illustrated in FIG. 9F, the CPU 101 selects the third piece of image data from pieces of image data generated in segmented image capturing periods (periods indicated by a solid line in FIG. 9F) in which neither of the first piece of image data and the second piece of image data is selected. Furthermore, the CPU 101 selects, as the third piece of image data, image data (3) with the highest score for the sub-slot among the pieces of image data generated in the segmented image capturing periods in which neither of the first piece of image data and the second piece of image data is selected. Then, the CPU 101 selects, as the fourth piece of image data, image data with the highest score for the sub-slot among pieces of image data generated in a segmented image capturing period in which none of the first piece, the second piece, and the third piece of image data is selected.

Next, an example in which there is no image generated in a segmented image capturing period in which none of the first piece, the second piece, and the third piece of image data is selected and the fourth piece of image data is, therefore, not able to be selected from the segmented image capturing period is described. Here, as illustrated in FIG. 9G, there is assumed to be no image data generated in a segmented image capturing period in which image data is not yet selected (a period indicated by hatched lines in FIG. 9G). In that case, as illustrated in FIG. 9H, the CPU 101 divides each segmented image capturing period into two periods. Next, as illustrated in FIG. 9I, the CPU 101 selects the fourth piece of image data from pieces of image data generated in segmented image capturing periods which are other than the segmented image capturing periods recognized to contain no image data generated therein and in which image data is not yet selected (periods indicated by solid lines in FIG. 9I). Furthermore, the CPU 101 selects, as the fourth piece of image data, image data (4) with the highest score for the sub-slot among the pieces of image data generated in the segmented image capturing periods.

Figure 11:
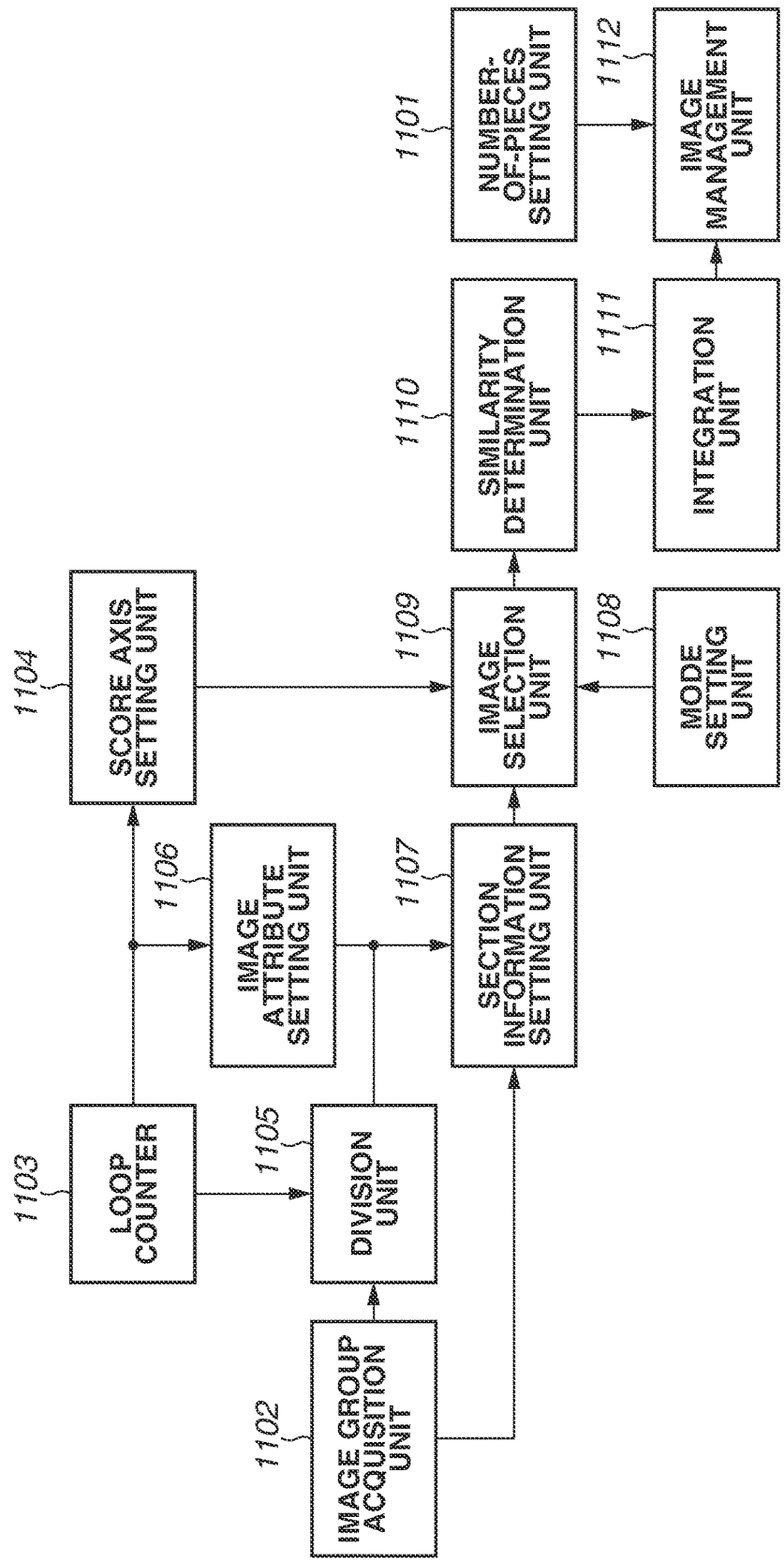
FIG. 11 is a diagram illustrating a configuration of an image selection unit in more detail according to one or more aspects of the present disclosure.

FIG. 11 is a diagram illustrating a configuration of the image selection unit 213 in more detail. The image selection unit 213 selects image data from a sub-image group allocated to a spread targeted for processing.

A number-of-pieces setting unit 1101 sets the number of pieces of image data to be selected from a sub-image group allocated to a spread targeted for processing. In other words, the number-of-pieces setting unit 1101 sets the number of images to be arranged in a layout image for the spread targeted for processing. Furthermore, for example, the number of pieces to be set at this time can be a number set by the user performing inputting, for example, via a setting screen such as that illustrated in FIG. 3, or can be a number previously set for each spread.

An image group acquisition unit 1102 acquires a sub-image group to be allocated to a spread targeted for processing from an image group acquired by the image acquisition unit 205. Moreover, the image group acquisition unit 1102 acquires image capturing date and time information about each piece of image data, information about image types, information about object classification, a score for the main slot, and a score for the sub-slot. The information about image types is able to be acquired by referring to the image attribute 503 illustrated in FIG. 5. Additionally, the information about object classification is able to be acquired by referring to the object classification 505 illustrated in FIG. 5.

A loop counter 1103 manages the number of times processing for selecting image data from a sub-image group acquired by the image group acquisition unit 1102 (image selection processing) was performed. Furthermore, specifically, the image selection processing to be counted by the loop counter 1103 is processing performed in steps S1205 to S1218 (FIG. 12), and the details thereof are described below. The number of times managed thereby is used to determine a score axis that is to be used, and is also used to set into how many image capturing sections to divide the image capturing period of a sub-image group allocated to a spread targeted for processing. Furthermore, in the present exemplary embodiment, since one image to be arranged in a template is selected each time a loop is executed once, the number of times counted by the loop counter 1103 is equal to the number of selected pieces of image data.

A score axis setting unit 1104 sets a score axis that is used for the image selection processing, according to the number of times of processing counted by the loop counter 1103. "Setting a score axis that is used" refers to "setting a score assigned based on which score axis to use", and is here to set any one of a score axis for main slot (an evaluation criterion for main slot) and a score axis for sub-slot (an evaluation criterion for sub-slot). Furthermore, in a case where the number of times of processing counted by the loop counter 1103 is 0, the score axis setting unit 1104 refers to a score assigned based on the score axis for main slot so as to select an image to be arranged in the main slot (a main image). On the other hand, in a case where the number of times of processing counted by the loop counter 1103 is 1 or more, the score axis setting unit 1104 refers to a score assigned based on the score axis for sub-slot so as to select an image to be arranged in the sub-slot (a sub-image). Furthermore, in a case where there is a plurality of main slots, even if the number of times of processing counted by the loop counter 1103 is 1 or more, the score axis setting unit 1104 can also refer to a score assigned based on the score axis for main slot. Moreover, the score axis setting unit 1104 can change a score axis to be set, for example, according to the number of pieces of image data previously selected as image data to be arranged in any one of slots among the slots included in a template (previously-selected image data). In that case, for example, in a case where the number of pieces of previously-selected image data is 0, the score axis setting unit 1104 refers to a score assigned based on the score axis for main slot so as to select an image to be arranged in the main slot (a main image). On the other hand, in a case where the number of pieces of previously-selected image data is 1 or more, the score axis setting unit 1104 refers to a score assigned based on the score axis for sub-slot so as to select an image to be arranged in the sub-slot (a sub-image). Furthermore, even in this configuration, in a case where there is a plurality of main slots, even if the number of pieces of previously-selected image data is 1 or more, the score axis setting unit 1104 can also refer to a score assigned based on the score axis for main slot.

A division unit 1105 divides the image capturing period of a sub-image group acquired by the image group acquisition unit 1102 into a predetermined number of sections. First, the division unit 1105 identifies the image capturing start time and the image capturing end time of a sub-image group allocated to a spread targeted for processing based on image capturing time information about a sub-image group acquired by the image group acquisition unit 1102, thus calculating the image capturing period. More specifically, the division unit 1105 identifies the image capturing time of image data generated earliest and the image capturing time of image data generated latest among the pieces of image data included in the sub-image group, thus calculating the image capturing period. Next, the division unit 1105 divides the calculated image capturing period into a plurality of sections based on the number of times of processing counted by the loop counter 1103. In the present exemplary embodiment, when the number of times of processing counted by the loop counter 1103 is denoted by C, the division unit 1105 is assumed to approximately equally divide the image capturing period into $2^C$ sections. Furthermore, the present exemplary embodiment is not limited to this configuration, but, for example, the division unit 1105 can approximately equally divide the image capturing period into C sections.

An image attribute setting unit 1106 sets the attribute of image data to be selected in the image selection processing, according to the number of times of processing counted by the loop counter 1103. Furthermore, in at least one time of the image selection processing, the present exemplary embodiment is assumed to select image data acquired from moving image data in preference to image data acquired from still image data. Moreover, image data acquired from still image data stored in a local server is image data the attribute of which is "still image", and image data acquired from moving image data stored in a local server is image data the attribute of which is "moving image". With this, a diversity of images can be arranged in an album. Furthermore, image data uploaded onto an SNS server (image data with an attribute of "SNS") is image data that was consciously selected and uploaded by the user, and is likely to be image data which the user likes. Therefore, in at least one time of the image selection processing, the present exemplary embodiment is assumed to select image data with an attribute of "SNS" in preference to image data with an attribute of "still image". Accordingly, in the present exemplary embodiment, in a case where the number of times of processing counted by the loop counter 1103 is 0, the image attribute setting unit 1106 sets "SNS" as the designated attribute in such a manner that image data is selected from pieces of image data with an attribute of "SNS". Then, in a case where the number of times of processing counted by the loop counter 1103 is 1, the image attribute setting unit 1106 sets "moving image" as the designated attribute in such a manner that image data is selected from pieces of image data with an attribute of "moving image". Then, in a case where the number of times of processing counted by the loop counter 1103 is 2 or more, the image attribute setting unit 1106 sets "still image" as the designated attribute in such a manner that image data is selected from pieces of image data with an attribute of "still image". With this configuration employed, the attribute of image data to be arranged in each slot can be controlled. Moreover, in the present exemplary embodiment, image data with an attribute of "SNS" or "moving image" is selected before image data with an attribute of "still image". Therefore, for example, even in a case where there is a few images to be arranged in a template, an image represented by image data with an attribute of "SNS" or "moving image" can be more reliably arranged in a template. Additionally, for example, in a case where the number of times of processing counted by the loop counter 1103 is 2 or more, the image attribute setting unit 1106 can be configured not to set the designated attribute. Furthermore, setting of the attribute of image data to be selected in the image selection processing can be performed, for example, according to the number of pieces of image data previously selected in the image selection processing. For example, in that case, in a case where the number of pieces of image data previously selected in the image selection processing is 0, the image attribute setting unit 1106 sets "SNS" as the designated attribute in such a manner that image data is selected from pieces of image data with an attribute of "SNS". Then, in a case where the number of pieces of image data previously selected in the image selection processing is 1, the image attribute setting unit 1106 sets "moving image" as the designated attribute in such a manner that image data is selected from pieces of image data with an attribute of "moving image". Then, in a case where the number of pieces of image data previously selected in the image selection processing is 2 or more, the image attribute setting unit 1106 sets "still image" as the designated attribute in such a manner that image data is selected from pieces of image data with an attribute of "still image". Additionally, for example, in a case where the number of pieces of image data previously selected in the image selection processing is 2 or more, the image attribute setting unit 1106 can be configured not to set the designated attribute.

Furthermore, the number of times of processing counted by the loop counter 1103 or the attribute corresponding to the number of pieces of image data previously selected is not limited to that in the above-described configuration. In the above description, the attribute of image data is set in the order of "SNS", "moving image", and "still image", but can be set in the order of, for example, "moving image", "SNS", and "still image". Furthermore, there can be such setting as not to designate the attribute of image data. In that case, the designated attribute is expressed as "none" and is set in such a manner that image data with any attribute can be selected. Thus, setting is performed in such a manner that image data is selected not according to the designated attribute but according to setting of a designated object or a score.

Moreover, as mentioned above, there is also a configuration in which, for example, image data with an attribute of "SNS" is distinguished in detail according to whether the image data is the one acquired from still image data (with an attribute of "still image") or the one acquired from moving image data (with an attribute of "moving image"). In that configuration, in a case where the number of times of processing counted by the loop counter 1103 is 0, the image attribute setting unit 1106 sets "SNS" and "moving image" as the designated attribute in such a manner that image data is selected from pieces of image data with an attribute of "SNS" and "moving image". Then, in a case where the number of times of processing counted by the loop counter 1103 is 1, the image attribute setting unit 1106 sets "SNS" and "still image" as the designated attribute in such a manner that image data is selected from pieces of image data with an attribute of "SNS" and "still image". Then, in a case where the number of times of processing counted by the loop counter 1103 is 2, the image attribute setting unit 1106 sets "local" and "moving image" as the designated attribute in such a manner that image data is selected from pieces of image data with an attribute of "local" and "moving image". Then, in a case where the number of times of processing counted by the loop counter 1103 is 3 or more, the image attribute setting unit 1106 sets "local" and "still image" as the designated attribute in such a manner that image data is selected from pieces of image data with an attribute of "local" and "still image". In this way, a configuration in which image data acquired from a local server is selected in preference to image data acquired from an SNS server can be employed.

A section information setting unit 1107 divides pieces of image data included in a sub-image group acquired by the image group acquisition unit 1102 into groups for each section obtained by division performed by the division unit 1105, and acquires information, such as image capturing information and a score, about image data generated in each section.

A mode setting unit 1108 sets a mode (one of "person", "animal", and "food") of the album, which is designated by the album creation condition designation unit 201. The mode setting unit 1108 performs control in such a manner that an image containing an object corresponding to the set mode is arranged in a template.

An image selection unit 1109 performs image selection processing based on the score axis set by the score axis setting unit 1104, the mode set by the mode setting unit 1108, and the score of image data in each section, managed by the section information setting unit 1107. More specifically, the image selection unit 1109 selects one piece of image data with the highest score from among a plurality of pieces of image data included in each section and each representing an image containing a designated object and having the designated attribute. The designated object is set so as to select image data without depending on only a score, and, in a case where the designated object is set, the subsequent image selection processing causes image data representing an image containing the designated object to be selected. For example, in a case where the designated object is an object with a category of "animal", in the subsequent image selection processing, image data representing an image containing an object with a category of "animal" is selected. Furthermore, a plurality of objects can be set as the designated object. Moreover, the image selection unit 1109 does not select the previously-selected image data again. In other words, the image selection unit 1109 selects new image data other than the previously-selected image data.

Furthermore, the score that is referred to at this time is a score assigned based on the score axis set by the score axis setting unit 1104. As mentioned above with reference to FIGS. 9A to 9I, image data is not selected from a section in which there is no image. Moreover, while, in the present exemplary embodiment, one piece of image data with the highest score among pieces of image data each representing an image containing the designated object and having the designated attribute is selected from each section, the present exemplary embodiment is not limited to this configuration. For example, a plurality of pieces of image data with the higher scores among pieces of image data each representing an image containing the designated object and having the designated attribute can be selected from each section. Furthermore, the image selection unit 1109 regards image data which contains a category corresponding to the designated object until the frame TOP3 of the object classification 505 as image data representing an image containing the designated object. Moreover, even if image data contains a category corresponding to the designated object until the frame TOP3 of the object classification 505, in a case where the reliability of the category is equal to or less than a threshold value, the image selection unit 1109 does not need to regard the image data as image data representing an image containing the designated object.

A similarity determination unit 1110 determines whether an image represented by the image data selected by the image selection unit 1109 is similar to an image represented by image data previously selected as image data representing an image to be arranged in a template. If the degree of similarity is equal to or greater than a threshold value, the similarity determination unit 1110 determines that the two images are similar to each other, and, if the degree of similarity is less than the threshold value, the similarity determination unit 1110 determines that the two images are not similar to each other. The image data determined not to be similar is retained, and the image data determined not to be similar is discarded. The similarity determination unit 1110 is able to acquire the degree of similarity between images represented by respective pieces of image data using a known method, such as pattern matching or SHIFT algorithm. For example, in a case where the degree of similarity between images represented by respective pieces of image data is output in the range of 0 to 100, the similarity determination unit 1110 assumes that, as the degree of similarity is closer to 100, the two images resemble each other. Therefore, if the degree of similarity between images represented by respective pieces of image data is equal to or greater than the threshold value, the similarity determination unit 1110 determines that the two images are similar to each other, and, if the degree of similarity between images represented by respective pieces of image data is less than the threshold value, the similarity determination unit 1110 determines that the two images are not similar to each other. Furthermore, the determination threshold value used for similarity determination can be changed according to a difference in the image capturing time between pieces of image data representing images targeted for comparison. For example, in a case where the image capturing time difference is small (for example, 15 seconds or less) due to, for example, continuous image capturing, the determination threshold value can be set to a low value (for example, to 60), and, in the other cases, the determination threshold value can be set to a high value (for example, to 80).

An integration unit 1111 specifies image data representing an image to be arranged in a template from among pieces of image data determined not to be similar by the similarity determination unit 1110. More specifically, the integration unit 1111 selects image data with the highest rank from among the pieces of image data determined not to be similar by the similarity determination unit 1110, and specifies the selected image data as image data representing an image to be arranged in a template. Furthermore, in a case where there is only one piece of image data determined not to be similar by the similarity determination unit 1110, the one piece of image data is selected. Moreover, the present exemplary embodiment is not limited to this configuration, but, for example, a configuration in which image data is selected from a section that is not adjacent to a section including the previously-selected image data can be employed.

An image management unit 1112 manages, as the previously-selected image data, the image data specified by the integration unit 1111 as image data representing an image to be arranged in a template. Moreover, the image management unit 1112 determines whether the number of pieces of previously-selected image data has reached the desired number of pieces of image data set by the number-of-pieces setting unit 1101. Furthermore, the image selection processing is repeated until the number of pieces of previously-selected image data managed by the image management unit 1112 reaches the number of pieces of image data. Additionally, at this time, control is performed in such a way as to prevent the previously-selected image data from being selected again.

While, here, an example in which image data selected as a main image and image data selected as a sub-image contain the same object has been described, a configuration in which such pieces of image data contain the respective different objects can be employed. For example, since, when the loop count is 0, a main image is selected, the designated object can be changed between when the loop count is 0 and when the loop count is other than 0. With this configuration employed, image data selected as a main image and image data selected as a sub-image can contain the respective different objects.

Figure 12B:
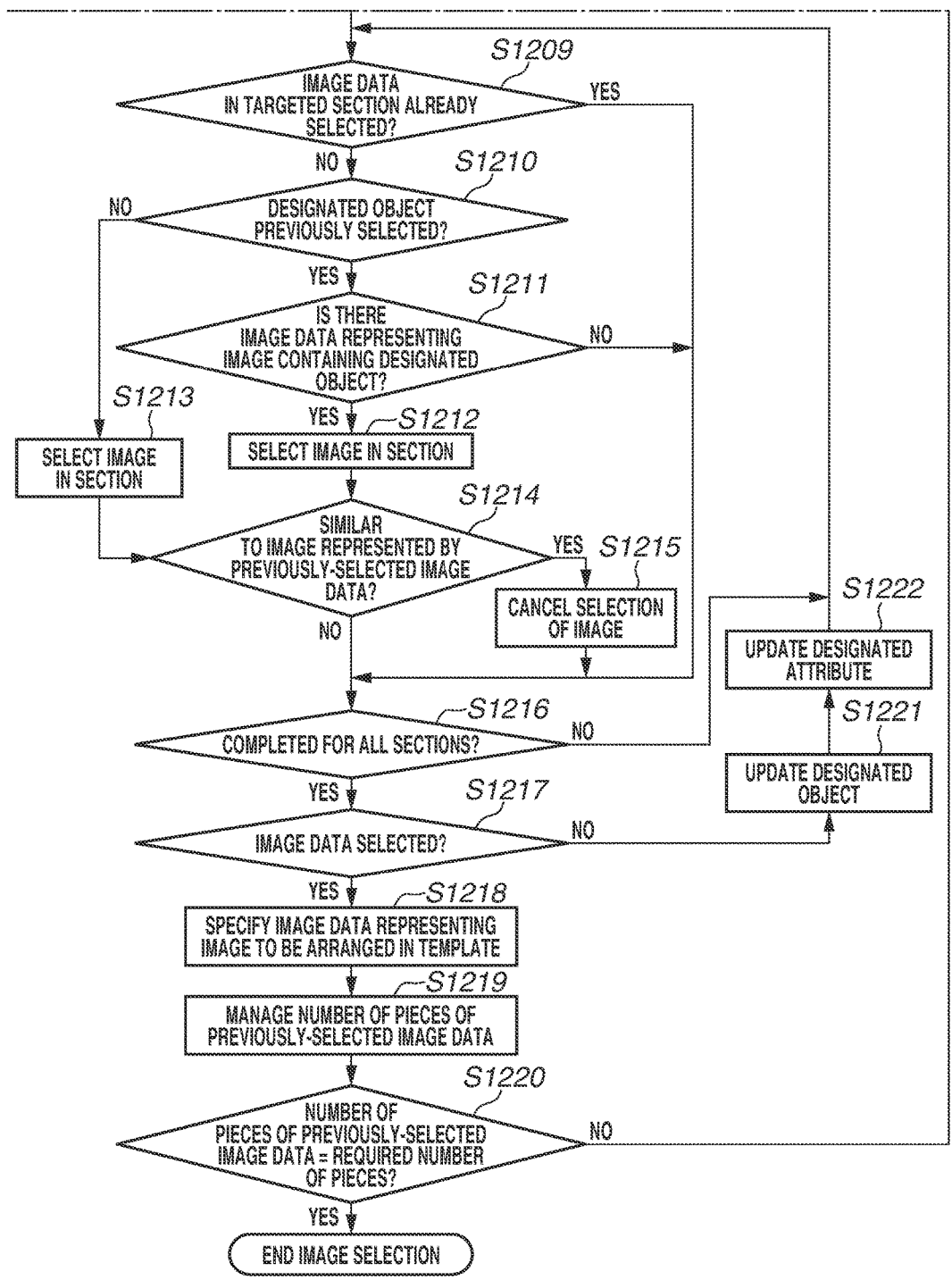
FIG. 12, which is composed of FIGS. 12A and 12B, is a flowchart illustrating details of image selection processing according to one or more aspects of the present disclosure.

FIG. 12, which is composed of FIGS. 12A and 12B, is a flowchart illustrating details of the image selection processing in step S423. The flowchart illustrated in FIG. 12 is implemented, for example, by the CPU 101 loading a program corresponding to the album creation condition stored in the HDD 104 onto the ROM 102 or the RAM 103 and executing the program. In the flowchart of FIG. 12, image data is selected from a sub-image group allocated to one spread targeted for processing. Therefore, in a case where an album is configured with a plurality of spreads, the processing illustrated in the flowchart of FIG. 12 is performed a number of times corresponding to the number of spreads.

In step S1201, the CPU 101 sets, via the number-of-pieces setting unit 1101, the number of pieces of image data to be selected from a sub-image group allocated to a spread targeted for processing. Details of this processing are as described above in the description of the number-of-pieces setting unit 1101.

In step S1202, the CPU 101 acquires, via the image group acquisition unit 1102, a sub-image group allocated to a spread targeted for processing from an image group acquired by the image acquisition unit 205. Details of this processing are as described above in the description of the image group acquisition unit 1102.

In step S1203, the CPU 101 sets the mode of the album via the mode setting unit 1108. Details of this processing are as described above in the description of the mode setting unit 1108. Furthermore, in a case where processing in step S1203 has been performed, the CPU 101 switches the mode of the album to the mode selected in step S1203 and performs the subsequent processing.

In step S1204, the CPU 101 counts, via the loop counter 1103, the number of times the image selection processing in step S423 has been performed. In the initial state, since the image selection processing is not yet performed, the count number counted by the loop counter 1103 is 0. Furthermore, in the present exemplary embodiment, in a case where the count number counted by the loop counter 1103 is 0, a main image is selected in image selection processing performed after that, and, in a case where the count number counted by the loop counter 1103 is 1 or more, a sub-image is selected in the subsequent image selection processing.

In step S1205, the CPU 101 sets, via the score axis setting unit 1104, a score axis to be used in the subsequent image selection processing according to the count number counted by the loop counter 1103. Details of this processing are as described above in the description of the score axis setting unit 1104.

In step S1206, the CPU 101 sets, via the image attribute setting unit 1106, the attribute of image data to be selected in the subsequent image selection processing according to the count number counted by the loop counter 1103. Details of this processing are as described above in the description of the image attribute setting unit 1106.

In step S1207, the CPU 101 divides, via the division unit 1105, the image capturing time of a sub-image group acquired by the image group acquisition unit 1102 into a predetermined number of sections. Details of this processing are as described above in the description of the division unit 1105.

In step S1208, the CPU 101 divides, via the section information setting unit 1107, pieces of image data included in a sub-image group acquired by the image group acquisition unit 1102 into groups for each section managed by the image capturing time of the sub-image group being divided by the division unit 1105. Then, the CPU 101 acquires information, such as image capturing information and a score, about image data generated in each section.

In step S1209, the CPU 101 determines whether image data generated in a targeted section among the sections managed by the image capturing time of the sub-image group being divided by the division unit 1105 has already been selected. If it is determined that image data generated in a targeted section has already been selected (YES in step S1209), the processing proceeds to step S1216. If it is determined that image data generated in a targeted section has not yet been selected (NO in step S1209), the processing proceeds to step S1210. Furthermore, in the first loop, since the image capturing time of the sub-image group has not yet been divided, the targeted section is the entire image capturing period of the sub-image group.

In step S1210, the CPU 101 determines whether the designated object is previously set. For example, in some cases, the designated object is changed to "none" by the update processing of the designated object in step S1221 described below. Therefore, in a case where the CPU 101 determines that the designated object is changed to "none" and, thus, the designated object is not set (NO in step S1210), the processing proceeds to step S1213, and, in a case where the designated object is not changed to "none" and, thus, the designated object is previously set (YES in step S1210), the processing proceeds to step S1211.

In step S1211, the CPU 101 determines whether, among pieces of image data generated in a targeted section, there is image data which represents an image containing the designated object and which has the designated attribute. Furthermore, the CPU 101 is able to perform the determination in step S1211 by referring to the image analysis information 500 about each piece of image data generated in a targeted section. More specifically, the CPU 101 determines whether, with respect to each piece of image data generated in a targeted section, the image data is image data which represents an image containing the designated object and which has the designated attribute. Then, if there is at least one piece of image data determined to be image data which represents an image containing the designated object and which has the designated attribute, the result of the determination in step S1211 becomes YES (YES in step S1211), the processing proceeds to step S1212. Furthermore, the CPU 101 determines that image data in which the category of the designated object is included in the region of the object classification 505 in the image analysis information 500 is image data which represents an image containing the designated object. Moreover, the CPU 101 determines that image data in which the designated attribute is included in the region of the image attribute 503 in the image analysis information 500 is image data which has the designated attribute.

If there is no piece of image data which represents an image containing the designated object and which has the designated attribute, the result of the determination in step S1211 becomes NO (NO in step S1211), the processing proceeds to step S1216 without image data being selected from pieces of image data generated in the targeted section.

Furthermore, the category (type) of the designated object can be changed according to the number of times of processing counted by the loop counter 1103 or the number of pieces of previously-selected image data. In the present exemplary embodiment, in a case where the number of times of processing counted by the loop counter 1103 is an initial value (0), the object of the category corresponding to the mode set in step S1203 is assumed to remain until the designated object is changed in step S1221.

In step S1212, the CPU 101 selects one piece of image data from pieces of image data generated in a targeted section. Details of this processing are as described above in the description of the image selection unit 1109. Furthermore, here, one piece of image data with the highest score is selected from among pieces of image data each of which represents an image containing the designated object and each of which has the designated attribute. Therefore, in the present exemplary embodiment, for example, image data which represents an image containing the designated object and which has a low score would be selected in preference to image data which represents an image not containing the designated object and which has a high score. Moreover, in the present exemplary embodiment, for example, image data which has the designated attribute but has a low score would be selected in preference to image data which does not have the designated attribute but has a high score. Therefore, in a case where "SNS" is set as the designated attribute, image data acquired from an SNS server would be selected in preference to image data acquired from other than SNS servers.

In this way, the present exemplary embodiment does not select image data by merely referring to a score, but selects image data by referring to the designated object and the designated attribute. With this configuration employed, if there is image data conforming to a condition in a sub-image group, the present exemplary embodiment is able to more reliably select image data which represents an image containing the designated object. Furthermore, in the present exemplary embodiment, in a case where the number of times of processing counted by the loop counter 1103 is 0, the designated object is an object of the category corresponding to the mode set by the user. Therefore, the CPU 101 is able to output a layout image generated by arranging an image containing an object of the category corresponding to the mode set by the user in a template in preference to an image which does not contain the object. In other words, the present exemplary embodiment is able to more reliably output a layout result in which an image containing an object of the category corresponding to the mode set by the user is laid out. Moreover, if there is image data conforming to a condition in a sub-image group, the present exemplary embodiment is able to more reliably select image data of the designated attribute, and is also able to more reliably output a layout result in which an image represented by the image data of the designated attribute is laid out.

Furthermore, the CPU 101 is able to identify whether an image represented by each piece of image data contains the designated object or identify the attribute or score of each piece of image data by referring to the image analysis information 500 about each piece of image data. In other words, if information indicating that the image contains the designated object (information about the category corresponding to the designated object) is included in the image analysis information 500, the CPU 101 is able to identify that the image represented by the image data contains the designated object. Moreover, if information indicating that the image data has the designated attribute (information about the designated attribute) is included in the image analysis information 500, the CPU 101 is able to identify that the image data has the designated attribute. Therefore, in step S1212, the CPU 101 selects image data in which the category of the designated object is included in the region of the object classification 505 of each piece of image data generated in a targeted section and the designated attribute is included in the region of the image attribute 503 thereof.

In step S1213, the CPU 101 selects one piece of image data from pieces of image data generated in a targeted section. Furthermore, here, since the designated object is not previously set, the designated object is not referred to. Therefore, one piece of image data with the highest score is selected from among pieces of image data only with the designated attribute.

Moreover, in steps S1212 and S1213, if there is no image data conforming to a condition, any piece of image data is not selected, and the processing proceeds to a next step.

In step S1214, the CPU 101 determines whether an image represented by image data selected in the processing in step S1212 or S1213 is similar to an image represented by image data previously selected in the processing in step S1218 described below in the previous loop. Details of this processing are as described above in the description of the similarity determination unit 1110. If it is determined that the two images are not similar to each other (NO in step S1214), the processing proceeds to step S1216 while the CPU 101 maintains the selection performed in step S1212 or S1213. If it is determined that the two images are similar to each other (YES in step S1214), then in step S1215, the CPU 101 cancels the selection performed in step S1212 or S1213, in other words, does not retain the image data selected in step S1212 or S1213, and the processing proceeds to step S1216. Furthermore, in a case where any piece of image data is not selected, the processing in step S1214 is omitted, and the processing proceeds to step S1216.

In step S1216, the CPU 101 determines whether all of the sections managed with the image capturing time of the sub-image group divided by the division unit 1105 have been targeted and the processing in step S1212 or S1213 has been performed with respect thereto. If it is determined by the CPU 101 that all of the sections have been targeted and the image selection processing has been performed with respect thereto (YES in step S1216), the processing proceeds to step S1217. On the other hand, if it is determined that not all of the sections have been targeted and the image selection processing has not been performed with respect thereto (NO in step S1216), the CPU 101 selects one of sections that have not yet been targeted and then performs the processing in step S1209 and subsequent steps again.

In step S1217, the CPU 101 determines whether at least one piece of image data has been selected by all of the sections having been targeted and the image selection processing having been performed with respect thereto. If it is determined by the CPU 101 that at least one piece of image data has been selected (YES in step S1217), the processing proceeds to step S1218, and, if any one piece of image data is not selected (NO in step S1217), the processing proceeds to step S1221.

In step S1221, the CPU 101 performs updating of the designated object. Furthermore, the content of the designated object obtained after updating is not specifically limited, but can be set as appropriate. For example, the designated object can be updated according to the previously set ordering of preference, or an object which is predominantly contained in a plurality of images represented by a sub-image group allocated to a spread targeted for processing can be updated as the designated object. Moreover, setting of the designated object can be set to "none". Additionally, in a case where updating is not necessary (in a case where the image selection processing is performed with the use of the same designated object as last time), the processing in step S1221 can be omitted.

In step S1222, the CPU 101 performs updating of the designated attribute. Furthermore, the designated attribute obtained after updating can be set as appropriate. For example, the designated attribute can be updated according to the previously set ordering of preference, or an attribute which is predominantly contained in a plurality of images represented by a sub-image group allocated to a spread targeted for processing can be updated as the designated attribute. Moreover, setting of the designated attribute can be set to "none". Additionally, in a case where updating is not necessary (in a case where the image selection processing is performed with the use of the same designated attribute as last time), the processing in step S1222 can be omitted. After that, the processing proceeds to step S1209, and the image selection processing is performed based on the information updated in step S1221 or S1222.

In this way, since, if at least one of steps S1221 and S1222 is performed, conditions of image data targeted for searching are changed, it becomes possible for the CPU 101 to select new image data. Furthermore, in a case where updating of information in step S1221 or S1222 has been performed, the CPU 101 treats a section already targeted with the use of information obtained before updating as a section that is not yet targeted, and performs the processing in step S1209 and subsequent steps again.

Furthermore, in the present exemplary embodiment, in a case where it is determined in step S1217 that any one piece of image data is not selected, first of all, the CPU 101 does not update the designated object but updates the designated attribute to re-perform the image selection processing. Then, in a case where any one piece of image data is not selected even after repetition of updating of the designated attribute, the CPU 101 performs updating of the designated object.

In step S1218, the CPU 101 specifies, via the integration unit 1111, image data representing an image to be arranged in a template from among pieces of image data determined not to be similar in step S1214 and remaining selected. Details of this processing are as described above in the description of the integration unit 1111.

In step S1219, the CPU 101 manages, via the image management unit 1112, the image data specified as the image data representing an image to be arranged in a template in step S1218, as previously-selected image data. Details of this processing are as described above in the description of the image management unit 1112.

In step S1220, the CPU 101 determines whether the number of pieces of previously-selected image data managed by the image management unit 1112 has reached the desired number of pieces of image data set by the number-of-pieces setting unit 1101. If it is determined that the number of pieces of previously-selected image data has reached the number of pieces of image data (YES in step S1220), the CPU 101 ends the image selection processing, and, then, the processing proceeds to step S424. On the other hand, if it is determined that the number of pieces of previously-selected image data has not reached the required number of pieces of image data (NO in step S1220), the processing returns to step S1204, in which the CPU 101 increments counting by the loop counter 1103, thus re-performing the image selection processing. When counting is incremented and the value of the number of times of processing C increases, the image capturing period is divided into a larger number of sections than last time. In the present exemplary embodiment, specifically, the image capturing period of a sub-image group is divided into a number of sections twice as large as last time. More finely managing sections enables selecting image data that is not selected last time in step S1211. Moreover, in the present exemplary embodiment, since image data is not selected from a section including previously-selected image data, image data generated at the date and time close to the image capturing date and time of the previously-selected image data is not likely to be selected. Therefore, a diversity of pieces of image data can be selected.

Referring back to FIG. 4, in step S424, the CPU 101 acquires, via the template setting unit 214, a plurality of templates corresponding to the template information designated by the album creation condition designation unit 201.

In step S425, the CPU 101 determines an image layout of a spread targeted for processing via the image layout unit 215. At this time, first, the CPU 101 determines a template suitable for image data selected in step S423 from among the plurality of templates acquired in step S424. A method for determining the template is described with reference to FIG. 13 and FIG. 14.

Figure 13:
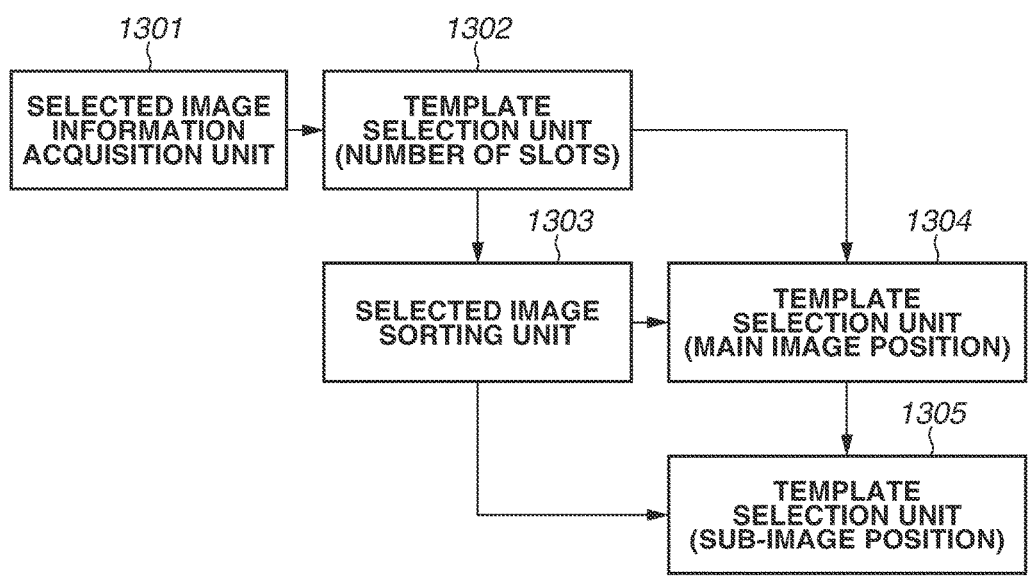
FIG. 13 is a block diagram of software for managing processing for determining a template in the first exemplary embodiment according to one or more aspects of the present disclosure.

FIG. 13 is a block diagram of software functioning to perform processing for determining a template, which is stored in the album creation application in the present exemplary embodiment.

A selected image information acquisition unit 1301 acquires the number of pieces of image data selected in step S423 and information about the image data. The information about image data refers to, for example, the width and height of an image represented by the image data, image capturing date and time information about the image data, and a score of the image data.

A template selection unit 1302 selects a template having slots the number of which coincides with the number of pieces of image data selected in step S423, from among the templates acquired in step S424.

A selected image sorting unit 1303 sorts the pieces of image data selected in step S423 in order of the image capturing date and time.

A template selection unit 1304 selects a template suitable for a main image from among the templates selected by the template selection unit 1302. In the present exemplary embodiment, image data with the earlier image capturing date and time is assumed to be laid out in a slot closer to the upper left corner of a template, and image data with the later image capturing date and time is assumed to be laid out in a slot closer to the lower right corner of the template. Therefore, first, the template selection unit 1304 selects a template in which the position of a main slot corresponds to the order of the image capturing date and time of image data representing a main image, from among the templates selected by the template selection unit 1302. More specifically, for example, in a case where the order of the image capturing date and time of image data representing a main image is the third, a template in which the main slot is the third slot from left of all of the slots is selected. Furthermore, since pieces of image data are sorted by the selected image sorting unit 1303 in order of the image capturing date and time, the template selection unit 1304 is able to recognize the order of the image capturing date and time of image data representing a main image. Moreover, the template selection unit 1304 finally selects a template in which the aspect ratio of a slot to be used for arranging a main image therein coincides with (or is close to) the aspect ratio of the main image, from among the templates selected in the above-mentioned way.

A template selection unit 1305 selects a template suitable for a sub-image from among the templates selected by the template selection unit 1304. More specifically, first, the template selection unit 1305 selects a template in which the position of a sub-slot corresponds to the order of the image capturing date and time of image data representing a sub-image. Moreover, the template selection unit 1305 finally selects a template in which the aspect ratio of the sub-slot coincides with (or is close to) the aspect ratio of the sub-image, from among the templates selected in the above-mentioned way.

Figure 14:
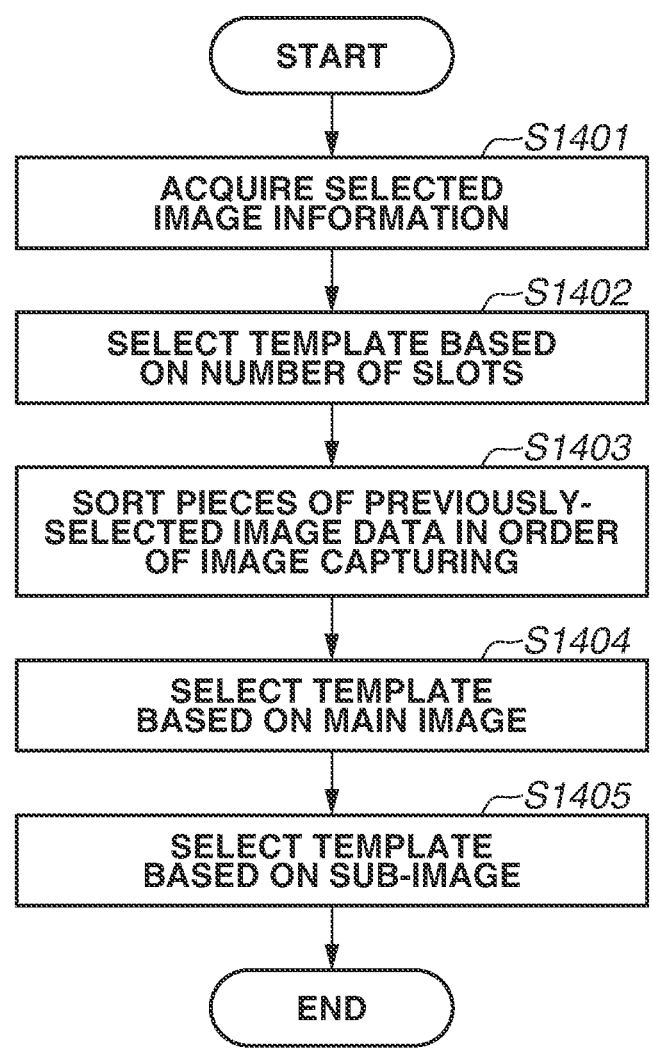
FIG. 14 is a flowchart illustrating processing for determining a template which is used to generate a layout image in the first exemplary embodiment according to one or more aspects of the present disclosure.

FIG. 14 is a flowchart illustrating processing for determining a template to be used for generating a layout image in the present exemplary embodiment. The flowchart illustrated in FIG. 14 is implemented, for example, by the CPU 101 loading a program corresponding to the album creation application stored in the HDD 104 onto the ROM 102 or the RAM 103 and executing the program.

First, in step S1401, the CPU 101 acquires, via the selected image information acquisition unit 1301, the number of pieces of image data selected in step S423 and information about the selected pieces of image data. Furthermore, here, the number of pieces of image data selected in step S423 is assumed to be 3. Details of this processing are as described above in the description of the selected image information acquisition unit 1301.

In step S1402, the CPU 101 selects, via the template selection unit 1302, a template having slots the number of which coincides with the number of pieces of image data selected in step S423. Furthermore, since the number of pieces of image data selected in step S423 is 3, a template having slots the number of which is 3 is selected. Here, as a template having slots the number of which is 3, templates (1-1) to (4-4) illustrated in FIG. 10 are assumed to be selected.

In step S1403, the CPU 101 sorts, via the selected image sorting unit 1303, the pieces of image data selected in step S423 in order of the image capturing date and time. Furthermore, here, the image capturing date and time of each of images respectively represented by three pieces of image data is assumed to be in such order as indicated by arrow (A) illustrated in FIG. 10. Moreover, here, an image 1005 is assumed to be an image for main slot (a main image), and each of an image 1006 and an image 1007 is assumed to be an image for sub-slot (a sub-image).

In step S1404, the CPU 101 selects, via the template selection unit 1304, a template suitable for a main image from among the templates selected by the template selection unit 1302. Details of this processing are as described above in the description of the template selection unit 1304. As mentioned above, in the present exemplary embodiment, image data with the earlier image capturing date and time is assumed to be laid out in a slot closer to the upper left corner of a template, and image data with the later image capturing date and time is assumed to be laid out in a slot closer to the lower right corner of the template. Then, since the image 1005, which is a main image, is an image the image capturing date and time of which is latest and which is portrait-oriented, here, templates (3-1) to (3-4) illustrated in FIG. 10 are selected.

In step S1405, the CPU 101 selects, via the template selection unit 1305, a template suitable for a sub-image from among the templates selected in step S1404. Details of this processing are as described above in the description of the template selection unit 1305. The image 1006, which is a sub-image, is an image the image capturing date and time of which is earliest and which is portrait-oriented. Moreover, the image 1007, which is a sub-image, is an image the image capturing date and time of which is the second latest and which is landscape-oriented. Therefore, a template (3-2) illustrated in FIG. 10 is selected. Furthermore, at this time, in which sub-slot which sub-image is arranged is also specified.

In this way, in step S425, the CPU 101 determines a template to be used for generating a layout image and determines in which slot of the template which image to lay out. More specifically, the CPU 101 manages information about the slots included in the selected template and pieces of image data corresponding to images to be laid out in the respective slots, in association with each other.

In step S426, the CPU 101 performs image correction via the image correction unit 217. Furthermore, the CPU 101 performs image correction in a case where the setting of turning-on of image correction is input from the correction condition input unit 216. Examples of the image correction to be performed include luminance correction, red-eye correction, and contrast correction. Moreover, in a case where the setting of turning-off of image correction is input from the correction condition input unit 216, the CPU 101 does not perform image correction. The image correction is also able to be performed to, for example, image data which has 1,200 pixels along the short side and which has been converted into a color space of sRGB.

In step S427, the CPU 101 generates layout information via the layout information output unit 218. More specifically, the CPU 101 manages information about the slots of the template selected in step S425 and pieces of image data corresponding to the respective slots, to which the image correction in step S426 has been performed, in association with each other. Furthermore, images to be used here are images different from the converted images generated in step S407 and used in steps S408 to S417. Then, the CPU 101 generates bitmap data in which the images are laid out in the template. At this time, when performing layout, the CPU 101 causes the magnification of each image subjected to layout to be changed or unchanged in conformity with the size information about each corresponding slot.

In step S428, the CPU 101 determines whether the processing in steps S423 to S427 has been completed with respect to all of the spreads. If it is determined that the processing has not yet been completed (NO in step S428), the processing returns to step S423, and, then, the CPU 101 performs the processing in steps S423 to S427 with respect to a spread that is not yet targeted for processing. If it is determined that the processing has been completed (YES in step S428), the automatic layout processing ends.

When the automatic layout processing ends, the CPU 101 displays, on the display 105, a layout image in which images are arranged in a template, based on the generated layout information. Furthermore, at this time, the CPU 101 can display a plurality of layout images used to create one album. Moreover, the CPU 101 can transmit the generated layout information to a printer, thus printing a layout image.

In this way, in the present exemplary embodiment, the CPU 101 changes images to be used for layout according to the mode of an album designated by the user. More specifically, the CPU 101 arranges, into at least one slot, an image which contains an object corresponding to the mode of an album designated by the user in preference to an image which does not contain the object. With this, a layout image containing an object corresponding to the mode of an album designated by the user can be generated. Furthermore, in the present exemplary embodiment, the method for scoring or selection of image data acquired by being clipped from a moving image is changed according to the amount of motion or the score acquired during analysis of the moving image. This enables performing image selection using a result of analysis of a moving image and reflecting the distinctive appropriateness of a moving image in a layout.

<Editing of Album>

When the automatic layout processing ends, the CPU 101 displays a layout image generated for each spread on the display 105. In the present exemplary embodiment, the user is assumed to be allowed to optionally edit a completed layout image. For example, in a case where there is an image which the user desires to change among images arranged in the respective slots, the user clicks on the image which the user desires to change with the mouse 107. After that, the user selects an image to be arranged instead of the image which the user desires to change, so that the image optionally selected by the user can be newly arranged instead of the clicked-on image.

Figure 20:
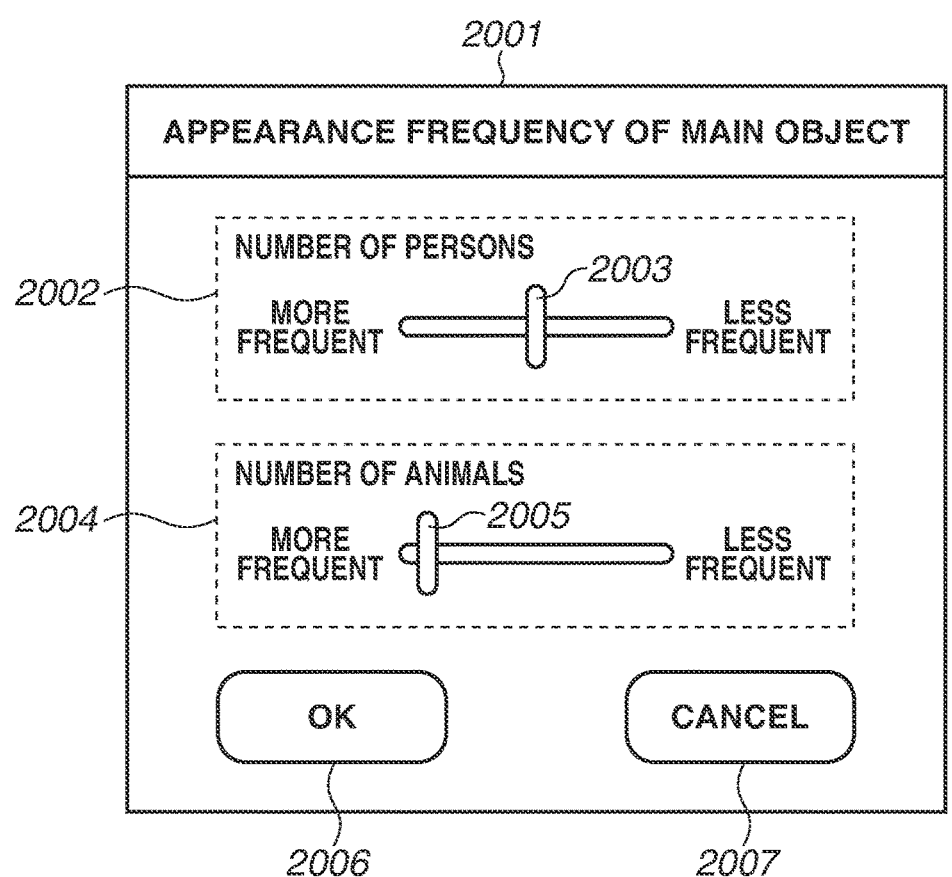
FIG. 20 is a diagram illustrating a screen used to adjust an appearance frequency of each object contained in an album obtained after editing according to one or more aspects of the present disclosure.

Furthermore, in the present exemplary embodiment, a UI 2001, which is used to adjust the appearance frequency of each object in an album to be obtained after editing, such as that illustrated in FIG. 20, is displayed in an editing screen for a layout image. Furthermore, such an editing screen is provided by the album creation application. In the UI 2001, content corresponding to the mode of the generated album (an album obtained before editing) is displayed. More specifically, a bar used to adjust the appearance frequency of an image containing an object corresponding to the mode of an album (the frequency at which the image is selected as an image to be arranged in a template) in the album to be obtained after editing is displayed. For example, in a case where the mode of the generated album is "animal", a bar 2004 used to adjust the appearance frequency of an image containing an object of "animal" in the album to be obtained after editing is displayed. Furthermore, in the present exemplary embodiment, a bar 2002 used to adjust the appearance frequency of an image containing an object of "person" in the album to be obtained after editing is assumed to be displayed irrespective of the mode of the album. Moreover, while, in the present exemplary embodiment, a bar used to adjust the appearance frequency of an image containing an object of other than "person" is configured to be displayed only in a case where the mode of the album is other than "person", the present exemplary embodiment is not limited to this configuration. For example, a configuration in which such a bar is also displayed irrespective of the mode of the album can be employed.

Hereinafter, a method for editing an album using the UI 2001 is described in detail. Here, the method is described with a case where the mode of the generated album is "animal" taken as an example.

The user is allowed to adjust the appearance frequency of an image containing an object corresponding to each bar in the album to be obtained after editing, by performing inputting to move a handle 2003 or a handle 2005. In the present exemplary embodiment, three types of setting values, i.e., "more frequent" (maximum value), "normal" (intermediate value), and "less frequent" (minimum value), are previously prepared, and the appearance frequency of each image is adjusted according to the setting value corresponding to the user's input (the setting value corresponding to the position of the handle 2003 or the handle 2005). When an OK button 2006 is pressed by the user, an album is edited based on the set condition. Thus, the automatic layout processing is performed again based on the set condition. Specifically, the processing in steps S416 to S428 is re-performed. Furthermore, at this time, various pieces of information acquired in the processing in steps S401 to S415 during creation of the album obtained before editing are used again as appropriate. When a cancel button 2007 is pressed by the user, the adjustment of the appearance frequency is canceled, so that the UI 2001 is closed. Moreover, for example, in the automatic layout processing to be performed again, the processing in steps S423 to S428 can be re-performed. In this case, in the image selection processing in step S423, a score assigned in step S416 during creation of the album obtained before editing is referred to.

Furthermore, the method for setting the appearance frequency of an image containing an object corresponding to each bar is not limited to the above-described configuration. For example, a configuration in which a setting value is selected from a pull-down list can be employed. Moreover, the setting values can be not "more frequent", "normal", and "less frequent" but, for example, numerals, marks, or other expressions. Additionally, the setting values are not limited to three types, the maximum value, the intermediate value, and the minimum value, but can be more finely classified setting values.

FIG. 21 is a diagram illustrating a single double-page layout image in an album obtained after editing in each setting value.

An area 2104 indicates the type of an image to be arranged in the main slot, and areas 2105 and 2106 respectively indicate the types of images to be arranged in the sub-slots. Indication "person+animal" indicates an image which contains both objects of person and animal. Indication "person" indicates an image which contains an object of person but does not contain an object of animal. Indication "animal" indicates an image which contains an object of animal but does not contain an object of person. Indication "thing" indicates an image which contains neither of objects of person and animal.

As indicated in a table 2101, in a case where both the setting value of "person" and the setting value of "animal" are "more frequent", all of the images included in the layout image are images of the type "person+animal". Moreover, in a case where the setting value of "person" is "normal" and the setting value of "animal" is "more frequent", an image of the type "person+animal" is arranged in the main slot and images of the type "animal" are arranged in the respective sub-slots. Additionally, in a case where the setting value of "person" is "less frequent" and the setting value of "animal" is "more frequent", all of the images included in the layout image are images of the type "animal".

Furthermore, in a case where the setting value of "person" is "more frequent" and the setting value of "animal" is "normal", an image of the type "person+animal" is arranged in the main slot and images of the type "person" are arranged in the respective sub-slots. Moreover, in a case where the setting value of "person" is "more frequent" and the setting value of "animal" is "less frequent", all of the images included in the layout image are images of the type "person".

Furthermore, in a case where both the setting value of "person" and the setting value of "animal" are "normal", an image of the type "person+animal" is arranged in the main slot and an image of the type "person" and an image of the type "animal" are arranged in the respective sub-slots. Moreover, in a case where the setting value of "person" is "normal" and the setting value of "animal" is "less frequent", an image of the type "person" is arranged in the main slot and images of the type "thing" are arranged in the respective sub-slots. Additionally, in a case where the setting value of "person" is "less frequent" and the setting value of "animal" is "normal", an image of the type "animal" is arranged in the main slot and images of the type "thing" are arranged in the respective sub-slots. Besides, in a case where both the setting value of "person" and the setting value of "animal" are "less frequent", all of the images included in the layout image are images of the type "thing".

Furthermore, the types of images to be arranged in the respective patterns are not limited to those of the configuration described above, but the types of images to be arranged in the respective patterns only need to be different from one another.

For example, a slot in which the type of an image to be arranged is not set can be included in the layout image. In that case, any type of image can be arranged in the slot, and, for example, an image with the highest score among the images that are not yet selected is arranged therein.

Moreover, while, in FIG. 21, the types of templates to be used for generating a layout image in each pattern are the same, the present exemplary embodiment is not limited to this configuration. Since pieces of image data to be selected in each pattern are different, a template suitable for the selected image data can be selected as appropriate in each pattern.

In the above-described way, in the present exemplary embodiment, the numbers of respective objects included in an album obtained after editing can be changed according to the respective setting values of objects set by the user. In other words, the proportion in which each object is included in a plurality of images included in the layout image obtained after editing can be changed according to a combination of the respective setting values of objects set by the user. Furthermore, in the present exemplary embodiment, not only an image itself can be changed, but also the types of images included in the album obtained after editing can be changed. In other words, an album can be created in such a manner that different types of images are included therein according to the respective setting values of objects set by the user.

Figure 16:
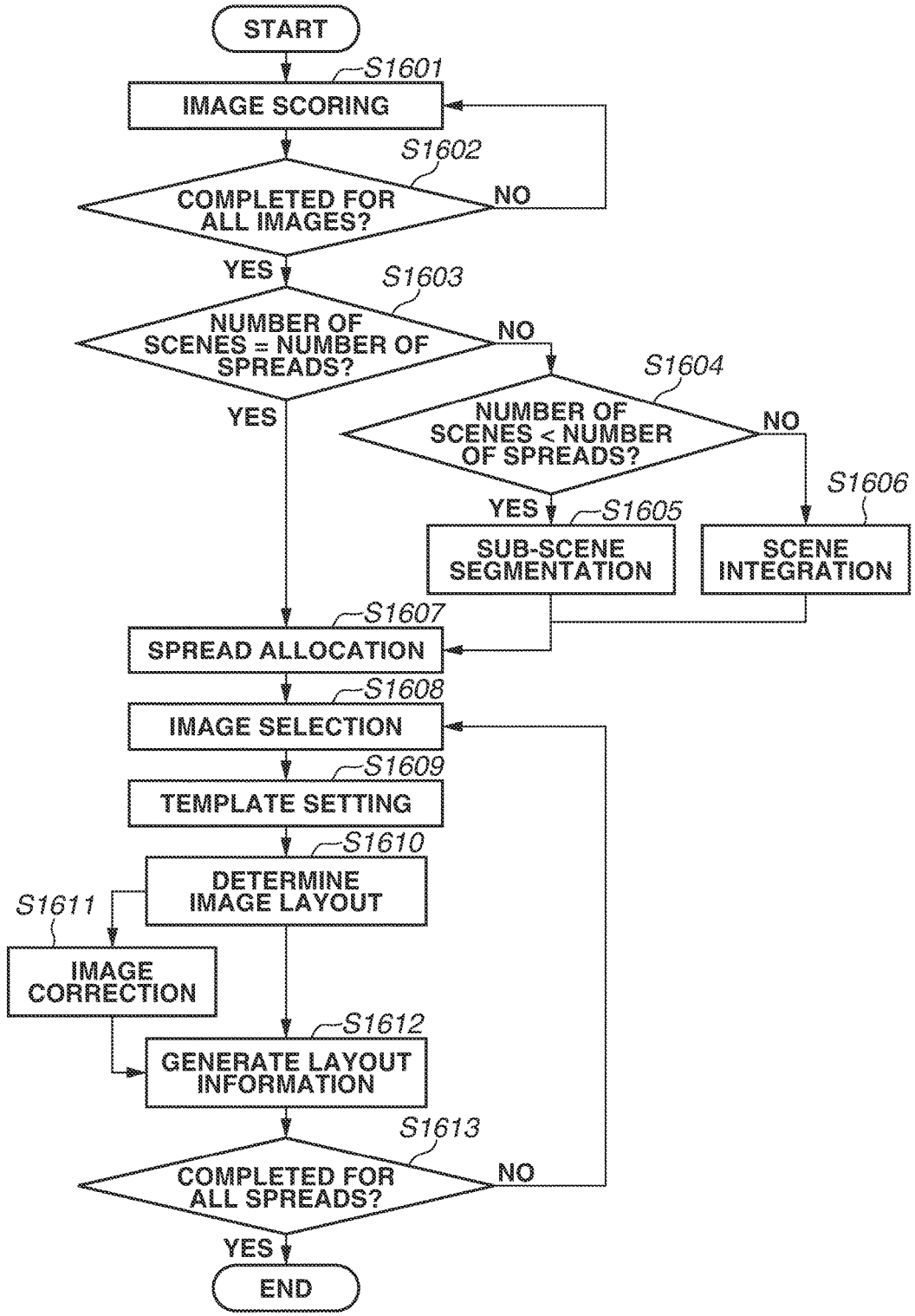
FIG. 16 is a flowchart illustrating processing which is performed at the time of re-layout of an album according to one or more aspects of the present disclosure.

FIG. 16 is a flowchart illustrating processing that is performed during re-layout of an album. The flowchart illustrated in FIG. 16 is implemented, for example, by the CPU 101 loading a program corresponding to the album creation application stored in the HDD 104 onto the ROM 102 or the RAM 103 and executing the program. The processing illustrated in the flowchart of FIG. 16 is started when, after receiving inputting of the editing content from the user via the screen of the UI 2001, the CPU 101 receives a re-layout instruction (an editing instruction) for an album from the user (when the OK button 2006 is pressed). Furthermore, during re-layout of an album, the designated object is changed according to the setting value set via the UI 2001.

In step S1601, the CPU 101 performs, via the image scoring unit 210, image scoring according to the editing content received from the user via the UI 2001. More specifically, the CPU 101 increases or decreases the scores assigned to the respective pieces of image data in the above-mentioned image scoring method described in the description of step S416 according to the setting values of the respective categories. For example, the CPU 101 adds a predetermined score to the score of image data containing an object of the category with a setting value of "more frequent", and subtracts a predetermined score from the score of image data containing an object of the category with a setting value of "less frequent". Furthermore, the CPU 101 does not increase or decrease the score of image data containing an object of the category with a setting value of "normal".

Processing in steps S1602 to S1607 is similar to the processing in steps S417 to S422, and is, therefore, omitted from description.

In step S1608, the CPU 101 performs image selection via the image selection unit 213. Image selection processing performed during re-layout is described with reference to FIG. 12.

FIG. 12 is a flowchart illustrating details of the image selection processing in step S1608. The flowchart illustrated in FIG. 12 is implemented, for example, by the CPU 101 loading a program corresponding to the album creation condition stored in the HDD 104 onto the ROM 102 or the RAM 103 and executing the program. In the flowchart of FIG. 12, image data is selected from a sub-image group allocated to one spread targeted for processing. Therefore, in a case where an album is configured with a plurality of spreads, the processing illustrated in the flowchart of FIG. 12 is performed a number of times corresponding to the number of spreads.

Furthermore, in the present exemplary embodiment, types of image data to be selected in the image selection processing are set according to the respective setting values of objects set by the user via the UI 2001 and the count number counted by the loop counter 1103. Moreover, as mentioned above, in the present exemplary embodiment, the count number counted by the loop counter 1103 corresponds to the number of pieces of previously-selected image data. More specifically, a designated object and an excluded object are set according to the respective setting values of objects set by the user via the UI 2001 and the count number counted by the loop counter 1103. In a case where an excluded object is set, image data containing the excluded object is not selected in the subsequent image selection processing.

In a case where the count number counted by the loop counter 1103 is 0, a main image is selected in the image selection processing. Therefore, the CPU 101 sets a designated object and an excluded object in such a manner that a main image of the type corresponding to the setting value of each object set by the user is selected. For example, as illustrated in FIG. 21, in a case where both the setting value of "person" and the setting value of "animal" are "more frequent" or in a case where the setting value of "person" is "normal" and the setting value of "animal" is "more frequent", an image of the type "person+animal" is arranged in the main slot. Therefore, both an object of "person" and an object of "animal" are set as a designated object. Furthermore, in a case where the setting value of "person" is "less frequent" and the setting value of "animal" is "normal", an image of the type "animal" is arranged in the main slot. Therefore, an object of "animal" is set as a designated object and an object of "person" is set as an excluded object. Moreover, in a case where the setting value of "person" is "normal" and the setting value of "animal" is "less frequent", an image of the type "person" is arranged in the main slot. Therefore, an object of "person" is set as a designated object and an object of "animal" is set as an excluded object. Additionally, in a case where both the setting value of "person" and the setting value of "animal" are "less frequent", an image of the type "thing" is arranged in the main slot. Therefore, both an object of "person" and an object of "animal" are set as an excluded object. At this time, an object (here, an object of "food") other than the objects set as an excluded object can be set as a designated object. Furthermore, while, in the present exemplary embodiment, a predetermined value is set as "normal", an object with a setting value equal to or greater than the predetermined value is set as a designated object, and an object with a setting value less than the predetermined value is set as an excluded object, the present exemplary embodiment is not limited to this configuration. A configuration in which the type of an image to be arranged is changed according to a combination of the setting values only needs to be employed.

Furthermore, in a case where the count number counted by the loop counter 1103 is 1 or more, a sub-image is selected in the image selection processing. Therefore, the CPU 101 sets a designated object and an excluded object in such a manner that a sub-image of the type corresponding to the setting value of each object set by the user is selected. For example, as illustrated in FIG. 21, in a case where both the setting value of "person" and the setting value of "animal" are "more frequent", images of the type "person+animal" are arranged in the respective sub-slots. Therefore, no excluded object is set, and both an object of "person" and an object of "animal" are set as a designated object. Moreover, in a case where the setting value of "person" is "more frequent" and the setting value of "animal" is "normal", images of the type "person" are arranged in the respective sub-slots. Therefore, an object of "person" is set as a designated object, and an object of "animal" is set as an excluded object. Additionally, in a case where the setting value of "person" is "normal" and the setting value of "animal" is "more frequent" or in a case where the setting value of "person" is "less frequent" and the setting value of "animal" is "more frequent", images of the type "animal" are arranged in the respective sub-slots. Therefore, an object of "animal" is set as a designated object, and an object of "person" is set as an excluded object. Besides, in a case where both the setting value of "person" and the setting value of "animal" are "less frequent", images of the type "thing" are arranged in the respective sub-slots. Therefore, no designated object is set, and both an object of "person" and an object of "animal" are set as an excluded object. At this time, an object (here, an object of "food") other than the objects set as an excluded object can be set as a designated object.

In the above-described way, the types of image data to be arranged in the respective slots can be changed according to the respective setting values of objects set by the user via the UI 2001.

Processing in steps S1201 to S1209 is similar to the processing performed during creation of an album obtained before editing, and is, therefore, omitted from description.

In step S1210, the CPU 101 determines whether a designated object or an excluded object is previously set. While, during editing of an album, a designated object or an excluded object is set in the above-described way, in some cases, a designated object or an excluded object may not be set. These cases include, for example, a case where there is no image data representing an image which contains a designated object and does not contain an excluded object among pieces of image data that are not yet selected. Moreover, these cases include, for example, a case of selecting image data representing an image to be arranged in a slot in which what type of image is to be arranged is not set. Details of this processing are similar to those of processing performed during creation of an album obtained before editing.

In step S1211, the CPU 101 determines whether, among pieces of image data generated in a targeted section, there is image data which represents an image that contains a designated object and does not contain an excluded object and which has the designated attribute. More specifically, the CPU 101 determines whether each piece of image data generated in a targeted section is image data which represents an image that contains a designated object and does not contain an excluded object and which has the designated attribute. Then, if it is determined that there is at least one piece of image data which represents an image that contains a designated object and does not contain an excluded object and which has the designated attribute (YES in step S1211), the processing proceeds to step S1212. If it is determined that there is not any one piece of image data which represents an image that contains a designated object and does not contain an excluded object and which has the designated attribute (NO in step S1211), no image data is selected from the pieces of image data generated in the targeted section, and the processing proceeds to step S1216. Furthermore, the CPU 101 determines that image data in which the category of the excluded object is not included in the region of the object classification 505 in the image analysis information 500 is image data which represents an image that does not contain an excluded object. The determination regarding a designated object and a designated attribute is similar to that in the processing performed during creation of an album obtained before editing.

In step S1212, the CPU 101 selects one piece of image data from pieces of image data generated in a targeted section. Details of this processing are as described above in the description of the image selection unit 1109. Furthermore, here, one piece of image data with the highest score is selected from among pieces of image data each of which represents an image that contains a designated object and does not contain an excluded object and each of which has the designated attribute. Therefore, in the present exemplary embodiment, for example, image data which represents an image containing the designated object and which has a low score would be selected in preference to image data which represents an image not containing the designated object and which has a high score. Moreover, in the present exemplary embodiment, for example, image data which has the designated attribute but has a low score would be selected in preference to image data which does not have the designated attribute but has a high score. Additionally, in the present exemplary embodiment, for example, image data which does not contain an excluded object but has a low score would be selected in preference to image data which contains an excluded object but has a high score.

In this way, in the present exemplary embodiment, a designated object or an excluded object is set according to the setting value of each object. With this configuration employed, if there is image data which conforms to a condition in a sub-image group, an image of the type corresponding to the setting value of each object can be more reliably selected. Thus, a layout result in which images of the types corresponding to the setting values of respective objects are laid out can be more reliably output.

Processing in steps S1213 to S1220 is similar to the processing performed during creation of an album obtained before editing.

In step S1221, the CPU 101 performs updating of the designated object and/or the excluded object. Furthermore, the content of the designated object or excluded object obtained after updating is not specifically limited, but can be set as appropriate. For example, the designated object or excluded object can be updated according to the previously set ordering of preference, or an object which is predominantly contained in a plurality of images represented by a sub-image group allocated to a spread targeted for processing can be updated as the designated object. Furthermore, an object other than the object which is predominantly contained in a plurality of images represented by a sub-image group allocated to a spread targeted for processing can be updated as the excluded object. Moreover, setting of the designated object or excluded object can be set to "none". Additionally, in a case where updating is not necessary (in a case where the image selection processing is performed with the use of the same designated object or excluded object as last time), the processing in step S1221 can be omitted.

Processing in step S1222 is similar to the processing performed during creation of an album obtained before editing.

Furthermore, in the present exemplary embodiment, in a case where it is determined in step S1217 that any one piece of image data is not selected, first of all, the CPU 101 does not update the designated object or excluded object but updates the designated attribute to re-perform the image selection processing. Then, in a case where any one piece of image data is not selected even after repetition of updating of the designated attribute, the CPU 101 performs updating of the designated object or excluded object.

If it is determined that the number of pieces of previously-selected image data has reached the number of pieces of image data (YES in step S1220), the CPU 101 ends the image selection processing, and, then, the processing proceeds to step S1609.

Processing in steps S1609 to S1613 is similar to the processing in steps S424 to S428.

In this way, the CPU 101 performs control in such a manner that images of the types corresponding to the setting values of respective objects input by the user are arranged, thus being able to generate a layout image in which a user's intention is reflected.

Furthermore, control performed in such a manner that images of the types corresponding to the setting values of respective objects input by the user are arranged can be applied not only during editing of an album but also during creation of an album obtained before editing. In that case, for example, a configuration in which, prior to creation of an album obtained before editing, not only inputting to a setting screen such as that illustrated in FIG. 3 but also inputting to a setting screen such as that illustrated in FIG. 20 is received can be employed. Then, a configuration in which the processing in steps S1601 to S1613 illustrated in FIG. 16 is performed instead of the processing in steps S416 to S428 illustrated in FIG. 4 can be employed.

In a second exemplary embodiment of the present disclosure, a configuration in which a template is selected in consideration of an influence of cropping is described. Furthermore, constituent elements similar to those in the first exemplary embodiment are omitted from description.

The HDD 104 stores, in addition to the templates illustrated in FIG. 10, various templates, which, for example, in the second exemplary embodiment, include templates such as those illustrated in FIG. 17. Each of templates (5-1) and (6-1) has a square-shaped main slot and square-shaped sub-slots, and the size of the main slot is larger than the size of each sub-slot. Furthermore, a template (7-1) has a square-shaped main slot and square-shaped sub-slots, and the size of the main slot is smaller than the size of the main slot of each of the templates (5-1) and (6-1). Moreover, each of templates (8-1), (9-1), and (10-1) has a rectangular-shaped main slot and square-shaped or rectangular-shaped sub-slots, and the size of the main slot is smaller than the size of the main slot of each of the templates illustrated in FIG. 10.

In this way, templates having not only a rectangular shape but also various shapes such as a square shape are prepared, so that a diversity of templates excellent in design can be provided to the user. Furthermore, not only templates having rectangular or square slots but also templates having slots of other shapes, such as circular, elliptical, or triangular shapes, can be provided. Moreover, a template having slots of respective different shapes, such as a template having a rectangular main slot and square sub-slots, can be provided.

Furthermore, in automatic layout processing, cropping (trimming), which is processing for removing partial regions of an image so as to make the image into such a size and shape as to fit into a slot, may be performed. Additionally, the position or amount of a region subjected to cropping varies according to the size and shape of a slot and the size and shape of an image.

Moreover, in automatic layout processing, the CPU 101 is able to acquire information about the size and position of a slot in which to arrange an image. Therefore, as long as being further able to acquire information about the position of an object contained in an image, the CPU 101 is able to determine whether an object contained in an image is partially cut off due to cropping. Furthermore, the term "an object being partially cut off" refers to, specifically, a region in which at least a part of the object is contained being removed. Therefore, when determining that an object contained in an image would be partially cut off, the CPU 101 changes a template to be used, so that the image can be arranged in the template without the object contained in the image being partially cut off.

However, the image analysis unit 207 may not be able to accurately detect the position (not be able to acquire information about the position) of an object depending on the category of the object. More specifically, for example, the CPU 101 is able to accurately detect the position of an object of "person" via the image analysis unit 207, but is not able to accurately detect the position of an object of other than "person" (such as "animal" or "food"). Therefore, with regard to an image containing an object of other than "person", the CPU 101 may select a template without determining whether the object contained in the image would be partially cut off due to cropping. Accordingly, with regard to an image containing an object of other than "person", it is desirable that the image be arranged in a slot with the amount of cropping reduced as much as possible.

Therefore, in the second exemplary embodiment, the CPU 101 changes a template to be used for layout generation, according to the mode of an album. More specifically, in a case where the mode corresponding to an object the information about the position of which is not able to be accurately detected is selected, the CPU 101 performs control in such a manner that the amount of cropping of an image is reduced as much as possible. This prevents an object the information about the position of which is not able to be accurately detected from being partially cut off due to cropping.

Furthermore, most images represented by pieces of image data acquired by imaging devices are rectangular. Since a rectangle and a square differ in aspect ratio, in order to arrange a rectangular image in such a way as to fit into a square-shaped slot such as that described above, it is necessary to crop the rectangular image. Moreover, since a rectangle and a square greatly differ in aspect ratio, the amount of cropping at this time may become large. Therefore, in the second exemplary embodiment, in a case where the mode of an album is other than "person", the CPU 101 selects a template having a rectangular slot. This enables performing control in such a manner that the amount of cropping of an image becomes small.

Control performed in the second exemplary embodiment is described in more detail. In the second exemplary embodiment, in a case where the mode of an album is "person", the CPU 101 selects a template to be used for layout generation from among the templates having rectangular slots such as those illustrated in FIG. 10 and the templates having slots of other than a rectangle such as those illustrated in FIG. 7. This is because the CPU 101 is able to accurately detect the position of an object of "person" and is, therefore, able to perform cropping in such a way as to prevent the object from being partially cut off irrespective of the shape of a slot.

Moreover, in a case where the mode of an album is other than "person" (such as "animal" or "food"), the CPU 101 selects a template to be used for layout generation from among the templates having rectangular slots such as those illustrated in FIG. 10. In other words, in a case where the mode of an album is other than "person", the CPU 101 does not select a template to be used for layout generation from among the templates having slots of other than a rectangle such as those illustrated in FIG. 7. This is because, since the CPU 101 is not able to accurately detect the position of an object of other than "person", in the case of arranging an image in a slot of the shape other than a rectangle, the object may be partially cut off.

Figure 15:
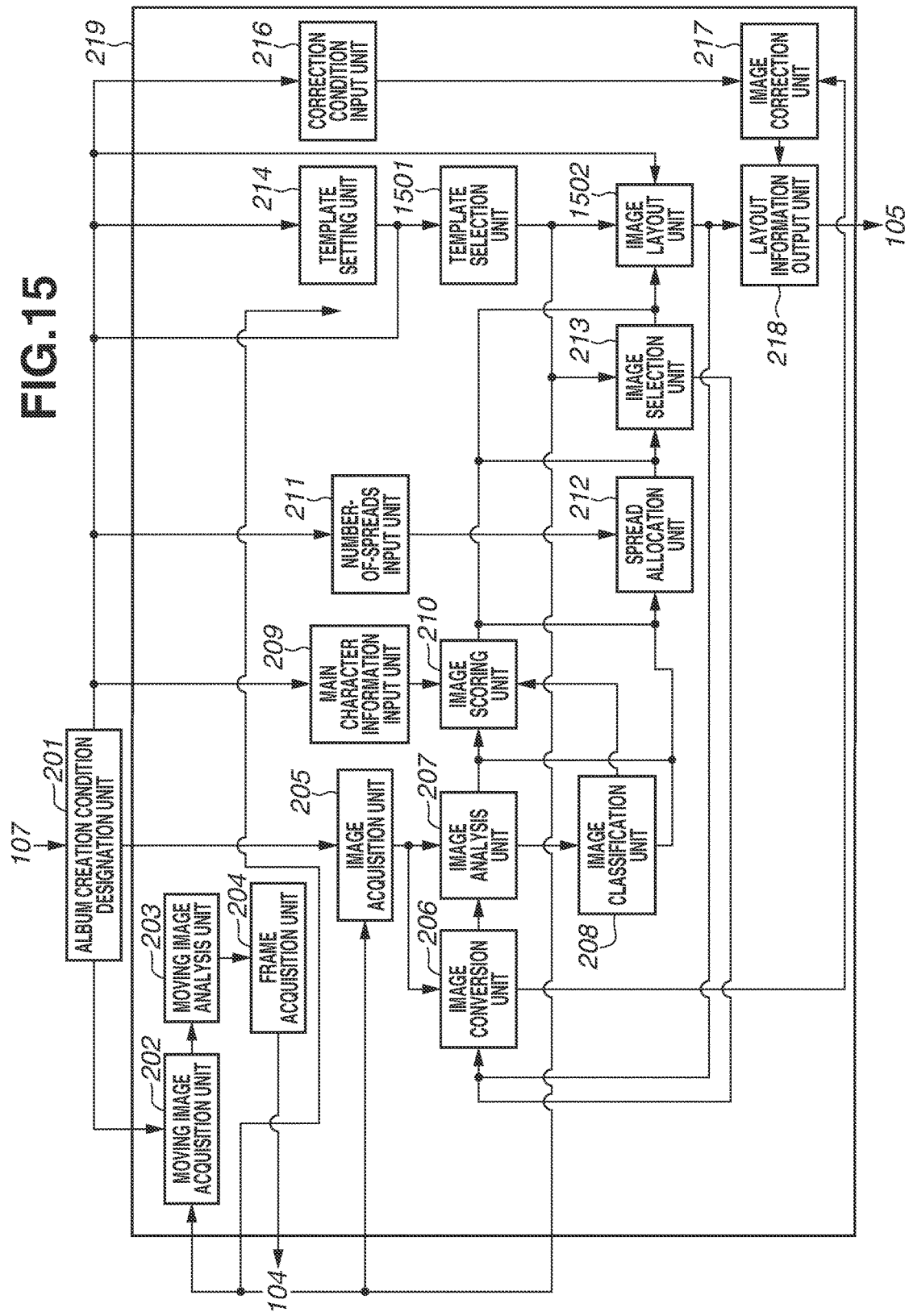
FIG. 15 is a block diagram illustrating a software configuration of an album creation application in a second exemplary embodiment according to one or more aspects of the present disclosure.

FIG. 15 is a block diagram illustrating a software configuration of the album creation application in the second exemplary embodiment. Furthermore, constituent elements similar to those of the album creation application in the first exemplary embodiment are omitted from description.

The album creation application in the second exemplary embodiment includes a template selection unit 1501. The template selection unit 1501 acquires a plurality of templates corresponding to template information designated by the album creation condition designation unit 201, which is acquired from the HDD 104 by the template setting unit 214.

An image layout unit 1502 determines layout of a spread. More specifically, the image layout unit 1502 selects a template suitable for image data selected by the image selection unit 213 from among a plurality of templates input from the template selection unit 1501, and then determines the placement location of each image on the template.

Figure 18:
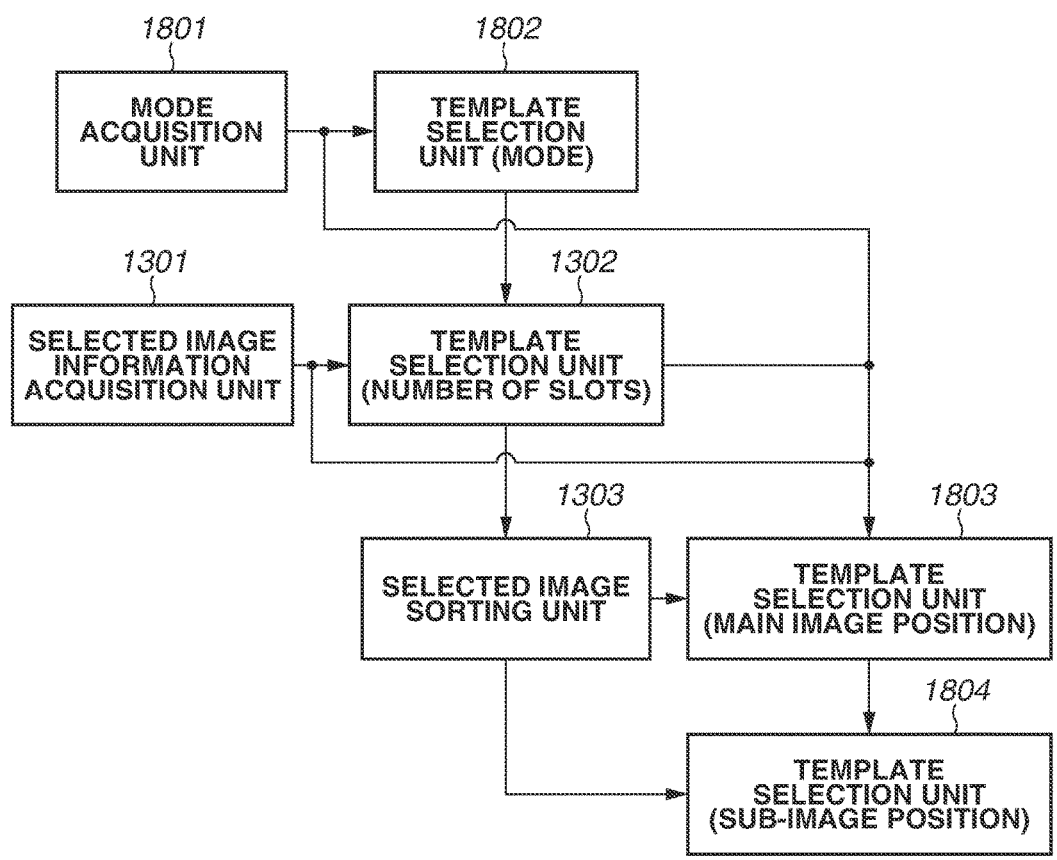
FIG. 18 is a block diagram of software for managing processing for determining a template in the second exemplary embodiment according to one or more aspects of the present disclosure.

FIG. 18 is a block diagram of software functioning to perform processing for determining a template, which is stored in the album creation application in the second exemplary embodiment. Constituent elements similar to those in the first exemplary embodiment are omitted from description.

A mode acquisition unit 1801 acquires information about the mode of an album, which is designated by the album creation condition designation unit 201, thus specifying the mode of the album.

A template selection unit 1802 selects a template based on the mode specified by the mode acquisition unit 1801. Furthermore, the method for selecting a template is as described above in the description of the template selection unit 1501.

A template selection unit 1302 selects a template having slots the number of which coincides with the number of pieces of image data selected in step S423, from among the templates selected by the template selection unit 1802.

A template selection unit 1803 selects a template suitable for a main image from among the templates selected by the template selection unit 1302. In the second exemplary embodiment, image data with the earlier image capturing date and time is assumed to be laid out in a slot closer to the upper left corner of a template, and image data with the later image capturing date and time is assumed to be laid out in a slot closer to the lower right corner of the template. Therefore, first, the template selection unit 1803 selects a template in which the position of a main slot corresponds to the order of the image capturing date and time of image data representing a main image, from among the templates selected by the template selection unit 1302. More specifically, for example, in a case where the order of the image capturing date and time of image data representing a main image is the third, a template in which the main slot is the third slot from left of all of the slots is selected. Furthermore, since pieces of image data are sorted by the selected image sorting unit 1303 in order of the image capturing date and time, the template selection unit 1803 is able to recognize the order of the image capturing date and time of image data representing a main image.

Furthermore, in the second exemplary embodiment, in a case where the mode of an album is "person", the template selection unit 1803 preferentially selects a template having a main slot of the shape other than a rectangle as long as an object is not partially cut off due to cropping. In a case where an object contained in a main image would be partially cut off due to cropping for arranging the main image in a main slot of the shape other than a rectangle, the template selection unit 1803 selects a template having a rectangular-shaped main slot.

Moreover, in a case where image data representing a main image is image data clipped from moving image data and is image data with a large amount of motion, the template selection unit 1803 selects a template having a small-sized slot. This is because, although an image represented by image data with a large amount of motion is likely to have much blurring or shaking, the image is reduced and then arranged in the small-sized slot, so that blurring or shaking of the image is mitigated. On the other hand, since an image represented by image data with a small amount of motion is less likely to have much blurring or shaking, in a case where the image data is image data with a small amount of motion, the template selection unit 1803 selects a template having a large-sized slot. Furthermore, while, here, a configuration in which a template is selected based on whether the amount of motion is large or small is described, the present exemplary embodiment is not limited to this configuration. In a case where the CPU 101 is able to detect the amount of blurring or the amount of shaking of an image, template selection can be performed with the use of such a detected value. Moreover, for example, the CPU 101 is able to detect the amount of edge in an image using a Laplacian filter. The CPU 101 can regard a case where the detected amount of edge is small as the amount of blurring or the amount of shaking being large. In any case, control only needs to be performed in such a manner that an image with a large amount of blurring or amount of shaking is arranged in a small slot and an image with a small amount of blurring or amount of shaking is arranged in a large slot.

A template selection unit 1804 selects a template suitable for a sub-image from among the templates selected by the template selection unit 1803. The template selection unit 1804 selects a template in which the position of a sub-slot corresponds to the order of the image capturing date and time of image data representing a sub-image among the pieces of image data selected in step S423. Furthermore, in the second exemplary embodiment, in a case where the mode of an album is "person", the template selection unit 1804 preferentially selects a template having a slot of the shape other than a rectangle as long as an object is not partially cut off due to cropping. In a case where an object contained in a sub-image would be partially cut off due to cropping for arranging the sub-image in a sub-slot of the shape other than a rectangle, the template selection unit 1804 selects a template having a rectangular-shaped sub-slot. In this way, the template selection unit 1804 selects a template to be finally used for generating a layout image.

Even in the second exemplary embodiment, in step S425, the CPU 101 determines an image layout of a spread targeted for processing via the image layout unit 215. Then, the CPU 101 determines a template suitable for image data selected in step S423 from among the plurality of templates acquired in step S424. A method for determining the template is described with reference to FIG. 19.

Figure 19:
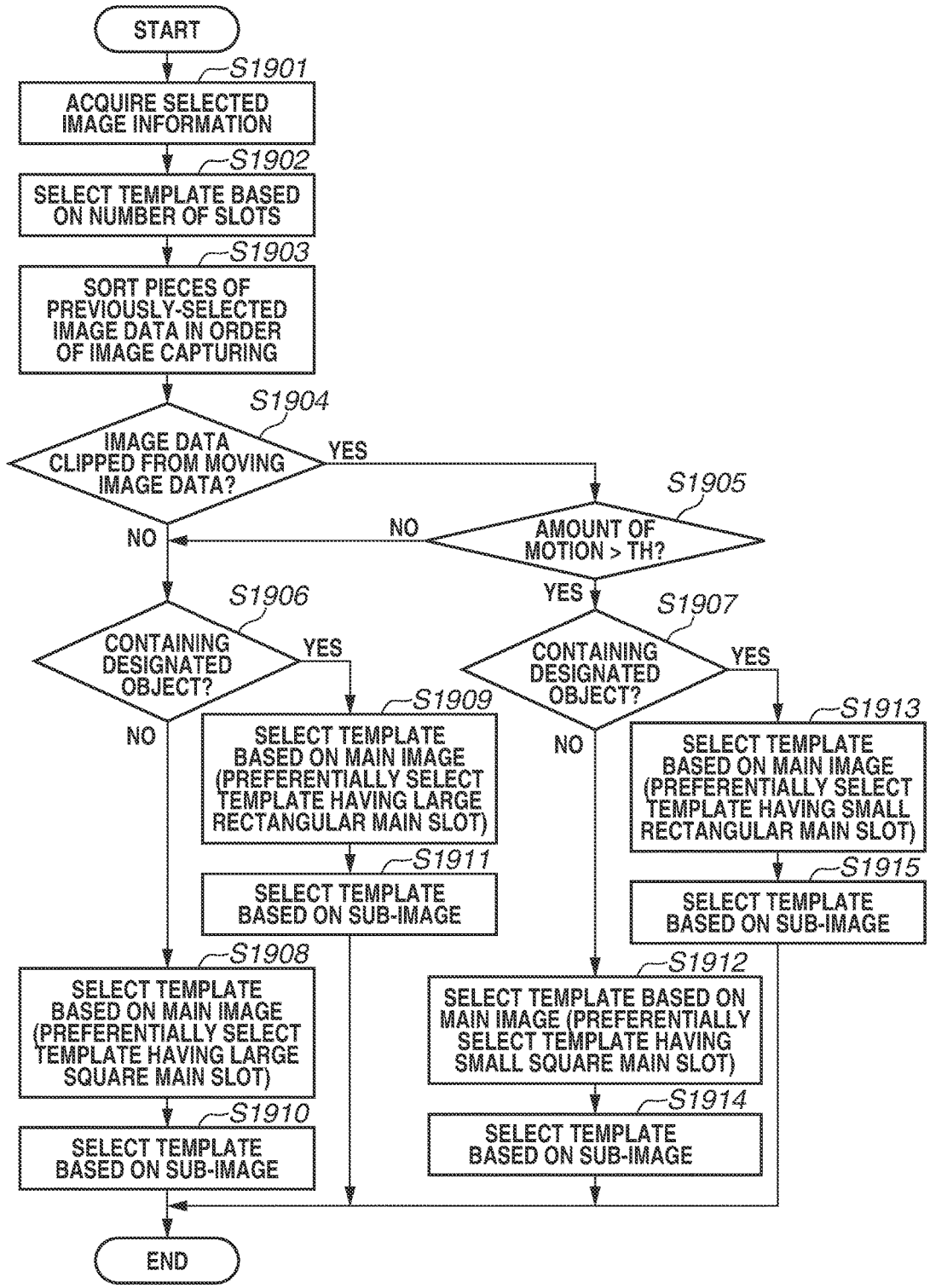
FIG. 19 is a flowchart illustrating processing for determining a template which is used to generate a layout image in the second exemplary embodiment according to one or more aspects of the present disclosure.

FIG. 19 is a flowchart illustrating processing for determining a template to be used for generating a layout image in the second exemplary embodiment. The flowchart illustrated in FIG. 19 is implemented, for example, by the CPU 101 loading a program corresponding to the album creation application stored in the HDD 104 onto the ROM 102 or the RAM 103 and executing the program.

In step S1901, the CPU 101 acquires, via the selected image information acquisition unit 1301, the number of pieces of image data selected in step S423 and information about the selected pieces of image data. This processing is similar to the processing in step S1401.

In step S1902, the CPU 101 selects, via the template selection unit 1302, a template having slots the number of which coincides with the number of pieces of image data selected in step S423. This processing is similar to the processing in step S1402.

In step S1903, the CPU 101 sorts, via the selected image sorting unit 1303, the pieces of image data selected in step S423 in order of the image capturing date and time. This processing is similar to the processing in step S1403.

In step S1904, the CPU 101 determines whether the image data corresponding to a main image is image data acquired by clipping a frame from moving image data. If the CPU 101 determines that the image data is image data acquired by clipping a frame from moving image data (YES in step S1904), the processing proceeds to step S1905. Then, if the CPU 101 determines that the image data is not image data acquired by clipping a frame from moving image data (NO in step S1904), the processing proceeds to step S1906.

In step S1905, the CPU 101 determines whether the amount of motion of the image data corresponding to the main image is greater than a predetermined threshold value TH. If it is determined that the amount of motion is greater than the predetermined threshold value TH (YES in step S1905), the processing proceeds to step S1907, and, if it is determined that the amount of motion is not greater than the predetermined threshold value TH (NO in step S1905), the processing proceeds to step S1906.

In step S1906, the CPU 101 determines whether the main image contains an object of the category other than "person". If it is determined that the main image contains an object of the category other than "person" (YES in step S1906), the processing proceeds to step S1909, and, if it is determined that the main image does not contain an object of the category other than "person" (NO in step S1906), the processing proceeds to step S1908.

In step S1908, the CPU 101 selects, via the template selection unit 1803, a template suitable for the main image from among the templates selected in step S1902. Furthermore, at this time, the image data corresponding to the main image is not image data acquired by clipping a frame from moving image data, and the main image does not contain an object of the category other than "person". Alternatively, while the image data corresponding to the main image is image data acquired by clipping a frame from moving image data, the amount of motion thereof is small and the main image does not contain an object of the category other than "person". Therefore, first, the CPU 101 selects a template having a large square main slot. Then, the CPU 101 determines whether, if cropping is performed to the main image in such a manner that the main image fits into the main slot of the selected template, an object contained in the main image would be partially cut off. If the CPU 101 determines that an object contained in the main image would not be partially cut off, the CPU 101 advances the processing to step S1910 while selecting the template having a large square main slot. On the other hand, if the CPU 101 determines that an object contained in the main image would be partially cut off, the CPU 101 selects a template having a large rectangular main slot, the aspect ratio of which is similar to the aspect ratio of the main image, and then advances the processing to step S1910.

In step S1910, the CPU 101 selects, via the template selection unit 1804, a template suitable for a sub-image from among the templates selected in step S1908. At this time, the CPU 101 can select a template having a sub-slot the aspect ratio of which is similar to the aspect ratio of each sub-image, or can select a template having a square sub-slot. Furthermore, as with template selection that is based on a main image, the CPU 101 can change a template to be selected according to whether the sub-image contains an object of the category other than "person". Moreover, at this time, in which sub-slot which sub-image is arranged is also specified.

In step S1909, the CPU 101 selects, via the template selection unit 1803, a template suitable for a main image from among the templates selected in step S1902. Furthermore, at this time, the image data corresponding to the main image is not image data acquired by clipping a frame from moving image data, and the main image contains an object of the category other than "person". Alternatively, while the image data corresponding to the main image is image data acquired by clipping a frame from moving image data, the amount of motion thereof is small and the main image contains an object of the category other than "person". Therefore, the CPU 101 selects a template having a large rectangular main slot, the aspect ratio of which is similar to the aspect ratio of the main image, and then advances the processing to step S1911.

In step S1911, the CPU 101 selects, via the template selection unit 1804, a template suitable for a sub-image from among the templates selected in step S1909. At this time, the CPU 101 can select a template having a sub-slot the aspect ratio of which is similar to the aspect ratio of each sub-image, or can select a template having a square sub-slot. Furthermore, as with template selection that is based on a main image, the CPU 101 can change a template to be selected according to whether the sub-image contains an object of the category other than "person". Moreover, at this time, in which sub-slot which sub-image is arranged is also specified.

In step S1907, the CPU 101 determines whether the main image contains an object of the category other than "person". If it is determined that the main image contains an object of the category other than "person" (YES in step S1907), the processing proceeds to step S1913, and, if it is determined that the main image does not contain an object of the category other than "person" (NO in step S1907), the processing proceeds to step S1912.

In step S1912, the CPU 101 selects, via the template selection unit 1803, a template suitable for the main image from among the templates selected in step S1902. Furthermore, at this time, the image data corresponding to the main image is image data acquired by clipping a frame from moving image data and is image data with a large amount of motion, and the main image does not contain an object of the category other than "person". Therefore, first, the CPU 101 selects a template having a small square main slot. Then, the CPU 101 determines whether, if cropping is performed to the main image in such a manner that the main image fits into the main slot of the selected template, an object contained in the main image would be partially cut off. If the CPU 101 determines that an object contained in the main image would not be partially cut off, the CPU 101 advances the processing to step S1914 while selecting the template having a small square main slot. On the other hand, if the CPU 101 determines that an object contained in the main image would be partially cut off, the CPU 101 selects a template having a small rectangular main slot, the aspect ratio of which is similar to the aspect ratio of the main image, and then advances the processing to step S1914.

In step S1914, the CPU 101 selects, via the template selection unit 1804, a template suitable for a sub-image from among the templates selected in step S1912. At this time, the CPU 101 can select a template having a sub-slot the aspect ratio of which is similar to the aspect ratio of each sub-image, or can select a template having a square sub-slot. Furthermore, as with template selection that is based on a main image, the CPU 101 can change a template to be selected according to whether the sub-image contains an object of the category other than "person". Moreover, at this time, in which sub-slot which sub-image is arranged is also specified.

In step S1913, the CPU 101 selects, via the template selection unit 1803, a template suitable for the main image from among the templates selected in step S1902. Furthermore, at this time, the image data corresponding to the main image is image data acquired by clipping a frame from moving image data and is image data with a large amount of motion, and the main image contains an object of the category other than "person". Therefore, the CPU 101 selects a template having a small rectangular main slot, the aspect ratio of which is similar to the aspect ratio of the main image, and then advances the processing to step S1915.

In step S1915, the CPU 101 selects, via the template selection unit 1804, a template suitable for a sub-image from among the templates selected in step S1913. At this time, the CPU 101 can select a template having a sub-slot the aspect ratio of which is similar to the aspect ratio of each sub-image, or can select a template having a square sub-slot. Furthermore, as with template selection that is based on a main image, the CPU 101 can change a template to be selected according to whether the sub-image contains an object of the category other than "person". Moreover, at this time, in which sub-slot which sub-image is arranged is also specified.

In the above-described way, in step S425, the CPU 101 determines a template to be used for generating a layout image and determines in which slot which image is arranged. Specifically, the CPU 101 manages information about each slot included in the selected template and image data corresponding to an image to be laid out in each slot in association with each other.

As mentioned in the foregoing, in the second exemplary embodiment, when arranging an image containing an object the position information about which is not able to be acquired, such as an object of the category other than "person", the CPU 101 selects a template having a slot the aspect ratio of which is similar to that of the image. With this configuration employed, an object the position information about which is not able to be acquired can be prevented or reduced from being partially cut off.

Furthermore, as mentioned in the foregoing, in the second exemplary embodiment, when arranging an image represented by image data acquired by clipping a frame from moving image data and having a large amount of motion, the CPU 101 selects a template having a small slot. With this configuration employed, a visual effect brought about to the user by blurring or shaking of an image can be prevented or reduced. Moreover, when arranging an image represented by image data acquired by clipping a frame from moving image data, the CPU 101 can select a template having a small slot irrespective of whether the amount of motion of the image data is large or small.

Furthermore, in the above description, a configuration in which the CPU 101 performs selection of a template based on a determination made as to whether image data corresponding to a main image is image data acquired from moving image data (moving image determination) or a determination made as to whether an object of the category other than "person" is contained in a main image (object determination) has been described. However, the present exemplary embodiment is not limited to this configuration. For example, without performing selection of a template based on the moving image determination or object determination, the CPU 101 can perform selection of a template based on only the mode of an album. In that case, the CPU 101 acquires information about the mode of an album from the album creation condition designation unit 201, thus specifying the mode of the album. Then, the CPU 101 performs filtering processing for selecting a template corresponding to the specified mode from among a plurality of templates acquired from the template setting unit 214. The template extracted in this way is acquired by the image layout unit 1502, so that an album in which the selected template is used is created. In that instance, in a case where the specified mode of the album is a mode of "person", the CPU 101 extracts a template having a rectangular slot such as that illustrated in FIG. 10 and a template having a slot of the shape other than a rectangle such as that illustrated in FIG. 17. Then, in a case where an object would not be partially cut off due to cropping, the CPU 101 preferentially selects the template having a slot of the shape other than a rectangle, and, in a case where an object would be partially cut off due to cropping, the CPU 101 preferentially selects the template having a rectangular slot. Moreover, in a case where the specified mode of the album is a mode other than "person", the CPU 101 extracts and selects a template having a rectangular slot such as that illustrated in FIG. 10. Thus, in a case where the specified mode of the album is a mode other than "person", a configuration in which the CPU 101 selects a template having a rectangular slot irrespective of whether an object of the category other than "person" is contained in a main image can also be employed.

The present disclosure is not limited to the above-described exemplary embodiments. For example, while, in the above-described exemplary embodiments, a configuration in which the above-mentioned image selection processing is used for automatic layout processing for an album has been described, for example, the image selection processing can be used for a presentation function that automatically present image data targeted for printing to the user. Thus, the above-mentioned image selection processing can be performed by a program for executing the presentation function. Furthermore, for example, the present disclosure can also be applied to a configuration for generating single-page printed matter. In this case, for example, the CPU 101 can regard one spread in the above-described exemplary embodiments as single-page printed matter to perform processing thereon. Moreover, since, generally, only one piece of image data is laid out on single-page printed matter, only one slot is assumed to be included in a template for single-page printed matter. This slot can be regarded as a main slot or can be regarded as a sub-slot. Furthermore, in the case of a configuration capable of setting the number of sheets of printed matter, the CPU 101 can regard one spread in the above-described exemplary embodiments as the set number of sheets of single-page printed matter to perform processing thereon. In this case, for example, the CPU 101 can regard a slot included in a template for the first sheet of single-page printed matter as a main slot and can regard the second or subsequent sheet of single-page printed matter as a sub-slot.

Moreover, while, in the above-described exemplary embodiments, a configuration in which the image processing apparatus that performs automatic layout processing is an image processing apparatus that depends on a local environment has been described, for example, the image processing apparatus described above can be an image processing apparatus that is present on a network server. In this case, the user uploading image data on the image processing apparatus enables the image processing apparatus to perform automatic layout processing.

While, in the above-described exemplary embodiments, with respect to evaluation such as image scoring, evaluation is performed by assigning scores, the exemplary embodiments are not limited to this configuration. In other words, evaluation can be performed without using scores, and, for example, a configuration in which evaluation results of "double circle", "circle", "triangle", and "cross" are assigned in descending order of evaluation and, for example, scene classification or image selection is performed according to the evaluation results can also be employed.

While, in the above-described exemplary embodiments, a configuration in which both the designated object and the designated attribute are referred to with regard to image selection processing is employed, the exemplary embodiments are not limited to this configuration. For example, a configuration in which setting of the designated attribute is not performed can be employed. In that case, for example, in step S1212, the CPU 101 selects one piece of image data which contains the designated object and has the highest score. Moreover, for example, a configuration in which setting of the designated object is not performed can be employed. In that case, for example, in step S1212, the CPU 101 selects one piece of image data which has the designated attribute and has the highest score.

In the above-described exemplary embodiments, to arrange, in a layout image, an image containing an object of the category corresponding to the mode of an album, control is performed in such a manner that the score of image data representing the image becomes high, and image selection processing is performed with the object set as a designated object. However, the exemplary embodiments are not limited to this configuration, but, for example, a configuration in which only one of control performed in such a manner that the score of image data representing the image becomes high and control performed to execute image selection processing with the object set as a designated object is performed can also be employed. Thus, for example, a configuration in which control is performed in such a manner that the score of image data representing the image becomes high and, in the image selection processing, only the score (or only the score and the designated attribute) is referred to is employed. Even in this configuration, in the image selection processing, image data representing an image containing an object of the category corresponding to the mode of an album can be preferentially selected.

Furthermore, the present disclosure can also be implemented by performing the following processing. Specifically, software (program) for implementing the functions of the above-described exemplary embodiments is supplied to a system or apparatus via a network or any type of storage medium, and a computer or computerized configuration(s) that may comprise one or more processors, one or more memories, circuitry, firmware, hardware, other components, or the like (or a CPU or micro processing unit (MPU)), of the system or apparatus read(s) out and execute(s) the program to perform the processing. Moreover, the program can be executed by a single computer or can be executed by a plurality of computers operating in conjunction with each other. Additionally, not all of the above-described processing operations need to be implemented by software, but a part or the whole of the above-described processing operations can be implemented by hardware.

Other Embodiments

Embodiment(s) or other aspects of the present disclosure can also be realized by a computer or computerized configuration(s) of a system or apparatus that read(s) out and execute(s) computer executable instructions (e.g., one or more programs) recorded on a storage medium (which may also be referred to more fully as a 'non-transitory computer-readable storage medium') to perform the functions of one or more of the above-described embodiment(s) and/or that include(s) one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer or computerized configuration(s) may comprise one or more processors, one or more memories, circuitry, firmware, hardware, other components, or the like (e.g., central processing unit (CPU), micro processing unit (MPU)), and may include a network of separate computers or separate processors to read out and execute the computer executable instructions. The computer executable instructions may be provided to the computer or computerized configuration(s), for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-239737 filed Dec. 9, 2016, which is hereby incorporated by reference herein in its entirety.

What is claimed is:

1. A control method for an image processing apparatus that generates a layout image by arranging a plurality of images in a template, the control method comprising:

receiving, from a user, an input concerning a setting value regarding a predetermined object;

acquiring an image data group;

executing selection processing more than once, wherein the selection processing includes (a) specifying, as a designated object, at least one object of a plurality of objects including the predetermined object according to the setting value regarding the predetermined object based on the received input, and (b) selecting image data that represents an image that contains the designated object specified, without selecting image data that represents an image that does not contain the designated object specified, from among the acquired image data group, wherein the selection processing executed more than once is controlled such that a number of times of specifying the predetermined object as the designated object in the selection processing executed more than once in a case where the setting value regarding the predetermined object is a first value is greater than a number of times of specifying the predetermined object as the designated object in the selection processing executed more than once in a case where the setting value regarding the predetermined object is a second value; and outputting a layout image in which a plurality of images represented by pieces of the image data selected in the selection processing executed more than once is arranged in a template;

wherein a ratio of predetermined object to the plurality of images arranged in the template in the case where the setting value regarding the predetermined object is the first value is greater than a ratio of the predetermined object to the plurality of images arranged in the template in the case where the setting value regarding the predetermined object is the second value.

2. The control method according to claim 1, wherein, in a case where the setting value regarding the predetermined object is equal to or greater than a predetermined value, the predetermined object is specified as the designated object.

3. The control method according to claim 1, wherein, in the selection processing executed more than once, image data that has not been selected yet in the selection processing that has already been executed is selected.

4. The control method according to claim 1, wherein, in the selection processing, as an excluded object, at least one object of the plurality of objects is specified according to a the setting value regarding the predetermined object based on the received input, and wherein, in the selection processing, image data representing an image that contains an object specified as the excluded object is not selected from among the acquired image data group.

5. The control method according to claim 4, wherein, in a case where the setting value regarding the predetermined object is less than a predetermined value, the predetermined object is specified as the excluded object.

6. The control method according to claim 1, further comprising making an evaluation of each of pieces of image data included in the acquired image data group, wherein, in a case where first image data which represents an image that contains the designated object specified and second image data which represents an image that does not contain the first designated object and the evaluation of which is higher than that of the first image data are included in the acquired image data group, the first image data is selected in preference to the second image data in the selection processing.

7. The control method according to claim 6, further comprising analyzing a feature amount of each of pieces of image data included in the acquired image data group, wherein the evaluation of each of pieces of image data included in the acquired image data group is made based on the analyzed feature amount.

8. The control method according to claim 6, wherein the evaluation is made by a score being assigned to each of pieces of image data included in the acquired image data group based on a predetermined score axis, and wherein a higher score is assigned to image data the evaluation of which is higher.

9. The control method according to claim 8, wherein a predetermined score is added to a score assigned to image data which represents an image that contains the designated object specified based on the predetermined score axis.

10. The control method according to claim 1, further comprising making an evaluation of each of pieces of image data included in the acquired image data group, wherein, in a case where third image data which represents an image that contains the designated object specified and fourth image data which represents an image that contains the designated object specified and the evaluation of which is higher than that of the third image data are included in the acquired image data group, the fourth image data is selected in preference to the third image data in the selection processing.

11. The control method according to claim 1, wherein the predetermined object and is any one of an object of person type, an object of animal type, and an object of food type.

12. The control method according to claim 1, wherein the layout image is output by being displayed on a display unit.

13. The control method according to claim 1, wherein an input concerning a setting value regarding a particular object that is different from the predetermined object is further received from the user, wherein, in the selection processing, at least one object of a plurality of objects including the predetermined object and the particular object are specified as the designated object according to a combination of the setting value regarding the predetermined object and a setting value regarding the particular object based on the received input, wherein the selection processing executed more than once is controlled such that a number of times of specifying the particular object as the designated object in the selection processing executed more than once in a case where the setting value regarding the particular object is the first value is greater than a number of times of specifying the particular object as the designated object in the selection processing executed more than once in a case where the setting value regarding the particular object is the second value, and wherein a ratio of the particular object to the plurality of images arranged in the template in the case where the setting value regarding the particular object is the first value is greater than a ratio of the particular object to the plurality of images arranged in the template in the case where the setting value regarding the particular object is the second value.

14. The control method according to claim 13, further comprising:

receiving a mode designation input for designating one of a plurality of modes regarding a layout screen on which the layout image is displayed;

wherein the predetermined object is an object of a person regardless of which one of the plurality of modes is designated, and wherein the particular object is an object corresponding to the designated one of the plurality of modes.

15. The control method according to claim 13, further comprising:

receiving, from the user, a mode designation input for designating one of a plurality of modes regarding a layout screen on which the layout image is displayed; and displaying an input screen for inputting by the user;

wherein, in a case where a mode based on the received mode designation input is a first mode, the input screen that includes both an area for receiving the input concerning the setting value regarding the predetermined object and an area for receiving the input concerning the setting value regarding the particular object is displayed, and wherein, in a case where a mode based on the received mode designation input is a second mode that is different from the first mode, the input screen that includes an area for receiving the input concerning the setting value regarding the predetermined object but does not include an area for receiving the input concerning the setting value regarding the particular object is displayed.

16. The control method according to claim 15,
wherein the first mode is a mode in which the image that contains the predetermined object is preferentially arranged on the layout screen, and
wherein the second mode is a mode in which the image that contains the particular object is preferentially arranged on the layout screen.

17. The control method according to claim 13,
wherein the predetermined object is a human object, and
wherein the particular object is an animal object.

18. The control method according to claim 1, further comprising:
outputting album data that contains a plurality of layout images each of which is outputted as recited in claim 1.

19. A non-transitory computer-readable storage medium storing computer-executable instructions that, when executed by a computer, cause the computer to perform a control method for an image processing apparatus that generates a layout image by arranging a plurality of images in a template, the control method comprising:
receiving, from a user, an input concerning a setting value regarding a predetermined object;
acquiring an image data group;
executing selection processing more than once, wherein the selection processing includes (a) specifying, as a designated object, at least one object of a plurality of objects including the predetermined object according to the setting value regarding the predetermined object based on the received input, and (b) selecting image data that represents an image that contains the designated object specified, without selecting image data that represents an image that does not contain the designated object specified, from among the acquired image data group, wherein the selection processing executed more than once is controlled such that a number of times of specifying the predetermined object as the designated object in the selection processing executed more than once in a case where the setting value regarding the predetermined object is a first value is greater than a number of times of specifying the predetermined object as the designated object in the selection processing executed more than once in a case where the setting value regarding the predetermined object is a second value; and
outputting a layout image in which a plurality of images represented by pieces of the image data selected in the selection processing executed more than once is arranged in a template;
wherein a ratio of predetermined object to the plurality of images arranged in the template in the case where the setting value regarding the predetermined object is the first value is greater than a ratio of the predetermined object to the plurality of images arranged in the template in the case where the setting value regarding the predetermined object is the second value.

* * * * *